United States Patent [19]
Jacobs et al.

[11] Patent Number: 5,414,796
[45] Date of Patent: May 9, 1995

[54] VARIABLE RATE VOCODER

[75] Inventors: Paul E. Jacobs; William R. Gardner; Chong U. Lee; Klein S. Gilhousen; S. Katherine Lam; Ming-Chang Tsai, all of San Diego, Calif.

[73] Assignee: QUALCOMM Incorporated, San Diego, Calif.

[21] Appl. No.: 4,484

[22] Filed: Jan. 14, 1993

Related U.S. Application Data

[63] Continuation of Ser. No. 713,661, Jun. 11, 1991, abandoned.

[51] Int. Cl.⁶ ............................................. G10L 3/02
[52] U.S. Cl. .................................... 395/2.3; 395/2; 395/2.1; 395/2.31; 395/2.33; 381/41
[58] Field of Search ................................. 381/30–31, 381/35–36, 38, 40–41, 47; 395/2, 2.1, 2.3, 2.31, 2.33; 375/27, 122

[56] References Cited

U.S. PATENT DOCUMENTS

| | | | |
|---|---|---|---|
| 32,580 | 1/1888 | Atal et al. | 381/40 |
| 3,633,107 | 1/1972 | Brady | 325/305 |
| 4,012,595 | 3/1977 | Ota | 179/15 |
| 4,076,958 | 2/1978 | Fulghum | 179/1.5 A |
| 4,214,125 | 7/1980 | Mozer et al. | 179/1 SM |
| 4,360,708 | 11/1982 | Taguchi et al. | 179/15.55 |
| 4,379,949 | 4/1983 | Chen et al. | 375/122 |
| 4,535,472 | 8/1985 | Tomcik | 381/31 |
| 4,610,022 | 9/1986 | Kitayama et al. | 381/36 |
| 4,672,669 | 1/1987 | DesBlache et al. | 381/46 |
| 4,672,670 | 6/1987 | Wang et al. | 381/47 |
| 4,677,671 | 6/1987 | Galand et al. | 381/31 |
| 4,771,465 | 9/1988 | Bronson et al. | 381/36 |
| 4,797,925 | 1/1989 | Lin | 381/36 |
| 4,797,929 | 1/1989 | Gerson et al. | 381/43 |
| 4,827,517 | 5/1989 | Atal et al. | 381/41 |
| 4,831,636 | 5/1989 | Taniguchi et al. | 375/27 |
| 4,843,612 | 6/1989 | Brusch et al. | 375/1 |
| 4,850,022 | 6/1989 | Honda et al. | 381/38 |
| 4,852,179 | 7/1989 | Fette | 381/29 |
| 4,856,068 | 8/1989 | Quatieri, Jr. et al. | 381/47 |
| 4,864,561 | 9/1989 | Ashenfelter et al. | 370/81 |
| 4,868,867 | 9/1989 | Davidson et al. | 581/35 |
| 4,885,790 | 12/1989 | McAulay et al. | 381/36 |
| 4,890,327 | 12/1989 | Bertrand et al. | 381/38 |
| 4,896,361 | 1/1990 | Gerson | 381/40 |
| 4,899,384 | 2/1990 | Crouse et al. | 381/31 |
| 4,899,385 | 2/1990 | Ketchum et al. | 381/36 |
| 4,903,301 | 2/1990 | Kondo et al. | 381/31 |
| 4,905,288 | 2/1990 | Gerson et al. | 381/43 |
| 4,918,734 | 4/1990 | Muramatsu et al. | 381/46 |
| 4,933,957 | 6/1990 | Bottau et al. | 375/27 |
| 4,937,873 | 6/1990 | McAulay et al. | 381/51 |
| 4,965,789 | 10/1990 | Bottau et al. | 370/79 |

(List continued on next page.)

OTHER PUBLICATIONS

W. Bastiaan Kleijn, Daniel J. Krasinski, and Richard H. Ketchum, "Fast Methods for the CLEP Speech Coding Algorithm". IEEE Transaction on Signal Processing vol. 38, No. 8 Aug. 1990.

(List continued on next page.)

*Primary Examiner*—Allen R. MacDonald
*Assistant Examiner*—Tariq Hafiz
*Attorney, Agent, or Firm*—Russell B. Miller; Sean English

[57] ABSTRACT

An apparatus and method for performing speech signal compression, by variable rate coding of frames of digitized speech samples. The level of speech activity for each frame of digitized speech samples is determined and an output data packet rate is selected from a set of rates based upon the determined level of frame speech activity. A lowest rate of the set of rates corresponds to a detected minimum level of speech activity, such as background noise or pauses in speech, while a highest rate corresponds to a detected maximum level of speech activity, such as active vocalization. Each frame is then coded according to a predetermined coding format for the selected rate wherein each rate has a corresponding number of bits representative of the coded frame. A data packet is provided for each coded frame with each output data packet of a bit rate corresponding to the selected rate.

48 Claims, 22 Drawing Sheets

U.S. PATENT DOCUMENTS

| | | |
|---|---|---|
| 4,991,214 | 2/1991 | Freeman et al. .................. 381/38 |
| 5,007,092 | 4/1991 | Galand et al. .................... 381/36 |
| 5,023,910 | 6/1991 | Thomson .......................... 381/37 |
| 5,054,072 | 10/1991 | McAulay et al. .................. 381/31 |
| 5,060,269 | 10/1991 | Zinser ............................... 381/36 |
| 5,077,798 | 12/1991 | Ichikawa et al. ................. 381/36 |
| 5,091,945 | 2/1992 | Kleijn ............................... 381/31 |
| 5,093,863 | 3/1992 | Galand et al. .................... 381/38 |
| 5,103,459 | 4/1992 | Gilhousen et al. ............... 370/18 |
| 5,113,448 | 5/1992 | Nomura et al. ................... 381/47 |
| 5,140,638 | 8/1992 | Moulsley et al. ................. 381/36 |
| 5,159,611 | 10/1992 | Tomita et al. .................... 381/30 |
| 5,161,210 | 11/1992 | Druyvesteyn et al. ........... 395/2 |
| 5,187,745 | 2/1993 | Yip et al. .......................... 381/40 |
| 5,202,953 | 4/1993 | Taguchi ............................. 395/2 |
| 5,214,741 | 5/1993 | Akamine et al. ................. 395/2 |
| 5,222,189 | 6/1993 | Fielder .............................. 395/2 |
| 5,235,671 | 8/1993 | Mazor ............................... 395/2 |

OTHER PUBLICATIONS

Richard C. Rose, Thomas P. Barnwell, III, "Design and Performance of an Analysis-by-Synthesis Class of Predictive Speech Coders". IEEE Transactions on Signal Processing, vol. 38, No. 9 Sep. 1990.

Ioannis S. Dedes, Dhadesugoor R. Vaman, and Cadathur V. Chakravarthy, "Variable Rate Adaptive Predictive Filter". IEEE Transactions on Signal Processing. vol. 40, No. 3 Mar. 1992.

"DSP Chips can Produce Random Numbers Using Proven Algorithm" by Paul Menner, *EDN, Jan. 21, 1991,* pp. 141–145.

"Variable Rate Speech Coding: A Review" by N. S. Jayans, *1984 IEEE.*

"Variable Rate Speech Coding with Onling Segmentation and Fast Algebraic Codes" by R. DiFrancesco et al, *1990 IEEE pp. 233–236.*

"Finite State CELP for Variable Rate Speech Coding" by Saeed V. Vaseghi, 1990 IEEE, pp. 37–40.

"Variable Rate Speech Coding for Asynchronous Transfer Mode" by Hiroshi Nakada et al., *1990 IEEE Transaction on Communications,* vol. 38, No. 3, Mar. 1990, pp. 277–284.

"A 4.8 KBPS Code Excited Linear Predictive Coder" by Thomas E. Tremain et al., Proceedings of the Mobile Satellite Conference, 1988.

"Stochastic Coding of Speech Signals at Very Low Bit Rates" by Bishnu S. Atal, et al., 1984 IEEE.

Taniguchi et al, "Combined source and channel coding based on multimode coding"; ICASSP 90: 1990 Inter. Conf. on Acoustics, Speech and Signal Processing; 3–6 Apr. 1990, pp. 477–480 vol. 1.

Swaminathan et al, "Half Rate CELP codec candidate for North American digital cellular systems"; 1992 IEEE Inter. Conf. on Selected Topics in Wireless Communications; pp. 192–194.

Taniguchi et al, "ADPCM with a multiquantizer for speech coding"; IEEE Journal on Selectid Areas in Communications; Feb. 1988, pp. 410–424, vol. 6 iss. 2.

Atal et al. "Adaptive Predictive Coding of Speech Signals", *The Bell System Technical Journal,* Oct. 1970, pp. 229–238.

Schroeder et al. "Stochastic Coding of Speech Signals at Very Low Bit Rates: the Importance of Speech Perception," *Speech Communication* 4 (1985), pp. 155–162.

Schroeder et al. "Code-Excited Linear Prediction (CELP): High-Quality Speech at Very Low Bit Rates," *1985 IEEE Communications,* pp. 9370940 (25.1.1–25.1.4).

Bishnu S. Atal. "Predictive Coding of Speech at Low Bit Rates", *IEEE Transactions on Communications,* vol. Com-30, No. 4, Apr. 1982, pp. 600–614.

Shinghai et al. "Improving Performance of Multi-Pulse LPC Coders at Low Bit Rates", *IEEE Transactions on Communications,* 1984, pp. 1.3.1–1.3.4.

Atal et al. "Stochastic Coding of Speech Signals at Very Low Bit Rates," 1984 IEEE.

Wang et al. "Phonetically-Based Vector Excitation Coding of Speech at 3.6 kbps," 1989 IEEE, pp. 49–52.

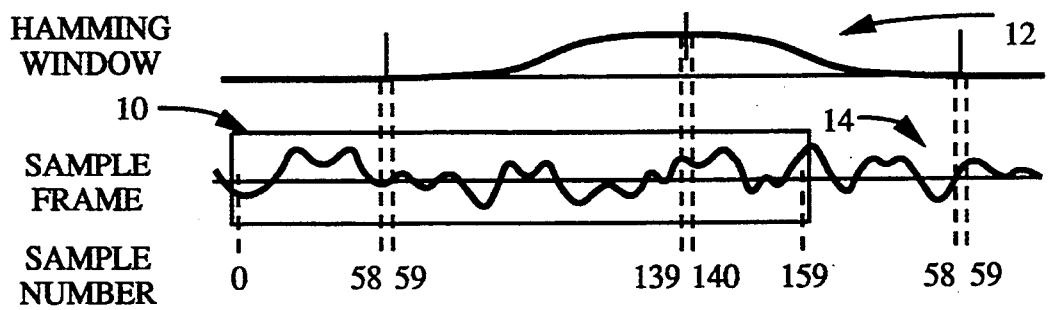
FIG. 1a
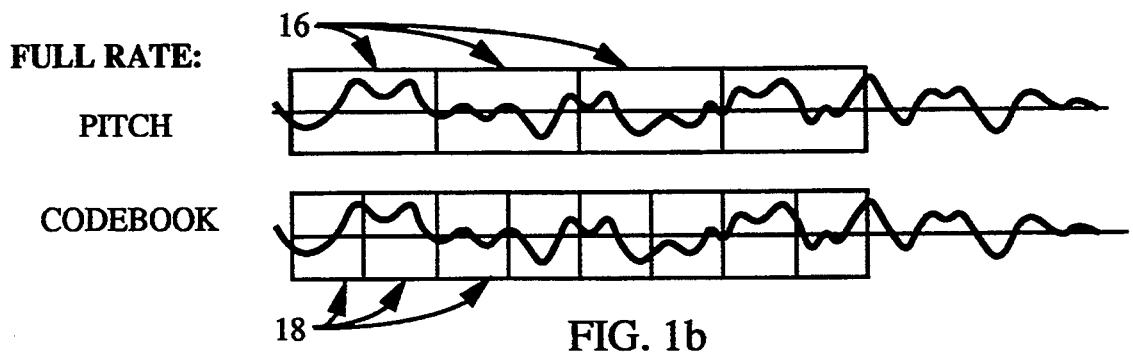
FIG. 1b
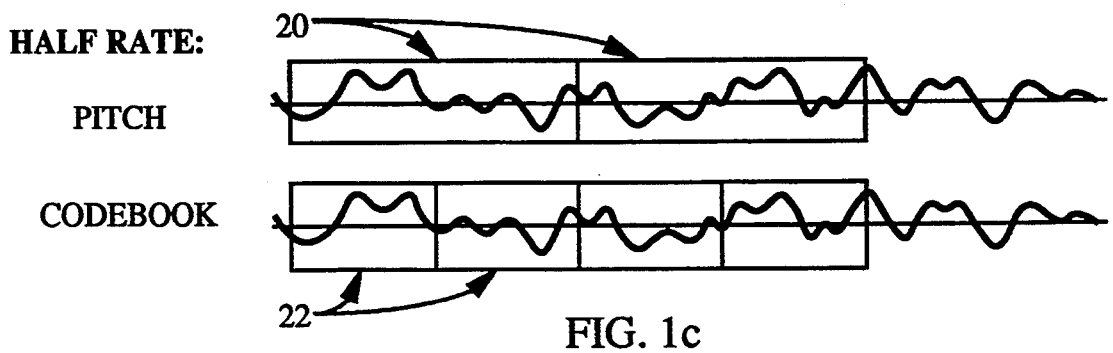
FIG. 1c
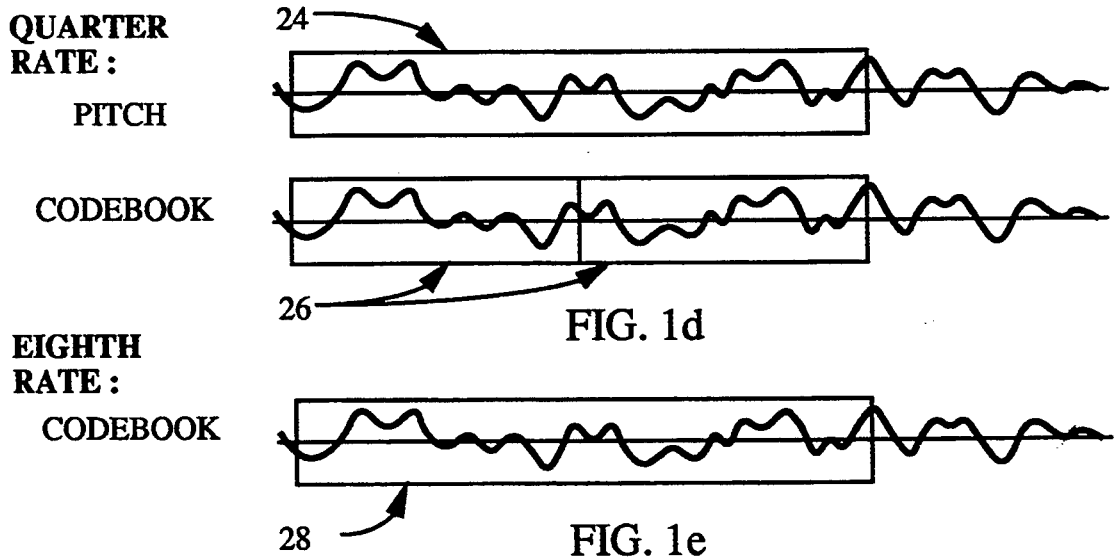
FIG. 1d
FIG. 1e

FULL RATE

| LPC | 40 | | | | | | | |
|---|---|---|---|---|---|---|---|---|
| PITCH | 10 | | 10 | | 10 | | 10 | |
| CODEBOOK | 10 | 10 | 10 | 10 | 10 | 10 | 10 | 10 |

TOTAL = 160 (PLUS 11 CRC)

FIG. 2a

HALF RATE

| LPC | 20 | | | |
|---|---|---|---|---|
| PITCH | 10 | | 10 | |
| CODEBOOK | 10 | 10 | 10 | 10 |

TOTAL = 80

FIG. 2b

QUARTER RATE

| LPC | 10 | |
|---|---|---|
| PITCH | 10 | |
| CODEBOOK | 10 | 10 |

TOTAL = 40

FIG. 2c

EIGHTH RATE

| LPC | 10 |
|---|---|
| PITCH | 0 |
| CODEBOOK | 6 |

TOTAL = 16

FIG. 2d

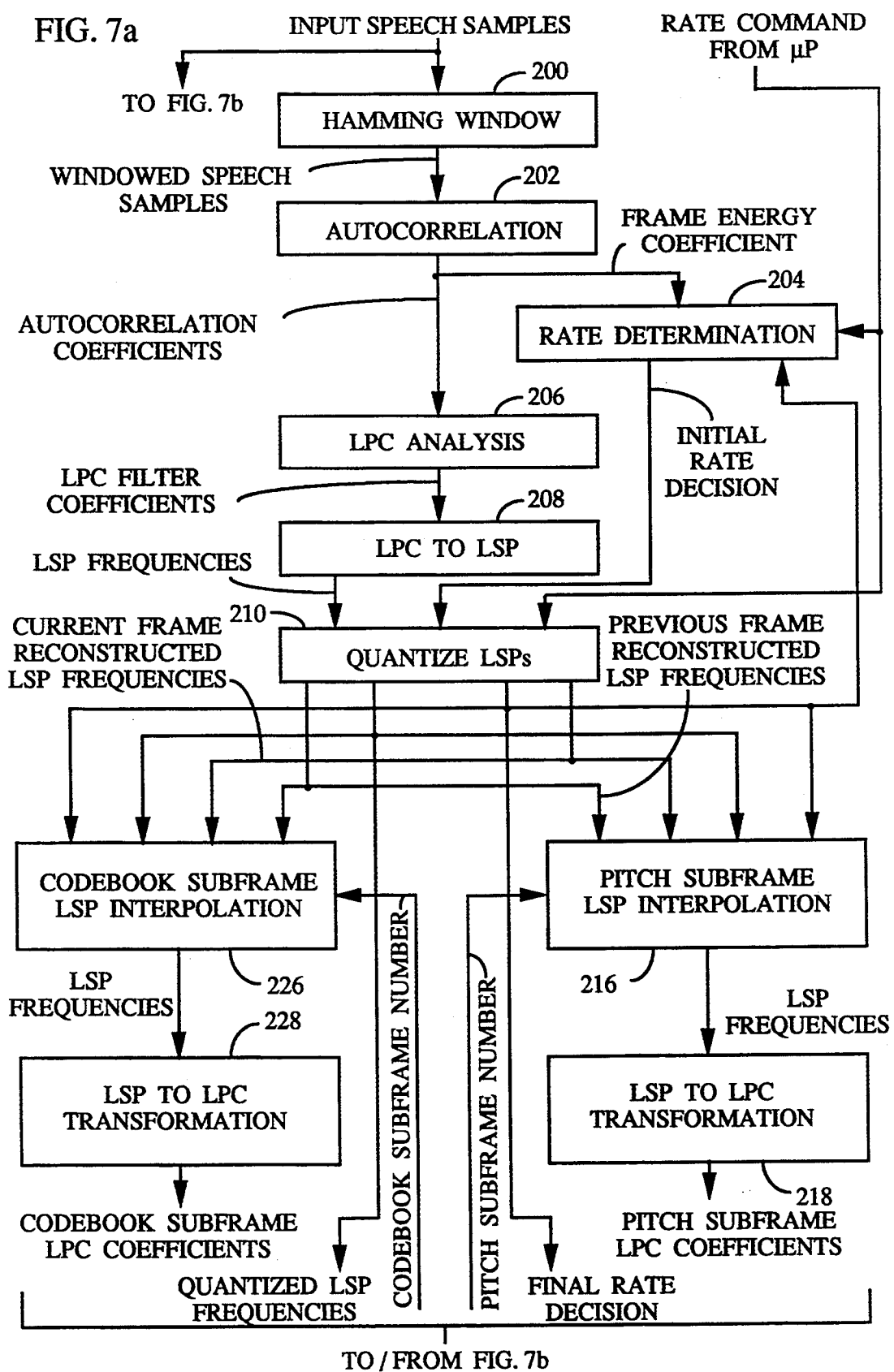

| RECEIVED PARAMETERS FOR FULL RATE FRAME | DECODE SUBFRAME PARAMETERS USED | | | |
|---|---|---|---|---|
| | SUBFRAME NO. 1 | SUBFRAME NO. 2 | SUBFRAME NO. 3 | SUBFRAME NO. 4 |
| $I_1, \ldots I_8$ | $I_1, I_2$ | $I_3, I_4$ | $I_5, I_6$ | $I_7, I_8$ |
| $G_1, \ldots G_8$ | $G_1, G_2$ | $G_3, G_4$ | $G_5, G_6$ | $G_7, G_8$ |
| $L_1, \ldots L_4$ | $L_1$ | $L_2$ | $L_3$ | $L_4$ |
| $b_1, \ldots b_4$ | $b_1$ | $b_2$ | $b_3$ | $b_4$ |
| $\omega_{1,f}, \ldots \omega_{10,f}$ | $\omega_i = 0.75\omega_{i,f-1} + 0.25\omega_{i,f}$ | $\omega_i = 0.5\omega_{i,f-1} + 0.5\omega_{i,f}$ | $\omega_i = 0.25\omega_{i,f-1} + 0.75\omega_{i,f}$ | $\omega_i = \omega_{i,f}$ |

FIG. 20a

| RECEIVED PARAMETERS FOR HALF RATE FRAME | DECODE SUBFRAME PARAMETERS USED | | | |
|---|---|---|---|---|
| | SUBFRAME NO. 1 | SUBFRAME NO. 2 | SUBFRAME NO. 3 | SUBFRAME NO. 4 |
| $I_1, \ldots I_4$ | $I_1, I_1$-20 | $I_2, I_2$-20 | $I_3, I_3$-20 | $I_4, I_4$-20 |
| $G_1, \ldots G_4$ | $G_1, G_1$ | $G_2, G_2$ | $G_3, G_3$ | $G_4, G_4$ |
| $L_1, L_2$ | $L_1$ | $L_1$ | $L_2$ | $L_2$ |
| $b_1, b_2$ | $b_1$ | $b_1$ | $b_2$ | $b_2$ |
| $\omega_{1,f}, \ldots \omega_{10,f}$ | $\omega_i = 0.75\omega_{i,f-1} + 0.25\omega_{i,f}$ | $\omega_i = 0.5\omega_{i,f-1} + 0.5\omega_{i,f}$ | $\omega_i = 0.25\omega_{i,f-1} + 0.75\omega_{i,f}$ | $\omega_i = \omega_{i,f}$ |

FIG. 20b

| RECEIVED PARAMETERS FOR QUARTER RATE FRAME | DECODE SUBFRAME PARAMETERS USED | | | |
|---|---|---|---|---|
| | SUBFRAME NO. 1 | SUBFRAME NO. 2 | SUBFRAME NO. 3 | SUBFRAME NO. 4 |
| $I_1, I_2$ | $I_1, I_1$-20 | $I_1$-40, $I_1$-60 | $I_2, I_2$-20 | $I_2$-40, $I_2$-60 |
| $G_1, G_2$ | $G_1, G_1$ | $G_1, G_1$ | $G_2, G_2$ | $G_2, G_2$ |
| $L_1$ | $L_1$ | $L_1$ | $L_1$ | $L_1$ |
| $b_1$ | $b_1$ | $b_1$ | $b_1$ | $b_1$ |
| $\omega_{1,f}, \ldots \omega_{8,f}$ | $\omega_i = 0.625\omega_{i,f-1} + 0.375\omega_{i,f}$ | $\omega_i = 0.625\omega_{i,f-1} + 0.375\omega_{i,f}$ | $\omega_i = 0.125\omega_{i,f-1} + 0.875\omega_{i,f}$ | $\omega_i = 0.125\omega_{i,f-1} + 0.875\omega_{i,f}$ |

FIG. 20c

| RECEIVED PARAMETERS FOR FULL RATE FRAME | DECODE SUBFRAME PARAMETERS USED | | | |
|---|---|---|---|---|
| | SUBFRAME NO. 1 | SUBFRAME NO. 2 | SUBFRAME NO. 3 | SUBFRAME NO. 4 |
| $I_1$ (NONE) | PN SEED | PN SEED | PN SEED | PN SEED |
| $G_1$ | $G_1, G_1$ | $G_1, G_1$ | $G_1, G_1$ | $G_1, G_1$ |
| L (NONE) | NONE | NONE | NONE | NONE |
| b (NONE) | 0 | 0 | 0 | 0 |
| $\omega_{1,f}, \ldots \omega_{5,f}$ | $\omega_i = 0.625\omega_{i,f-1} + 0.375\omega_{i,f}$ | $\omega_i = 0.625\omega_{i,f-1} + 0.375\omega_{i,f}$ | $\omega_i = 0.625\omega_{i,f-1} + 0.375\omega_{i,f}$ | $\omega_i = 0.625\omega_{i,f-1} + 0.375\omega_{i,f}$ |

FIG. 20d

| RECEIVED PARAMETERS FOR BLANK FRAME | DECODE SUBFRAME PARAMETERS USED ||||
|---|---|---|---|---|
| | SUBFRAME NO. 1 | SUBFRAME NO. 2 | SUBFRAME NO. 3 | SUBFRAME NO. 4 |
| I (NONE) | NONE | NONE | NONE | NONE |
| G (NONE) | 0 | 0 | 0 | 0 |
| L (NONE) | $L_p$ | $L_p$ | $L_p$ | $L_p$ |
| b (NONE) | $b_p$ | $b_p$ | $b_p$ | $b_p$ |
| $\omega_{i,f}$ (NONE) | $\omega_i = \omega_{i,f-1}$ | $\omega_i = \omega_{i,f-1}$ | $\omega_i = \omega_{i,f-1}$ | $\omega_i = \omega_{i,f-1}$ |

NOTE: $L_p$ AND $b_p$ ARE SET TO L AND b VALUES OF PREVIOUS DECODING SUBFRAME WHERE $b_p$ IS SET TO 1 IF $b_p > 1$.

FIG. 21a

| RECEIVED PARAMETERS FOR ERASURE FRAME | DECODE SUBFRAME PARAMETERS USED ||||
|---|---|---|---|---|
| | SUBFRAME NO. 1 | SUBFRAME NO. 2 | SUBFRAME NO. 3 | SUBFRAME NO. 4 |
| I (NONE) | $I_p+89, I_p+109$ | $I_p+129, I_p+149$ | $I_p+169, I_p+189$ | $I_p+209, I_p+169$ |
| G (NONE) | $0.7G_p, 0.7G_p$ | $0.7G_p, 0.7G_p$ | $0.7G_p, 0.7G_p$ | $0.7G_p, 0.7G_p$ |
| L (NONE) | NONE | NONE | NONE | NONE |
| b (NONE) | 0 | 0 | 0 | 0 |
| $\omega_{i,f}$ (NONE) | $\omega_i = 0.9(\omega_{i,f-1} - \omega b_i) + \omega b_i$ | $\omega_i = 0.9(\omega_{i,f-1} - \omega b_i) + \omega b_i$ | $\omega_i = 0.9(\omega_{i,f-1} - \omega b_i) + \omega b_i$ | $\omega_i = 0.9(\omega_{i,f-1} - \omega b_i) + \omega b_i$ |

NOTE: $I_p$ AND $G_p$ ARE THE TO I AND G VALUES OF PREVIOUS DECODING SUBFRAME AND $\omega b_i$ IS THE BIAS VALUE OF $\omega_i$.

FIG. 21b

| RECEIVED PARAMETERS FOR ERROR FRAME | DECODE SUBFRAME PARAMETERS USED ||||
|---|---|---|---|---|
| | SUBFRAME NO. 1 | SUBFRAME NO. 2 | SUBFRAME NO. 3 | SUBFRAME NO. 4 |
| $I_1, I_8$ | $I_1, I_2$ | $I_3, I_4$ | $I_5, I_6$ | $I_7, I_8$ |
| $G_1, G_8$ | $G_1, G_2$ | $G_3, G_4$ | $G_5, G_6$ | $G_7, G_8$ |
| $L_1, L_4$ | NONE | NONE | NONE | NONE |
| $b_1, b_4$ | 0 | 0 | 0 | 0 |
| $\omega_{1,f}, \ldots \omega_{8,f}$ | $\omega_i = 0.75\omega_{i,f-1} + 0.25\omega_{i,f}$ | $\omega_i = 0.5\omega_{i,f-1} + 0.5\omega_{i,f}$ | $\omega_i = 0.25\omega_{i,f-1} + 0.75\omega_{i,f}$ | $\omega_i = \omega_{i,f}$ |

FIG. 21c

VARIABLE RATE VOCODER

This is a Continuation of application Ser. No. 07/713,661, filed Jun. 11, 1991, now abandoned.

BACKGROUND OF THE INVENTION

I. Field of the Invention

The present invention relates to speech processing. Specifically, the present invention relates to a novel and improved method and system for compressing speech wherein the amount of compression dynamically varies while minimally impacting the quality of the reconstructed speech. Furthermore, since the compressed speech data is intended to be sent over a channel which may introduce errors, the method and system of the present invention also minimizes the impact of channel errors on voice quality.

II. Description of the Related Art

Transmission of voice by digital techniques has become widespread, particularly in long distance and digital radio telephone applications. This, in turn, has created interest in determining the least amount of information which can be sent over the channel which maintains the perceived quality of the reconstructed speech. If speech is transmitted by simply sampling and digitizing, a data rate on the order of 64 kilobits per second (kbps) is required to achieve a speech quality of conventional analog telephone. However, through the use of speech analysis, followed by the appropriate coding, transmission, and resynthesis at the receiver, a significant reduction in the data rate can be achieved.

Devices which employ techniques to compress voiced speech by extracting parameters that relate to a model of human speech generation are typically called vocoders. Such devices are composed of an encoder, which analyzes the incoming speech to extract the relevant parameters, and a decoder, which resynthesizes the speech using the parameters which it receives over the transmission channel. In order to be accurate, the model must be constantly changing. Thus the speech is divided into blocks of time, or analysis flames, during which the parameters are calculated. The parameters are then updated for each new frame.

Of the various classes of speech coders the Code Excited Linear Predictive Coding (CELP), Stochastic Coding or Vector Excited Speech Coding are of one class. An example of a coding algorithm of this particular class is described in the paper "A 4.8 kbps Code Excited Linear Predictive Coder" by Thomas E. Tremain et al., *Proceedings of the Mobile Satellite Conference*, 1988.

The function of the vocoder is to compress the digitized speech signal into a low bit rate signal by removing all of the natural redundancies inherent in speech. Speech typically has short term redundancies due primarily to the filtering operation of the vocal tract, and long term redundancies due to the excitation of the vocal tract by the vocal cords. In a CELP coder, these operations are modelled by two filters, a short term formant filter and a long term pitch filter. Once these redundancies are removed, the resulting residual signal can be modelled as white gaussian noise, which also must be encoded. The basis of this technique is to compute the parameters of a filter, called the LPC filter, which performs short-term prediction of the speech waveform using a model of the human vocal tract. In addition, long-term effects, related to the pitch of the speech, are modeled by computing the parameters of a pitch filter, which essentially models the human vocal chords. Finally, these filters must be excited, and this is done by determining which one of a number of random excitation waveforms in a codebook results in the closest approximation to the original speech when the waveform excites the two filters mentioned above. Thus the transmitted parameters relate to three items (1) the LPC filter, (2) the pitch filter and (3) the codebook excitation.

Although the use of vocoding techniques further the objective in attempting to reduce the amount of information sent over the channel while maintaining quality reconstructed speech, other techniques need be employed to achieve further reduction. One technique previously used to reduce the amount of information sent is voice activity gating. In this technique no information is transmitted during pauses in speech. Although this technique achieves the desired result of data reduction, it suffers from several deficiencies.

In many cases, the quality of speech is reduced due to clipping of the initial parts of word. Another problem with gating the channel off during inactivity is that the system users perceive the lack of the background noise which normally accompanies speech and rate the quality of the channel as lower than a normal telephone call. A further problem with activity gating is that occasional sudden noises in the background may trigger the transmitter when no speech occurs, resulting in annoying bursts of noise at the receiver.

In an attempt to improve the quality of the synthesized speech in voice activity gating systems, synthesized comfort noise is added during the decoding process. Although some improvement in quality is achieved from adding comfort noise, it does not substantially improve the overall quality since the comfort noise does not model the actual background noise at the encoder.

A more preferred technique to accomplish data compression, so as to result in a reduction of information that needs to be sent, is to perform variable rate vocoding. Since speech inherently contains periods of silence, i.e. pauses, the amount of data required to represent these periods can be reduced. Variable rate vocoding most effectively exploits this fact by reducing the data rate for these periods of silence. A reduction in the data rate, as opposed to a complete halt in data transmission, for periods of silence overcomes the problems associated with voice activity gating while facilitating a reduction in transmitted information.

It is therefore an object of the present invention to provide a novel and improved method and system for compressing speech using a variable rate vocoding technique.

SUMMARY OF THE INVENTION

The present invention implements a vocoding algorithm of the previously mentioned class of speech coders, Code Excited Linear Predictive Coding (CELP), Stochastic Coding or Vector Excited Speech Coding. The CELP technique by itself does provide a significant reduction in the amount of data necessary to represent speech in a manner that upon resynthesis results in high quality speech. As mentioned previously the vocoder parameters are updated for each frame. The vocoder of the present invention provides a variable output data rate by changing the frequency and precision of the model parameters.

The present invention differs most markedly from the basic CELP technique by producing a variable output data rate based on speech activity. The structure is defined so that the parameters are updated less often, or with less precision, during pauses in speech. This technique allows for an even greater decrease in the amount of information to be transmitted. The phenomenon which is exploited to reduce the data rate is the voice activity factor, which is the average percentage of time a given speaker is actually talking during a conversation. For typical two-way telephone conversations, the average data rate is reduced by a factor of 2 or more. During pauses in speech, only background noise is being coded by the vocoder. At these times, some of the parameters relating to the human vocal tract model need not be transmitted.

As mentioned previously a prior approach to limiting the amount of information transmitted during silence is called voice activity gating, a technique in which no information is transmitted during moments of silence. On the receiving side the period may be filled in with synthesized "comfort noise". In contrast, a variable rate vocoder is continuously transmitting data which in the preferred embodiment is at rates which range between approximately 8 kbps and 1 kbps. A vocoder which provides a continuous transmission of data eliminates the need for synthesized "comfort noise", with the coding of the background noise providing a more natural quality to the resynthesized speech. The present invention therefore provides a significant improvement in resynthesized speech quality over that of voice activity gating by allowing a smooth transition between speech and background.

The present invention further incorporates a novel technique for masking the occurrence of errors. Because the data is intended for transmission over a channel that may be noisy, a radio link for example, it must accommodate errors in the data. Previous techniques using channel coding to reduce the number of errors encountered can provide some success in reducing errors. However, channel coding alone does not fully provide the level of errors protection necessary to ensure high quality in the reconstructed speech. In the variable rate vocoder where vocoding is occurring continuously, an error may destroy data relating to some interesting speech event, such as the start of a word or a syllable. A typical problem with linear prediction coding (LPC) based vocoders, is that errors in the parameters relating to the vocal tract model will cause sounds which are vaguely human-like, and which may change the sound of the original word enough to confuse the listener. In the present invention, errors are masked to decrease their perceptibility to the listener. Error masking thus as implemented in the present invention provides a drastic decrease in the affect of errors on speech intelligibility.

Because the maximum amount that any parameter can change is limited to smaller ranges at low rates, errors in the parameters transmitted at these rates will affect speech quality less. Since errors in the different rates have different perceived effects on speech quality, the transmission system can be optimized to give more protection to the higher rate data. Therefore as an added feature, the present invention provides a robustness to channel errors.

The present invention in implementing a variable rate output version of the CELP algorithm results in speech compression which dynamically varies from 8:1 to 64:1 depending on the voice activity. The just mentioned compression factors are cited with reference to a $\mu$law input, with the compression factors higher by a factor of 2 for a linear input. Rate determination is made on a frame by frame basis so as to take full advantage of the voice activity factor. Even though less data is produced for pauses in speech, the perceived degradation of the resynthesized background noise is minimized. Using the techniques of the present invention, near-toll quality speech can be achieved at a maximum data rate of 8 kbps and an average data rate on the order of 3.5 kbps in normal conversation.

Since the present invention enables short pauses in speech to be detected, a decrease in the effective voice activity factor is realized. Rate decisions can be made on a frame by frame basis with no hangover, so the data rate may be lowered for pauses in speech as short as the frame duration, typically 20 msec. in the preferred embodiment. Therefore pauses such as those between syllables may be captured. This technique decreases the voice activity factor beyond what has traditionally been considered, as not only long duration pauses between phrases, but also shorter pauses can be encoded at lower rates.

Since rate decisions are made on a frame basis, there is no clipping of the initial part of the word, such as in a voice activity gating system. Clipping of this nature occurs in voice activity gating system due to a delay between detection of the speech and a restart in transmission of data. Use of a rate decision based upon each frame results in speech where all transitions have a natural sound.

With the vocoder always transmitting, the speaker's ambient background noise will continually be heard on the receiving end thereby yielding a more natural sound during speech pauses. The present invention thus provides a smooth transition to background noise. What the listener hears in the background during speech will not suddenly change to a synthesized comfort noise during pauses as in a voice activity gating system.

Since background noise is continually vocoded for transmission, interesting events in the background can be sent with full clarity. In certain cases the interesting background noise may even be coded at the highest rate. Maximum rate coding may occur, for example, when there is someone talking loudly in the background, or if an ambulance drives by a user standing on a street corner. Constant or slowly varying background noise will, however, be encoded at low rates.

The use of variable rate vocoding has the promise of increasing the capacity of a Code Division Multiple Access (CDMA) based digital cellular telephone system by more than a factor of two. CDMA and variable rate vocoding are uniquely matched, since, with CDMA, the interference between channels drops automatically as the rate of data transmission over any channel decreases. In contrast, consider systems in which transmission slots are assigned, such as TDMA or FDMA. In order for such a system to take advantage of any drop in the rate of data transmission, external intervention is required to coordinate the reassignment of unused slots to other users. The inherent delay in such a scheme implies that the channel may be reassigned only during long speech pauses. Therefore, full advantage cannot be taken of the voice activity factor. However, with external coordination, variable rate vocoding is useful in systems other than CDMA because of the other mentioned reasons.

In a CDMA system speech quality can be slightly degraded at times when extra system capacity is desired. Abstractly speaking, the vocoder can be thought of as multiple vocoders all operating at different rates with different resultant speech qualities. Therefore the speech qualities can be mixed in order to further reduce the average rate of data transmission. Initial experiments show that by mixing full and half rate vocoded speech, e.g. the maximum allowable data rate is varied on a frame by frame basis between 8 kbps and 4 kbps, the resulting speech has a quality which is better than half rate variable, 4 kbps maximum, but not as good as full rate variable, 8 kbps maximum.

It is well known that in most telephone conversations, only one person talks at a time. As an additional function for full-duplex telephone links a rate interlock may be provided. If one direction of the link is transmitting at the highest transmission rate, then the other direction of the link is forced to transmit at the lowest rate. An interlock between the two directions of the link can guarantee no greater than 50% average utilization of each direction of the link. However, when the channel is gated off, such as the case for a rate interlock in activity gating, there is no way for a listener to interrupt the talker to take over the talker role in the conversation. The present invention readily provides the capability of a rate interlock by control signals which set the vocoding rate.

Finally, it should be noted that by using a variable rate vocoding scheme, signalling information can share the channel with speech data with a very minimal impact on speech quality. For example, a high rate frame may be split into two pieces, half for sending the lower rate voice data and the other half for the signalling data. In the vocoder of the preferred embodiment only a slight degradation in speech quality between full and half rate vocoded speech is realized. Therefore, the vocoding of speech at the lower rate for shared transmission with other data results in an almost imperceptible difference in speech quality to the user.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 1a-1e illustrates in graphical form the vocoder analysis frames and subframes for various rates;

FIGS. 2a-2d are a series of charts illustrating the vocoder output bit distribution for various rates;

FIGS. 20a-20d are charts illustrating the decoder received parameters and subframe decoding data for various rates;

FIGS. 21a-21c are charts further illustrating the decoder received parameters and subframe decoding data for special conditions;

DETAILED DESCRIPTION OF THE PREFERRED EMBODIMENT

Figure 3:
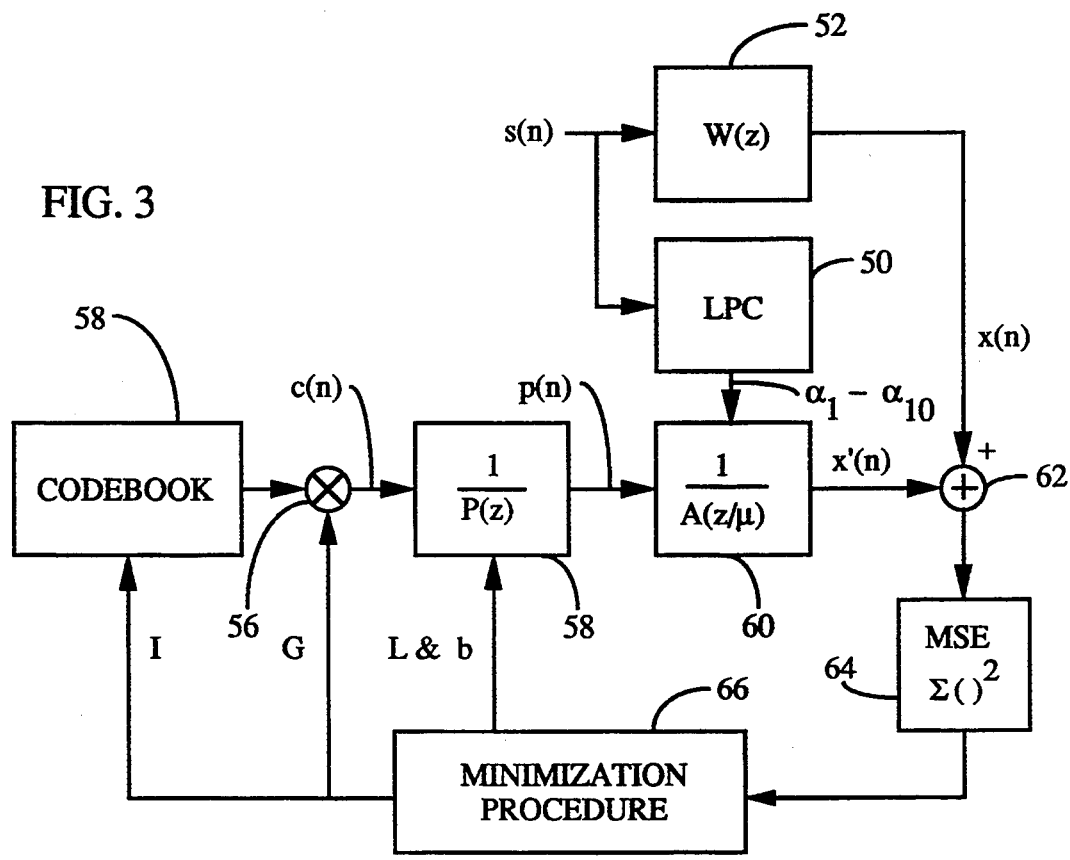
FIG. 3 is a generalized block diagram of an exemplary encoder.

In accordance with the present invention, sounds such as speech and/or background noise are sampled and digitized using well known techniques. For example the analog signal may be converted to a digital format by the standard 8 bit/$\mu$law format followed by a $\mu$law/uniform code conversion. In the alternative, the analog signal may be directly converted to digital form in a uniform pulse code modulation (PCM) format. Each sample in the preferred embodiment is thus represented by one 16 bit word of data. The samples are organized into frames of input data wherein each frame is comprised of a predetermined number of samples. In the exemplary embodiment disclosed herein an 8 kHz sampling rate is considered. Each frame is comprised of 160 samples or of 20 msec. of speech at the 8 kHz sampling rate. It should be understood that other sampling rates and frame sizes may be used.

The field of vocoding includes many different techniques for speech coding, one of which is the CELP coding technique. A summary of the CELP coding technique is described in the previously mentioned paper "A 4.8 kbps Code Excited Linear Predictive Coder". The present invention implements a form of the CELP coding techniques so as to provide a variable rate in coded speech data wherein the LPC analysis is performed upon a constant number of samples, and the pitch and codebook searchs are performed on varying numbers of samples depending upon the transmission rate. In concept the CELP coding techniques as applied to the present invention are discussed with reference to FIGS. 3 and 5.

In the preferred embodiment of the present invention, the speech analysis frames are 20 msec. in length, implying that the extracted parameters are transmitted in a burst 50 times per second. Furthermore the rate of data transmission is varied from roughly 8 kbps to 4 kbps to 2 kbps, and to 1 kbps. At full rate (also referred to as rate 1), data transmission is at an 8.55 kbps rate with the parameters encoded for each frame using 171 bits including an 11 bit internal CRC (Cyclic Redundancy Check). Absent the CRC bits the rate would be 8 kbps. At half rate (also referred to as rate ½), data transmission is at a 4 kbps rate with the parameters encoded for each frame using 80 bits. At quarter rate (also referred to as rate ¼), data transmission is at a 2 kbps rate with the parameters encoded for each frame using 40 bits. At eighth rate (also referred to as rate ⅛), data transmission is slightly less than a 1 kbps rate with the parameters encoded for each frame using 16 bits.

FIG. 1 graphically illustrates an exemplary analysis frame of speech data 10 and the relationship of a Hamming window 12 used in LPC analysis. LPC analysis frame, and pitch and codebook subframes for the different rates are illustrated in graphical form in FIGS. 2a–2d. It should be understood that the LPC analysis frame for all rates is the same size.

Referring now to the drawings, and in particular FIG. 1a, LPC analysis is accomplished using the 160 speech data samples of frame 10 which are windowed using Hamming window 12. As illustrated in FIG. 1a, the samples, s(n) are numbered 0–159 within each frame. Hamming window 12 is positioned such that it is offset within frame 10 by 60 samples. Thus Hamming window 12 starts at the $60^{th}$ sample, s(59), of the current data frame 10 and continues through and inclusive of the $59^{th}$ sample, s(58), of a following data frame 14. The weighted data generated for a current frame, frame 10, therefore also contains data that is based on data from the next frame, frame 14.

Depending upon the data transmission rate, searches are performed to compute the pitch filter and codebook excitation parameters multiple times on different subframes of data frame 10 as shown in FIGS. 1b–1e. It should be understood that in the preferred embodiment that only one rate is selected for frame 10 such that the pitch and codebook searches are done in various size subframes corresponding to the selected rate as described below. However for purposes of illustration, the subframe structure of the pitch and codebook searches for the various allowed rates of the preferred embodiment for frame 10 are shown in FIGS. 1b–1e.

At all rates, there is one LPC computation per frame 10 as illustrated in FIG. 1a. As illustrated in FIG. 1b, at full rate there are two codebook subframes 18 for each pitch subframe 16. At full rate there are four pitch updates, one for each of the four pitch subframes 16, each 40 samples long (5 msec.). Furthermore at full rate there are eight codebook updates, one for each of the eight codebook subframes 18, each 20 samples long (2.5 msec.).

At half rate, as illustrated in FIG. 1c, there are two codebook subframes 22 for each pitch subframe 20. Pitch is updated twice, once for each of the two pitch frames 20 while the codebook is updated four times, once for each of the four codebook subframe 22. At quarter rate, as illustrated in FIG. 1d, there are two codebook subframes 26 for the single pitch subframe 20. Pitch is updated once for pitch subframe 24 while the codebook twice, once for each of the two codebook subframe 26. As illustrated in FIG. 1e, at eighth rate, pitch is not determined and the codebook is updated only once in frame 28 which corresponds to frame 10.

Additionally, although the LPC coefficients are computed only once per frame, they are linearly interpolated, in a Line Spectral Pair (LSP) representation, up to four times using the resultant LSP frequencies from the previous frame to approximate the results of LPC analysis with the Hamming window centered on each subframe. The exception is that at full rate, the LPC coefficients are not interpolated for the codebook subframes. Further details on the LSP frequency computation is described later herein.

In addition to performing the pitch and codebook searches less often at lower rates, less bits are also allocated for the transmission of the LPC coefficients. The number of bits allocated at the various rates is shown in FIGS. 2a–2d. Each one of FIGS. 2a–2d represents the number of vocoder encoded data bits allocated to each 160 sample frame of speech. In FIGS. 2a–2d, the number in the respective LPC block 30a–30d is the number of bits used at the corresponding rate to encode the short term LPC coefficients. In the preferred embodiment the number of bits used to encode the LPC coefficients at full, half, quarter and eighth rates are respectively 40, 20, 10 and 10.

In order to implement variable rate coding, the LPCs are first transformed into Line Spectrum Pairs (LSP) and the resulting LSP frequencies are individually encoded using DPCM coders. The LPC order is 10, such that there are 10 LSP frequencies and 10 independent DPCM coders. The bit allocation for the DPCM coders is according to Table I.

TABLE I

| | DPCM CODER NUMBER | | | | | | | | | |
|---|---|---|---|---|---|---|---|---|---|---|
| | 1 | 2 | 3 | 4 | 5 | 6 | 7 | 8 | 9 | 10 |
| RATE 1 | 4 | 4 | 4 | 4 | 4 | 4 | 4 | 4 | 4 | 4 |
| RATE ½ | 2 | 2 | 2 | 2 | 2 | 2 | 2 | 2 | 2 | 2 |
| RATE ¼ | 1 | 1 | 1 | 1 | 1 | 1 | 1 | 1 | 1 | 1 |
| RATE ⅛ | 1 | 1 | 1 | 1 | 1 | 1 | 1 | 1 | 1 | 1 |

Both at the encoder and the decoder the LSP frequencies are converted back to LPC filter coefficients before for use in the pitch and codebook searches.

With respect to the pitch search, at full rate as illustrated in FIG. 2a, the pitch update is computed four times, once for each quarter of the speech frame. For each pitch update at the full rate, 10 bits are used to encode the new pitch parameters. Pitch updates are done a varying numbers of times for the other rates as shown in FIGS. 2b–2d. As the rate decreases the number of pitch updates also decreases. FIG. 2b illustrates the pitch updates for half rate which are computed twice, once for each half of the speech frame. Similarly FIG. 2c illustrates the pitch updates for quarter rate which is computed once every full speech frame. As was for full rate, 10 bits are used to encode the new pitch parameters for each half and quarter rate pitch update. However for eighth rate, as illustrated in FIG. 2d, no pitch update is computed since this rate is used to encode frames when little or no speech is present and pitch redundancies do not exist.

For each 10 bit pitch update, 7 bits represent the pitch lag and 3 bits represent the pitch gain. The pitch lag is limited to be between 17 and 143. The pitch gain is linearly quantized to between 0 and 2 for representation by the 3 bit value.

With respect to the codebook search, at full rate as illustrated in FIG. 2a, the codebook update is computed eight times, once for each eighth of the speech frame. For each codebook update at the full rate, 10 bits are used to encode the new codebook parameters. Codebook updates are done a varying number of times in the other rates as shown in FIGS. 2b–2d. However, as the rate decreases the number of codebook updates also decreases. FIGS. 2b illustrates the codebook updates for half rate which is computed four times, once for each quarter of the speech frame. FIG. 2c illustrates the codebook updates for quarter rate which is computed twice, once for each half of the speech frame. As was for full rate, 10 bits are used to encode the new codebook parameters for each half and quarter rate pitch update. Finally, FIG. 2d illustrates the codebook updates for eighth rate which is computed once every full speech frame. It should be noted that at eighth rate 6 are transmitted, 2 bits representative of the codebook gain while the other 4 bits are random bits. Further discussion on the bit allocations for the codebook updates are described in further detail below.

The bits allocated for the codebook updates represent the data bits needed to vector quantize the pitch prediction residual. For full, half and quarter rates, each codebook update is comprised of 7 bits of codebook index plus 3 bits of codebook gain for a total of 10 bits. The codebook gain is encoded using a differential pulse code modulation (DPCM) coder operating in the log domain. Although a similar bit arrangement can be used for eighth rate, an alternate scheme is preferred. At eighth rate codebook gain is represented by 2 bits while 4 randomly generated bits are used with the received data as a seed to a pseudorandom number generator which replaces the codebook.

Referring to the encoder block diagram illustrated in FIG. 3, the LPC analysis is done in an open-loop mode. From each frame of input speech samples s(n) the LPC coefficients ($\alpha_1$–$\alpha_{10}$) are computed, as described later, by LPC analysis/quantization 50 for use in formant synthesis filter 60.

The computation of the pitch search, however, is done in a closed-loop mode, often referred to as an analysis-by-synthesis method. However, in the exemplary implementation novel hybrid closed-loop/open-loop technique is used in conducting the pitch search. In the pitch search encoding is performed by selecting parameters which minimize the mean square error between the input speech and the synthesized speech. For purposes of simplification in this portion of the discussion the issue of rate is not considered. However further discussion on the effect of the selected rate on pitch and codebook searches is discussed in more detail later herein.

In the conceptual embodiment illustrated in FIG. 3, perceptual weighting filter 52 is characterized by the following equations:

$$W(z) = \frac{A(z)}{A(z/\mu)} \quad (1)$$

where $$A(z) = 1 - \sum_{i=1}^{10} a_i z^{-i} \quad (2)$$

is the formant prediction filter and $\mu$ is a perceptual weighting parameter, which in the exemplary embodiment $\mu = 0.8$. Pitch synthesis filter 58 is characterized by the following equation:

$$\frac{1}{P(z)} = \frac{1}{1 - bz^{-L}} \quad (3)$$

Formant synthesis filter 60, a weighted filter as discussed below, is characterized by the following equation:

$$H(z) = \left(\frac{1}{A(z)}\right)W(z) = \frac{1}{A(z/\mu)}. \quad (4)$$

The input speech samples s(n) are weighted by perceptual weighting filter 52 so that the weighted speech samples x(n) are provided to a sum input of adder 62. Perceptual weighting is utilized to weight the error at the frequencies where there is less signal power. It is at these low signal power frequencies that the noise is more perceptually noticeable. The synthesized speech samples x'(n) are output from formant synthesis filter 60 to a difference input of adder 62 where subtracted from the x(n) samples. The difference in samples output from adder 62 are input to mean square error (MSE) element 64 where they are squared and then summed. The results of MSE element 64 are provided to minimization element 66 which generates values for pitch lag L, pitch gain b, codebook index I and codebook gain.

In minimization element 66 all possible values for L, the pitch lag parameter in P(z), are input to pitch synthesis filter 58 along with the value c(n) from multiplier 56. During the pitch search there is no contribution from the codebook, i.e. c(n)=0. The values of L and b that minimize the weighted error between the input speech and the synthesized speech are chosen by minimization element 66. Pitch synthesis filter 58 generates and outputs the value p(n) to formant synthesis filter 60. Once the pitch lag L and the pitch gain b for the pitch filter are found, the codebook search is performed in a similar manner.

It should be understood that FIG. 3 is a conceptual representation of the analysis-by-synthesis approach taken in the present invention. In the exemplary implementation of the present invention, the filters are not used in the typical closed loop feedback configuration. In the present invention, the feedback connection is broken during the search and replaced with an open loop formant residual, the details of which are provided later herein.

Minimization element 66 then generates values for codebook index I and codebook gain G. The output values from codebook 54, selected from a plurality of random gaussian vector values according to the codebook index I, are multiplied in multiplier 56 by the codebook gain G to produce the sequence of values c(n) used in pitch synthesis filter 58. The codebook index I and the codebook gain G that minimize the mean square error are chosen for transmission.

It should be noted that perceptual weighting W(z) is applied to both the input speech by perceptual weighting filter 52 and the synthesized speech by the weighting function incorporated within formant synthesis filter 60. Formant synthesis filter 60 is therefore actually a weighted formant synthesis filter, which combines the weighting function of equation 1 with the typical formant prediction filter characteristic 1/A(z) to result in the weighted formant synthesis function of equation 3.

It should be understood that in the alternative, perceptual weighting filter 52 may be placed between adder 62 and MSE element 64. In this case formant synthesis filter 60 would have the normal filter characteristic of 1/A(z).

Figure 4:
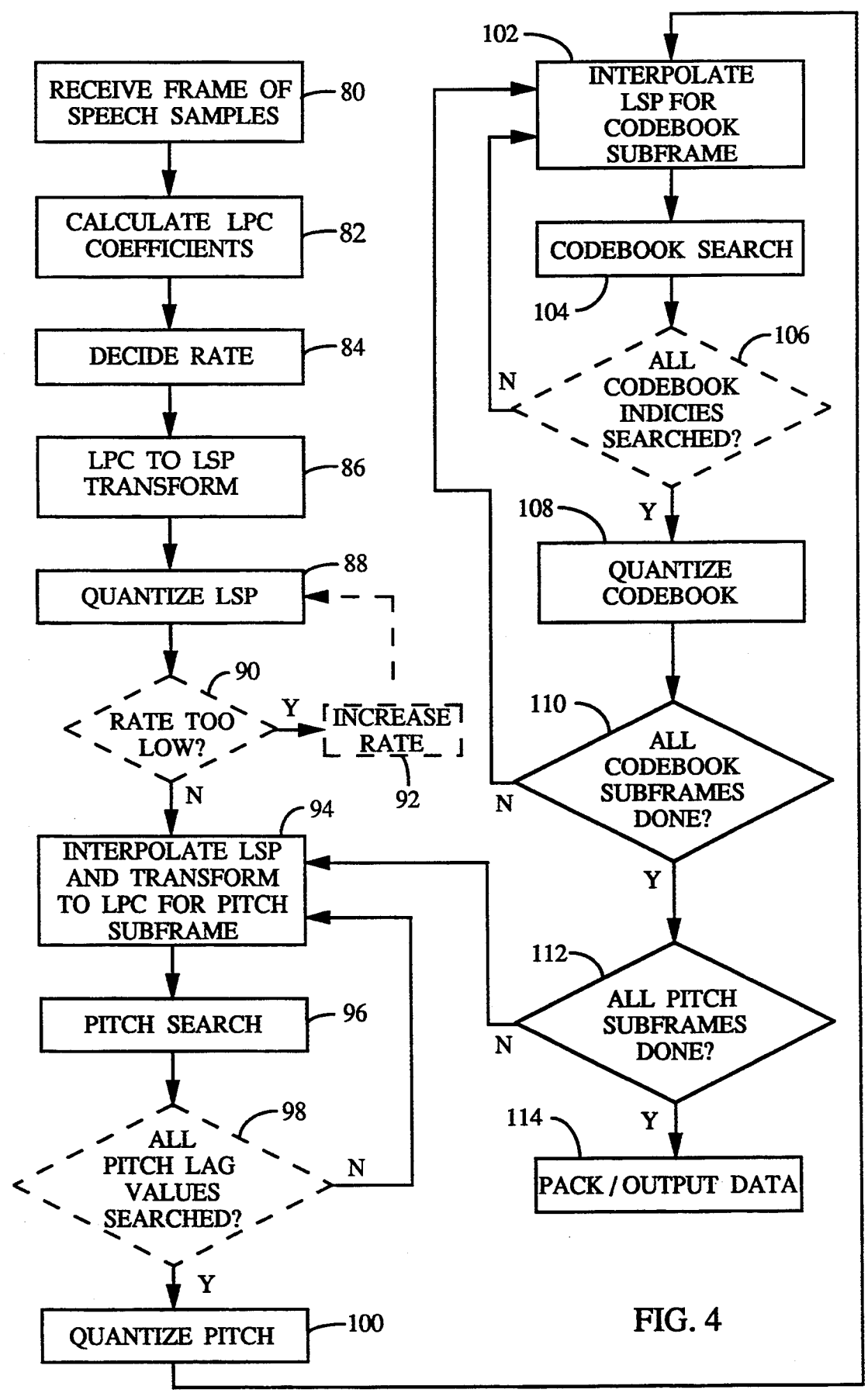
FIG. 4 is an encoder flow chart.

FIG. 4 illustrates a flow chart of the steps involved in encoding speech with the encoder of FIG. 3. For purposes of explanation steps involving rate decision are included in the flow chart of FIG. 4. The digitized speech samples are obtained, block 80, from the sampling circuitry from which the LPC coefficients are then calculated, block 82. As part of the LPC coefficient calculation Hamming window and autocorrelation techniques are used. An initial rate decision is made, block 84, for the frame of interest based on frame energy in the preferred embodiment.

In order to efficiently code the LPC coefficients in a small number of bits, the LPC coefficients are transformed into Line Spectrum Pair (LSP) frequencies, block 86, and then quantized, block 88, for transmission. As an option an additional rate determination may be made, block 90, with an increase in the rate being made if the quantization of the LSPs for the initial rate is deemed insufficient, block 92.

For the first pitch subframe of the speech frame under analysis the LSP frequencies are interpolated and transformed to LPC coefficients, block 94, for use in conducting the pitch search. In the pitch search the codebook excitation is set to zero. In the pitch search, blocks 96 and 98, which is an analysis by synthesis method as previously discussed, for each possible pitch lag L the synthesized speech is compared with the original speech. For each value of L, an integer value, the optimum pitch gain b is determined. Of the sets of L and b values, the optimal L and b value set provide the minimum perceptually weighted mean square error between the synthesized speech and the original speech. For the determined optimum values of L and b for that pitch subframe, the value b is quantized, block 100, fox; transmission along with the corresponding L value. In an alternate implementation of the pitch search, the values b and L may be quantized values as part of the pitch search with these quantized values being used in conducting the pitch search. Therefore, in this implementation the need for quantization of the selected b value after the pitch search, block 100, is eliminated.

For the first codebook subframe of the speech frame under analysis the LSP frequencies are interpolated and transformed to LPC coefficients, block 102, for use in conducting the codebook search. In the exemplary embodiment however, at full rate the LSP frequencies are interpolated only down to the pitch subframe level. This interpolation and transformation step is performed for the codebook search in addition to that of the pitch search due to a difference in pitch and codebook subframe sizes for each rate, except for rate ⅛ where the issue is moot since no pitch data is computed. In the codebook search, blocks 104 and 106, the optimum pitch lag L and pitch gain b values are used in the pitch synthesis filter such that for each possible codebook index I the synthesized speech is compared with the original speech. For each value of I, an integer value, the optimum codebook gain G is determined. Of the sets of I and G values, the optimal I and G value set provides the minimum error between the synthesized speech and the original speech. For the determined optimum values of I and G for that codebook subframe, the value G is quantized, block 108, for transmission along with the corresponding I value. Again in an alternate implementation of the codebook search, the value of G may quantized as part of the codebook search with these quantized values being used in conducting the codebook search. In this alternate implementation the need for quantization of the selected G value after the codebook search, block 108, is eliminated.

After the codebook search a decoder within the encoder is run on the optimal values of I, G, L and b. Running of the encoder's decoder reconstructs the encoder filter memories for use in future subframes.

A check is then made block 110, to determine whether the codebook subframe upon which analysis was just completed was the last codebook subframe of the set of codebook subframes corresponding to the pitch subframe for which the pitch search was conducted. In other words a determination is made as to whether there are any more codebook subframes which correspond to the pitch subframe. In the exemplary embodiment there are only two codebook subframes per pitch subframe. If it is determined that there is another codebook subframe which corresponds to the pitch frame, steps 102–108 are repeated for that codebook subframe.

Should there be no more codebook subframes corresponding to the pitch frame, a check is made, block 112, to determine whether any other pitch subframes exist within the speech frame under analysis. If there is another pitch subframe in the current speech frame under analysis, steps 94–110 are repeated for each pitch subframe and corresponding codebook subframes. When all computations for the current speech frame under analysis are completed, values representative of the LPC coefficients for the speech frame, the pitch lag L and gain b for each pitch subframe, and the codebook index I and gain G for each codebook subframe are packed for transmission, block 114.

Figure 5:
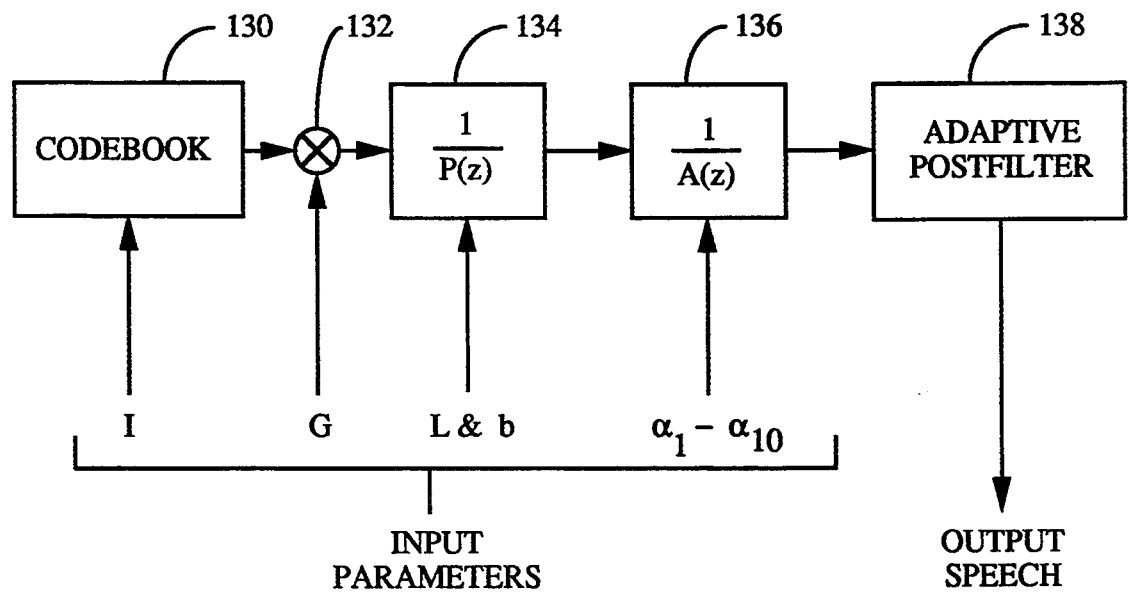
FIG. 5 is a generalized block diagram of an exemplary decoder.

Referring to FIG. 5, a decoder block diagram is illustrated wherein the received values for the LPC coefficients ($a_i$'s), pitch lags and gains (L & b), and codebook indices and gains (I & G) are used to synthesize the speech. Again in FIG. 5, as is FIG. 3, rate information is not considered for purposes in simplification of the discussion. Data rate information can be sent as side information and in some instances can be derived at the channel demodulation stage.

The decoder is comprised of codebook 130 which is provided with the received codebook indices, or for eighth rate the random seed. The output from codebook 130 is provided to one input of multiplier 132 while the other input of multiplier 132 receives the codebook gain G. The output of multiplier 132 is provided along with the pitch lag L and gain b to pitch synthesis filter 134. The output from pitch synthesis filter 134 is provided along with the LPC coefficients $a_i$ to formant synthesis filter 136. The output from formant synthesis filter 136 is provided to adaptive postfilter 138 where filtered and output therefrom is the reconstructed speech. As discussed later herein, a version of the decoder is implemented within the encoder. The encoder's decoder does not include adaptive postfilter 138, but does include a perceptual weighting filter.

Figure 6:
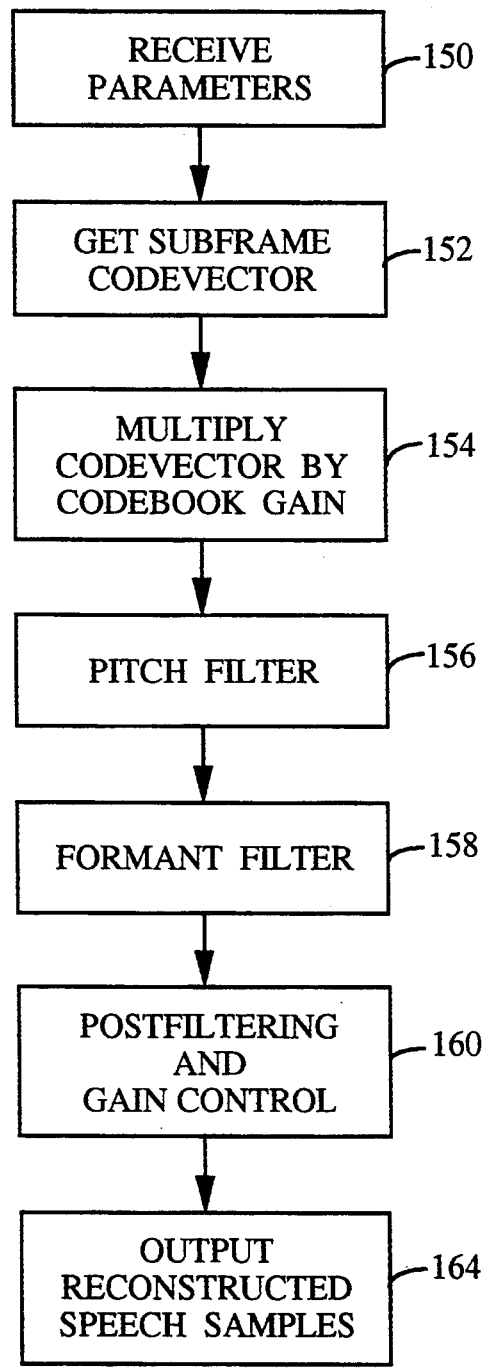
FIG. 6 is a decoder flow chart.

FIG. 6 is a flow chart corresponding to the operation of the decoder of FIG. 5. At the decoder, speech is reconstructed from the received parameters, block 150. In particular, the received value of the codebook index is input to the codebook which generates a codevector, or codebook output value, block 152. The multiplier receives the codevector along with the received codebook gain G and multiplies these values, block 154, with the resulting signal provided to the pitch synthesis filter.

It should be noted that the codebook gain G is reconstructed by decoding and inverse quantizing the received DPCM parameters. The pitch synthesis filter is provided with the received pitch lag L and gain b values along with the multiplier output signal so as to filter the multiplier output, block 156.

The values resulting from filtering the codebook vector by the pitch synthesis filter are input to the formant synthesis filter. Also provided to the formant synthesis filter are LPC coefficients $\alpha_i$'s for use in filtering the pitch synthesis filter output signal, block 158. The LPC coefficients are reconstructed at the decoder for interpolation by decoding the received DPCM parameters into quantized LSP frequencies, inverse quantizing the LSP frequencies and transforming the LSP frequencies to LPC coefficients $\alpha_i$'s. The output from the formant synthesis filter is provided to the adaptive postfilter where quantization noise is masked, and the reconstructed speech is gain controlled, block 160. The reconstructed speech is output, block 162, for conversion to analog form.

Figure 7B:
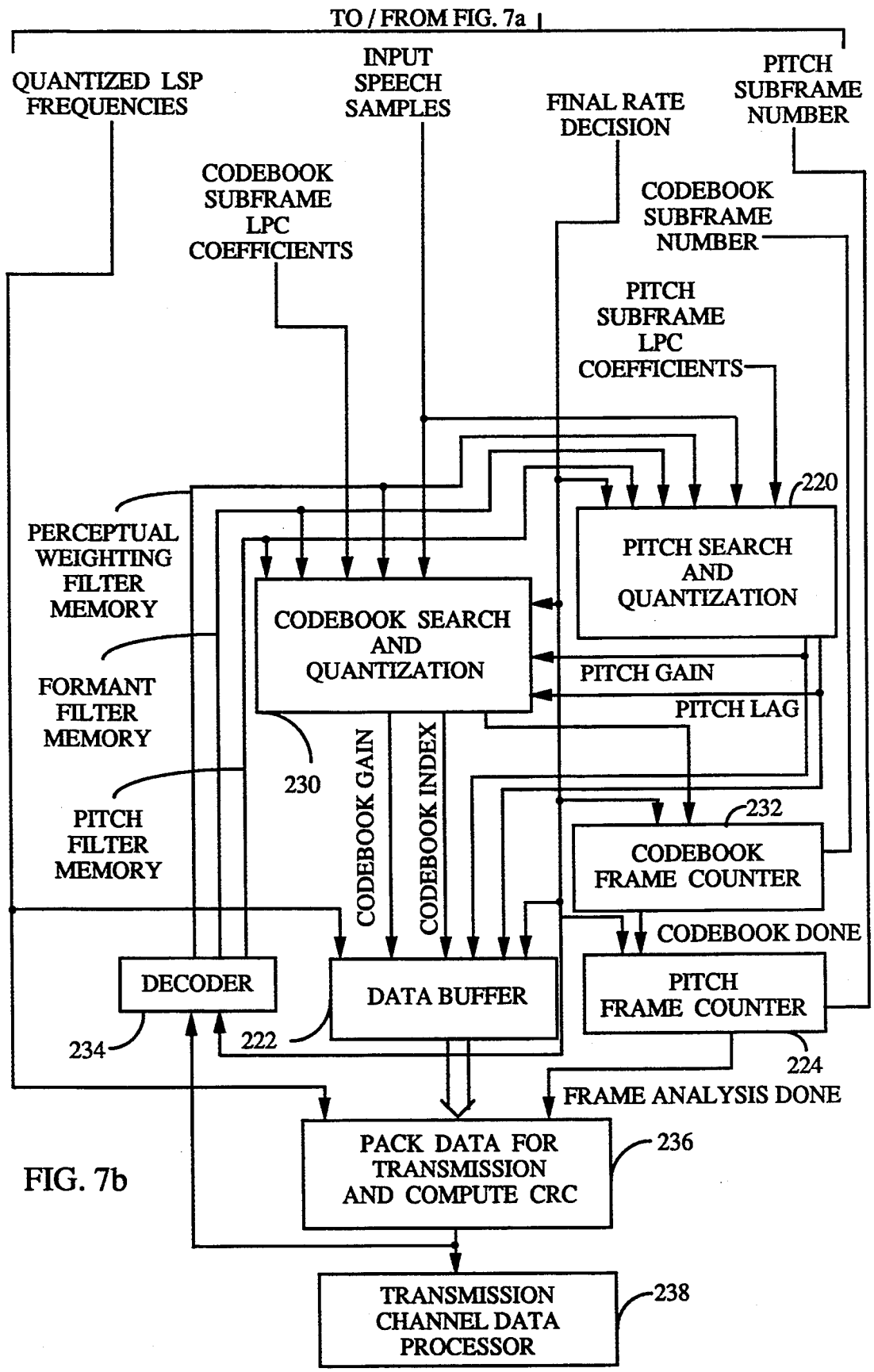
FIG. 7 is a more detailed functional block diagram of the encoder.

Referring now to the block diagram illustration of FIGS. 7a and 7b, further details on the speech encoding techniques of the present invention are described. In FIG. 7a, each frame of digitized speech samples is provided to a Hamming window subsystem 200 where the input speech is windowed before computation of the autocorrelation coefficients in autocorrelation subsystem 202.

Figure 8:
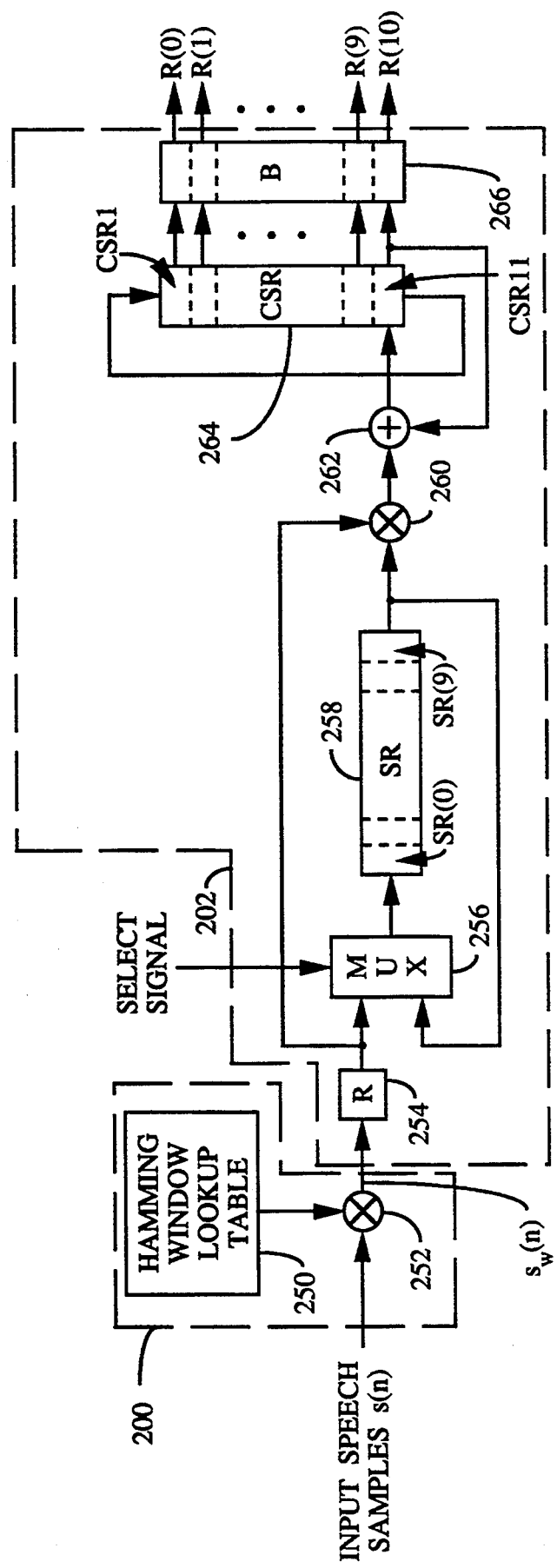
FIG. 8 is a block diagram of an exemplary Hamming window and autocorrelation subsystems.

Hamming window subsystem 200 and autocorrelation subsystem 202 are illustrated in an exemplary implementation in FIG. 8. Hamming window subsystem 200 which is comprised of lookup table 250, typically an a 80×16 bit Read Only Memory (ROM), and multiplier 252. For each rate the window of speech is centered between the 139th and the 140th sample of each analysis frame which is 160 samples long. The window for computing the autocorrelation coefficients is thus offset from the analysis frame by 60 samples.

Windowing is done using a ROM table containing 80 of the 160 $W_H(n)$ values, since the Hamming window is symmetric around the center. The offset of the Hamming window is accomplished by skewing the address pointer of the ROM by 60 positions with respect to the first sample of an analysis frame. These values are multiplied in single precision with the corresponding input speech samples by multiplier 252. Let s(n) be the input speech signal in the analysis window. The windowed speech signal $s_w(n)$ is thus defined by:

$$s_w(n) = s(n+60)W_H(n) \text{ for } 0 <= n <= 79 \quad (5)$$

and $$s_w(n) = s(n+60)W_H(159-n) \text{ for } 80 <= n <= 159. \quad (6)$$

Exemplary values, in hexadecimal, of the contents of lookup table 250 are set forth in Table II. These values are interpreted as two's complement numbers having 14 fractional bits with the table being read in the order of left to right, top to bottom.

TABLE II

| | | | | | | | |
|---|---|---|---|---|---|---|---|
| 0 × 051f | 0 × 0525 | 0 × 0536 | 0 × 0554 | 0 × 057d | 0 × 05b1 | 0 × 05f2 | 0 × 063d |
| 0 × 0694 | 0 × 06f6 | 0 × 0764 | 0 × 07dc | 0 × 085e | 0 × 08ec | 0 × 0983 | 0 × 0a24 |
| 0 × 0ad0 | 0 × 0b84 | 0 × 0c42 | 0 × 0d09 | 0 × 0dd9 | 0 × 0eb0 | 0 × 0f90 | 0 × 1077 |
| 0 × 1166 | 0 × 125b | 0 × 1357 | 0 × 1459 | 0 × 1560 | 0 × 166d | 0 × 177f | 0 × 1895 |
| 0 × 19af | 0 × 1acd | 0 × 1bee | 0 × 1d11 | 0 × 1e37 | 0 × 1f5e | 0 × 2087 | 0 × 21b0 |
| 0 × 22da | 0 × 2403 | 0 × 252d | 0 × 2655 | 0 × 277b | 0 × 28a0 | 0 × 29c2 | 0 × 2ae1 |
| 0 × 2bfd | 0 × 2d15 | 0 × 2e29 | 0 × 2f39 | 0 × 3043 | 0 × 3148 | 0 × 3247 | 0 × 333f |
| 0 × 3431 | 0 × 351c | 0 × 3600 | 0 × 36db | 0 × 37af | 0 × 387a | 0 × 393d | 0 × 39f6 |
| 0 × 3aa6 | 0 × 3b4c | 0 × 3be9 | 0 × 3c7b | 0 × 3d03 | 0 × 3d80 | 0 × 3df3 | 0 × 3e5b |
| 0 × 3eb7 | 0 × 3f09 | 0 × 3f4f | 0 × 3f89 | 0 × 3fb8 | 0 × 3fdb | 0 × 3ff3 | 0 × 3fff |

Autocorrelation subsystem 202 is comprised of register 254, multiplexer 256, shift register 258, multiplier 260, adder 262, circular shift register 264 and buffer 266. The windowed speech samples $s_w(n)$ are computed every 20 msec. and latched into register 254. On sample $s_w(0)$, the first sample of an LPC analysis frame, shift registers 258 and 264 are reset to 0. On each new sample $s_w(n)$, multiplexer 256 receives a new sample select signal which allows the sample to enter from register 254. The new sample $s_w(n)$ is also provided to multiplier 260 where multiplied by the sample $s_w(n-10)$, which is in the last position SR10 of shift register 258. The resultant value is added in adder 262 with the value in the last position CSR11 of circular shift register 264.

Shift registers 258 and 260 clocked once, replacing $s_w(n-1)$ by $s_w(n)$ in the first position SR1 of shift register 258 and replacing the value previously in position CSR10. Upon clocking of shift register 258 the new sample select signal is removed from input to multiplexer 256 such that the sample $s_w(n-9)$ currently in the position SR10 of shift register 260 is allowed to enter multiplexer 256. In circular shift register 264 the value previously in position CSR11 is shifted into the first position CSR1. With the new sample select signal removed from multiplexer, shift register 258 is set to provide a circular shift of the data in the shift register like that of circular shift register 264.

Shift registers 258 and 264 are both clocked 11 times in all for every sample such that 11 multiply/accumulate operations are performed. After 160 samples have been clocked in, the autocorrelation results, which are contained in circular shift register 264, are clocked into buffer 266 as the values R(0)–R(10). All shift registers are reset to zero, and the process repeats for the next frame of windowed speech samples.

Referring back to FIG. 7a, once the autocorrelation coefficients have been computed for the speech frame, a rate determination subsystem 204 and an LPC analysis subsystem 206 use this data to respectively compute a frame data rate and LPC coefficients. Since these operations are independent from one another they may be computed in any order or even simultaneously. For purposes of explanation herein, the rate determination is described first.

Rate determination subsystem 204 has two functions: (1) to determine the rate of the current frame, and (2) to compute a new estimate of the background noise level. The rate for the current analysis frame is initially determined based on the current frame's energy, the previous estimate of the background noise level, the previous rate, and the rate command from a controlling microprocessor. The new background noise level is estimated using the previous estimate of the background noise level and the current frame energy.

The present invention utilizes an adaptive thresholding technique for rate determination. As the background noise changes so do the thresholds which are used in selecting the rate. In the exemplary embodiment, three thresholds are computed to determine a preliminary rate selection $RT_p$. The thresholds are quadratic functions of the previous background noise estimate, and are shown below:

$$T1(B) = -5.544613(10^{-6})B^2 + 4.047152B + 363.1293; \quad (7)$$

$$T2(B) = -1.529733(10^{-5})B^2 + 8.750045B + 1136.214; \quad (8)$$

and $$T3(B) = -3.957050(10^{-5})B^2 + 18.89962B + 3346.789 \quad (9)$$

where B is the previous background noise estimate.

The frame energy is compared to the three thresholds T1(B), T2(B) and T3(B). If the frame energy is below all three thresholds, the lowest rate of transmission (1 kbps), rate ⅛ where $RT_p = 4$, is selected. If the frame energy is below two thresholds, the second rate of transmission (2 kbps), rate ¼ where $RT_p = 3$, is selected. If the frame energy is below only one threshold, the third rate of transmission (4 kbps), rate ½ where $RT_p = 2$, is selected. If the frame energy is above all of the thresholds, the highest rate of transmission (8 kbps), rate 1 where $RT_p = 1$, is selected.

The preliminary rate $RT_p$ may then be modified based on the previous frame final rate $RT_r$. If the preliminary rate $RT_p$ is less than the previous frame final rate minus one ($RT_r - 1$), an intermediate rate $RT_m$ is set where $RT_m = (RT_r - 1)$. This modification process causes the rate to slowly ramp down when a transition from a high energy signal to a low energy signal occurs. However should the initial rate selection be equal to or greater than the previous rate minus one ($RT_r - 1$), the intermediate rate $RT_m$ is set to the same as the preliminary rate $RT_p$, i.e. $RT_m = RT_p$. In this situation the rate thus immediately increases when a transition from a low energy signal to a high energy signal occurs.

Finally, the intermediate rate $RT_m$ is further modified by rate bound commands from a microprocessor. If the rate $RT_m$ is greater than the highest rate allowed by the microprocessor, the initial rate $RT_i$ is set to the highest allowable value. Similarly, if the intermediate rate $RT_m$ is less than the lowest rate allowed by the microprocessor, the initial rate $RT_i$ is set to the lowest allowable value.

In certain cases it may be desirable to code all speech at a rate determined by the microprocessor. The rate bound commands can be used to set the frame rate at the desired rate by setting the maximum and minimum allowable rates to the desired rate. The rate bound commands can be used for special rate control situations such as rate interlock, and dim and burst transmission, both described later. In an alternate embodiment the LPC coefficients can be calculated prior to the rate determination. Since the calculated LPC coefficients reflect the spectral properties of the input speech frame, the coefficients can be used as an indication of speech activity. Thus, the rate determination can be done based upon the calculated LPC coefficients.

Figure 9:
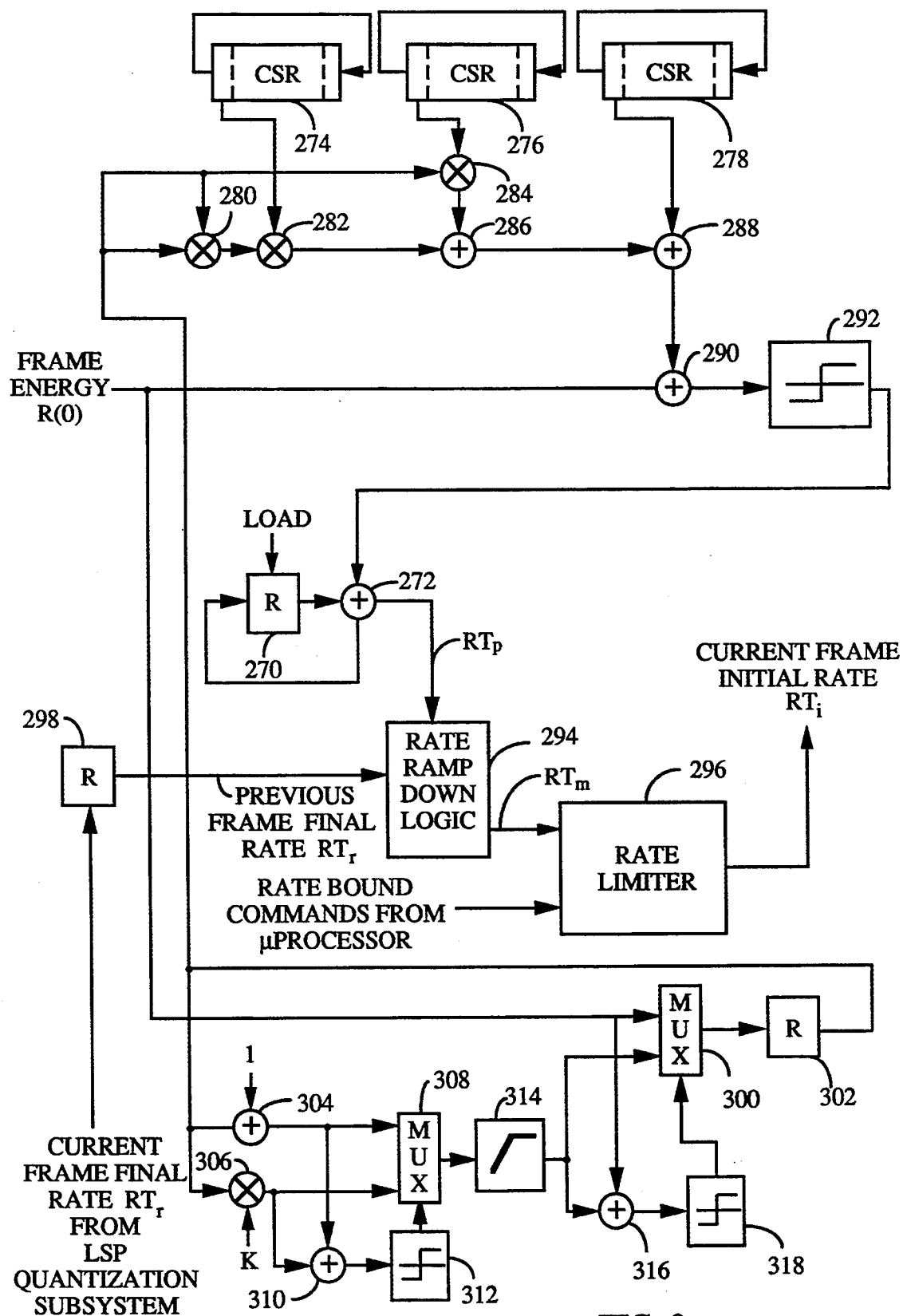
FIG. 9 is a is a block diagram of an exemplary rate determination subsystem.

FIG. 9 provides an exemplary implementation of the rate decision algorithm. To start the computation, register 270 is preloaded with the value 1 which is provided to adder 272. Circular shift registers 274, 276 and 278 are respectively loaded with the first, second and third coefficients of the quadratic threshold equations (7)–(9). For example, the last, middle and first positions of circular shift register 274 are respectively loaded with the first coefficient of the equations from which T1, T2 and T3 are computed. Similarly, the last, middle and first positions of circular shift register 276 are respectively loaded with the second coefficient of the equations from which T1, T2 and T3 are computed. Finally, the last, middle and first positions of circular shift register 278 are respectively loaded with the constant term of the equations from which T1, T2 and T3 are computed. In each of circular shift registers 274, 276 and 278, the value is output from the last position.

In computing the first threshold T1 the previous frame background noise estimate B is squared by multiplying the value by itself in multiplier 280. The resultant $B^2$ value is multiplied by the first coefficient, $5.544613(10^{-6})$, which is output from the last position of circular shift register 274. This resultant value is added in adder 286 with the product of the background noise B and the second coefficient, 4.047152, output from the last position of circular shift register 276, from multiplier 284. The output value from adder 286 is then added in adder 288 with the constant term, 363.1293, output from the last position of circular shift register 278. The output from adder 288 is the computed value of T1.

The computed value of T1 output from adder 290 is subtracted in adder 288 from the frame energy value $E_f$ which in the exemplary embodiment is the value R(0) in the linear domain, provided from the autocorrelation subsystem.

In an alternative implementation, frame energy $E_f$ may also be represented in the log domain in dB where it is approximated by the log of the first autocorrelation coefficient R(0) normalized by the effective window length:

$$E_f = 10\log_{10}\frac{R(0)}{L_A/2} \quad (10)$$

where $L_A$ is the autocorrelation window length. It should also be understood that voice activity may also be measured from various other parameters including pitch prediction gain or formant prediction gain $G_a$:

$$G_a = 10\log_{10}\frac{E^{(10)}}{E^{(0)}} \quad (11)$$

where $E^{(10)}$ is the prediction residual energy after the 10th iteration and $E^{(0)}$ is the initial LPC prediction residual energy, as described later with respect to LPC analysis, which is the same as R(0).

From the output of adder 290, the complement of the sign bit of the resulting two's complement difference is extracted by comparator or limiter 292 and provided to adder 272 where added with the output of register 270. Thus, if the difference between R(0) and T1 is positive, register 270 is incremented by one. If the difference is negative, register 270 remains the same.

Circular registers 274, 276 and 278 are then cycled so the coefficients of the equation for T2, equation (8) appear at the output thereof. The process of computing the threshold value T2 and comparing it with the frame energy is repeated as was discussed with respect to the process for threshold value T1. Circular registers 274, 276 and 278 are then again cycled so the coefficients of the equation for T3, equation (9) appear at the output thereof. The computation for threshold value T3 and comparison to the frame energy as was described above. After completion of all three threshold computations and comparisons, register 270 contains the initial rate estimate $RT_i$. The preliminary rate estimate $RT_p$ is provided to rate ramp down logic 294. Also provided to logic 294 is the previous frame final rate $RT_r$ from LSP frequency quantization subsystem that is stored in register 298. Logic 296 computes the value $(RT_r-1)$ and provides as an output the larger of the preliminary rate estimate $RT_p$ and the value $(RT_r-1)$. The value $RT_m$ is provided to rate limiter logic 296.

As mentioned previously, the microprocessor provides rate bound commands to the vocoder, particularly to logic 296. In a digital signal processor implementation, this command is received in logic 296 before the LPC analysis portion of the encoding process is completed. Logic 296 ensures that the rate does not exceed the rate bounds and modifies the value $RT_m$ should it exceed the bounds. Should the value $RT_m$ be within the range of allowable rates it is output from logic 296 as the initial rate value $RT_i$. The initial rate value $RT_i$ is output from logic 296 to LSP quantization subsystem 210 of FIG. 7a.

The background noise estimate as mentioned previously is used in computing the adaptive rate thresholds. For the current frame the previous frame background noise estimate B is used in establishing the rate thresholds for the current frame. However for each frame the background noise estimate is updated for use in determining the rate thresholds for the next frame. The new background noise estimate B' is determined in the current frame based on the previous frame background noise estimate B and the current frame energy $E_f$.

In determining the new background noise estimate B' for use during the next frame (as the previous frame background noise estimate B) two values are computed. The first value $V_1$ is simply the current frame energy $E_f$. The second value $V_2$ is the larger of B+1 and KB, where K=1.00547. To prevent the second value from growing too large, it is forced to be below a large constant M=160,000. The smaller of the two values $V_1$ or $V_2$ is chosen as the new background noise estimate B'.

Mathematically,
$$V_1 = R(0) \tag{12}$$

$$V_2 = \min(160000, \max(KB, B+1)) \tag{13}$$

and the new background noise estimate B' is:
$$B' = \min(V_1, V_2) \tag{14}$$

where min (x,y) is the minimum of x and y, and max (x,y) is the maximum of x and y.

FIG. 9 further shows an exemplary implementation of the background noise estimation algorithm. The first value $V_1$ is simply the current frame energy $E_f$ provided directly to one input of multiplexer 300.

The second value $V_2$ is computed from the values KB and B+1, which are first computed. In computing the values KB and B+1, the previous frame background noise estimate B stored in register 302 is output to adder 304 and multiplier 306. It should be noted that the previous frame background noise estimate B stored in register 302 for use in the current frame is the same as the new background noise estimate B' computed in the previous frame. Adder 304 is also provided with an input value of 1 for addition with the value B so as to generate the term B+1. Multiplier 304 is also provided with an input value of K for multiplication with the value B so as to generate the term KB. The terms B+1 and KB are output respectively from adder 304 and multiplier 306 to separate inputs of both multiplexer 308 and adder 310.

Adder 310 and comparator or limiter 312 are used in selecting the larger of the terms B+1 and KB. Adder 310 subtracts the term B+1 from KB and provides the resulting value to comparator or limiter 312. Limiter 312 provides a control signal to multiplexer 308 so as to select an output thereof as the larger of the terms B+1 and KB. The selected term B+1 or KB is output from multiplexer 308 to limiter 314 which is a saturation type limiter which provides either the selected term if below the constant value M, or the value M if above the value M. The output from limiter 314 is provided as the second input to multiplexer 300 and as an input to adder 316.

Adder 316 also receives at another input the frame energy value $E_f$. Adder 316 and comparator or limiter 318 are used in selecting the smaller of the value $E_f$ and the term output from limiter 314. Adder 316 subtracts the frame energy value from the value output from limiter 314 and provides the resulting value to comparator or limiter 318. Limiter 318 provides a control signal to multiplexer 300 for selecting the smaller of the $E_f$ value and the output from limiter 314. The selected value output from multiplexer 300 is provided as the new background noise estimate B' to register 302 where stored for use during the next frame as the previous frame background noise estimate B.

Referring back to FIG. 7, each of the autocorrelation coefficients R(0)–R(10) are output from autocorrelation subsystem 202 to LPC analysis subsystem 206. The LPC coefficients computed in LPC analysis subsystem 206 in both the perceptual weighting filter 52 and formant synthesis filter 60.

The LPC coefficients may be obtained by the autocorrelation method using Durbin's recursion as discussed in *Digital Processing of Speech Signals*, Rabiner & Schafer, Prentice-Hall, Inc., 1978. This technique is an efficient computational method for obtaining the LPC coefficients. The algorithm can be stated in the following equations:

$$E^{(0)} = R(0), \quad i = 1; \tag{15}$$

$$k_i = \left( R(i) - \sum_{j=1}^{i-1} \alpha_j^{(i-1)} R(i-j) \right) / E^{(i-1)}; \tag{16}$$

$$\alpha_i^{(i)} = k_i; \tag{17}$$

$$\alpha_j^{(i)} = \alpha_j^{(i-1)} - k_i \alpha_{i-j}^{(i-1)} \text{ for } 1 <= j <= i - 1; \tag{18}$$

$$E^{(i)} = (1 - k_i^2) E^{(i-1)}; \text{ and} \tag{19}$$

If $i < 10$ then goto equation (16) with $i = i + 1$. \hfill (20)

The ten LPC coefficients are labeled $\alpha_j^{(10)}$, for $1 <= j <= 10$

Prior to encoding of the LPC coefficients, the stability of the filter must be ensured. Stability of the filter is achieved by radially scaling the poles of the filter inward by a slight amount which decreases the magnitude of the peak frequency responses while expanding the bandwidth of the peaks. This technique is commonly known as bandwidth expansion, and is further described in the article "Spectral Smoothing in PARCOR Speech Analysis-Synthesis" by Tohkura et.al., *ASSP Transactions,* December 1978. In the present case bandwidth expansion can be efficiently done by scaling each LPC coefficient. Therefore, as set forth in Table III, the resultant LPC coefficients are each multiplied by a corresponding hex value to yield the final output LPC coefficients $\alpha_1$-$\alpha_{10}$ of LPC analysis subsystem 206. It should be noted that the values presented in Table III are given in hexadecimal with 15 fractional bits in two's complement notation. In this form the value $0 \times 8000$ represents $-1.0$ and the value $0 \times 7333$ (or 29491) represents $0.899994 = 29491/32768$.

TABLE III $\alpha_1 = \alpha_1^{(10)} \cdot 0 \times 7333$
$\alpha_2 = \alpha_2^{(10)} \cdot 0 \times 67ae$
$\alpha_3 = \alpha_3^{(10)} \cdot 0 \times 5d4f$
$\alpha_4 = \alpha_4^{(10)} \cdot 0 \times 53fb$
$\alpha_5 = \alpha_5^{(10)} \cdot 0 \times 4b95$
$\alpha_6 = \alpha_6^{(10)} \cdot 0 \times 4406$
$\alpha_7 = \alpha_7^{(10)} \cdot 0 \times 3d38$
$\alpha_8 = \alpha_8^{(10)} \cdot 0 \times 3719$
$\alpha_9 = \alpha_9^{(10)} \cdot 0 \times 3196$
$\alpha_{10} = \alpha_{10}^{(10)} \cdot 0 \times 2ca1$ The operations are preferrably performed in double precision, i.e. 32 bit divides, multiplies and additions. Double precision accuracy is preferred in order to maintain the dynamic range of the autocorrelation functions and filter coefficients.

Figure 10:
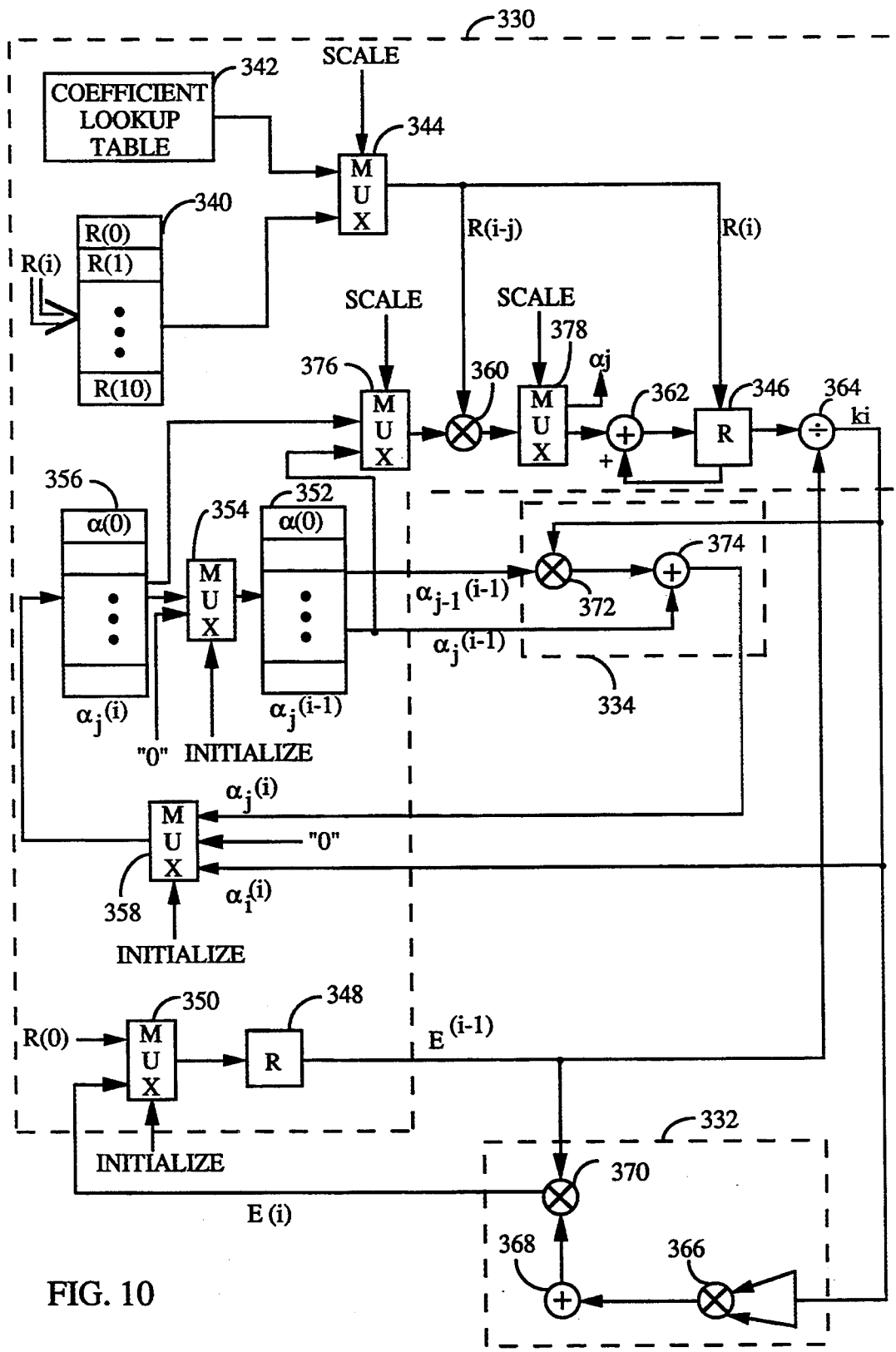
FIG. 10 is a block diagram of an exemplary LPC analysis subsystem.

In FIG. 10, a block diagram of an exemplary embodiment of the LPC subsystem 206 is shown which implements equations (15)–(20) above. LPC subsystem 206 is comprised of three circuit portions, a main computation circuit 330 and two buffer update circuits 332 and 334 which are used to update the registers of the main computation circuit 330. Computation is begun by first loading the values R(1)-R(10) into buffer 340. To start the calculation, register 348 is preloaded with the value R(1) via multiplexer 344. Register is initialized with R(0) via multiplexer 350, buffer 352 (which holds 10 $\alpha j^{(i-1)}$ values) is initialized to all zeroes via multiplexer 354, buffer 356 (which holds 10 $\alpha j^{(i)}$ values) is initialized to all zeroes via multiplexer 358, and i is set to 1 for the computational cycle. For purposes of clarity counters for i and j and other computational cycle control are not shown but the design and integration of this type of logic circuitry is well within the ability of one skilled in the art in digital logic design.

The $\alpha j^{(i-1)}$ value is output from buffer 356 to compute the term $k_i E^{(i-1)}$ as set forth in equation (14). Each value R(i-j) is output from buffer 340 for multiplication with the $\alpha j^{(i-1)}$ value in multiplier 360. Each resultant value is subtracted in adder 362 from the value in register 346. The result of each subtraction is stored in register 346 from which the next term is subtracted. There are $i-1$ multiplications and accumulations in the $i^{th}$ cycle, as indicated in the summation term of equation (14). At the end of this cycle, the value in register 346 is divided in divider 364 by the value $E^{(i-1)}$ from register 348 to yield the value $k_i$.

The value $k_i$ is then used in buffer update circuit 332 to calculate the value $E^{(i)}$ as in equation (19) above, which is used as the value $E^{(i-1)}$ during the next computational cycle of $k^i$. The current cycle value $k_i$ is multiplied by itself in multiplier 366 to obtain the value $k_i^2$. The value $k_i^2$ is then subtracted from the value of 1 in adder 368. The result of this addition is multiplied in multiplier 370 with the value $E^{(i)}$ from register 348. The resulting value $E^{(i)}$ is input to register 348 via multiplexer 350 for storage as the value $E^{(i-1)}$ for the next cycle.

The value $k_i$ is then used to calculate the value $\alpha_j^{(i)}$ as in equation (15). In this case the value $k_i$ is input to buffer 356 via multiplexer 358. The value $k_i$ is also used in buffer update circuit 334 to calculate the values $\alpha_j^{(i)}$ from the values $\alpha_j^{(i-1)}$ as in equation (18). The values currently stored in buffer 352 are used in computing the values $\alpha_j^{(i)}$. As indicated in equation (18), there are $i-1$ calculations in the $i^{th}$ cycle. In the $i=1$ iteration no such calculations are required For each value of j for the $i^{th}$ cycle a value of $\alpha_j^{(i)}$ is computed. In computing each value of $\alpha_j^{(i)}$, each value of $\alpha_j^{(i-1)}$ is multiplied in multiplier 372 with the value $k_i$ for output to adder 374. In adder 374 the value $k_i \alpha_{i-j}^{(i-1)}$ is subtracted from the value $\alpha_j^{(i-1)}$ also input to adder 374. The result of each multiplication and addition is provided as the value of $\alpha_j^{(i)}$ to buffer 356 via multiplexer 358.

Once the values $\alpha_j^{(i)}$ and $\alpha_j^{(i)}$ are computed for the current cycle, the values just computed and stored in buffer 356 are output to buffer 352 via multiplexer 354. The values stored in buffer 356 are stored in corresponding positions in buffer 352. Buffer 352 is thus updated for computing the value $k_i$ for the $i+1$ cycle.

It is important to note that data $\alpha_j^{(i-1)}$ generated at the end of a previous cycle is used during the current cycle to generate updates $\alpha_j^{(i)}$ for a next cycle. This previous cycle data must be retained in order to completely generate updated data for the next cycle. Thus two buffers 356 and 352 are utilized to preserve this previous cycle data until the updated data is completely generated.

The above description is written with respect to a parallel transfer of data from buffer 356 to buffer 352 upon completion of the calculation of the updated values. This implementation ensures that the old data is retained during the entire process of computing the new data, without loss of the old data before completely used as would occur in a single buffer arrangement. The described implementation is one of several implementations that are readily available for achieving the same result. For example, buffers 352 and 356 may be multiplexed such that upon calculating the value $k_i$ for a current cycle from values stored in a first buffer, the updates are stored in the second buffer for use during the next computational cycle. In this next cycle the value $k_i$ is computed from the values stored in the second buffer. The values in the second buffer and the value $k_i$ are used to generate updates for the next cycle with these updates stored in the first buffer. This alternating of buffers enables the retention of proceeding computational cycle values, from which updates are generated, while storing update values without overwriting the proceeding values which are needed to generate the updates. Usage of this technique can minimize the delay associated with the computation of the value $k_i$ for the next cycle. Therefore the updates for the multiplications/accumulations in computing $k_i$ may be done at the same time as the next value of $\alpha_j^{(i-1)}$ is computed.

The ten LPC coefficients $\alpha_j^{(10)}$, stored in buffer 356 upon completion of the last computational cycle (i=10), are scaled to arrive at the corresponding final LPC coefficients $\alpha_j$. Scaling is accomplished by providing a scale select signal to multiplexers 344, 376 and 378 so that the scaling values stored in lookup table 342, hex values of Table III, are selected for output through multiplexer 344. The values stored in lookup table 342 are clocked out in sequence and input to multiplier 360. Multiplier 360 also receives via multiplexer 376 the $\alpha_j^{(10)}$ values sequentially output from register 356. The scaled values are output from multiplier 360 via multiplexer 378 as an output to LPC to LSP transformation subsystem 208 (FIG. 7).

In order to efficiently encode each of the ten scaled LPC coefficients in a small number of bits, the coefficients are transformed into Line Spectrum Pair frequencies as described in the article "Line Spectrum Pair (LSP) and Speech Data Compression", by Soong and Juang, ICASSP '84. The computation of the LSP parameters is shown below in equations (21) and (22) along with Table IV.

The LSP frequencies are the ten roots which exist between 0 and $\pi$ of the following equations:

$$P(\omega) = \cos 5\omega + p_1 \cos 4\omega + \ldots + p_4 \cos \omega + p_5/2; \quad (21)$$

$$Q(\omega) = \cos 5\omega + q_1 \cos 4\omega + \ldots + q_4 \cos \omega + q_5/2; \text{ and} \quad (22)$$

where the $p_n$ and $q_n$ values for $n=1, 2, 3, 4$ and are defined recursively in Table IV.

TABLE IV

| | |
|---|---|
| $p_1 = -(\alpha_1 + \alpha_{10}) - 1$ | $q_1 = -(\alpha_1 - \alpha_{10}) + 1$ |
| $p_2 = -(\alpha_2 + \alpha_9) - p_1$ | $q_2 = -(\alpha_2 - \alpha_9) + q_1$ |
| $p_3 = -(\alpha_3 + \alpha_8) - p_2$ | $q_3 = -(\alpha_3 - \alpha_8) + q_2$ |
| $p_4 = -(\alpha_4 + \alpha_7) - p_3$ | $q_4 = -(\alpha_4 - \alpha_7) + q_3$ |
| $p_5 = -(\alpha_5 + \alpha_6) - p_4$ | $q_5 = -(\alpha_5 - \alpha_6) + q_4$ |

In Table IV, the $\alpha_1, \ldots, \alpha_{10}$ values are the scaled coefficients resulting from the LPC analysis. The ten roots of equations (21) and (22) are scaled to between 0 and 0.5 for simplicity. A property of the LSP frequencies is that, if the LPC filter is stable, the roots of the two functions alternate; i.e. the lowest root, $\omega_1$, is the lowest root of $P(\omega)$, the next lowest root, $\omega_2$, is the lowest root of $Q(\omega)$, and so on. Of the ten frequencies, the odd frequencies are the roots of the $P(\omega)$, and the even frequencies are the roots of the $Q(\omega)$.

The root search is done as follows. First, the p and q coefficients are computed in double precision by adding the LPC coefficients as shown above. $P(\omega)$ is then evaluated every $\pi/256$ radians and these values are then evaluated for sign changes, which identify a root in that subregion. If a root is found, a linear interpolation between the two bounds of this region is then done to approximate the location of the root. One Q root is guaranteed to exist between each pair of P roots (the fifth Q root exists between the fifth P root and $\pi$) due to the ordering property of the frequencies. A binary search is done between each pair of P roots to determine the location of the Q roots. For ease in implementation, each P root is approximated by the closest $\pi/256$ value and the binary search is done between these approximations. If a root is not found, the previous unquantized values of the LSP frequencies from the last frame in which the roots were found are used.

Figure 11:
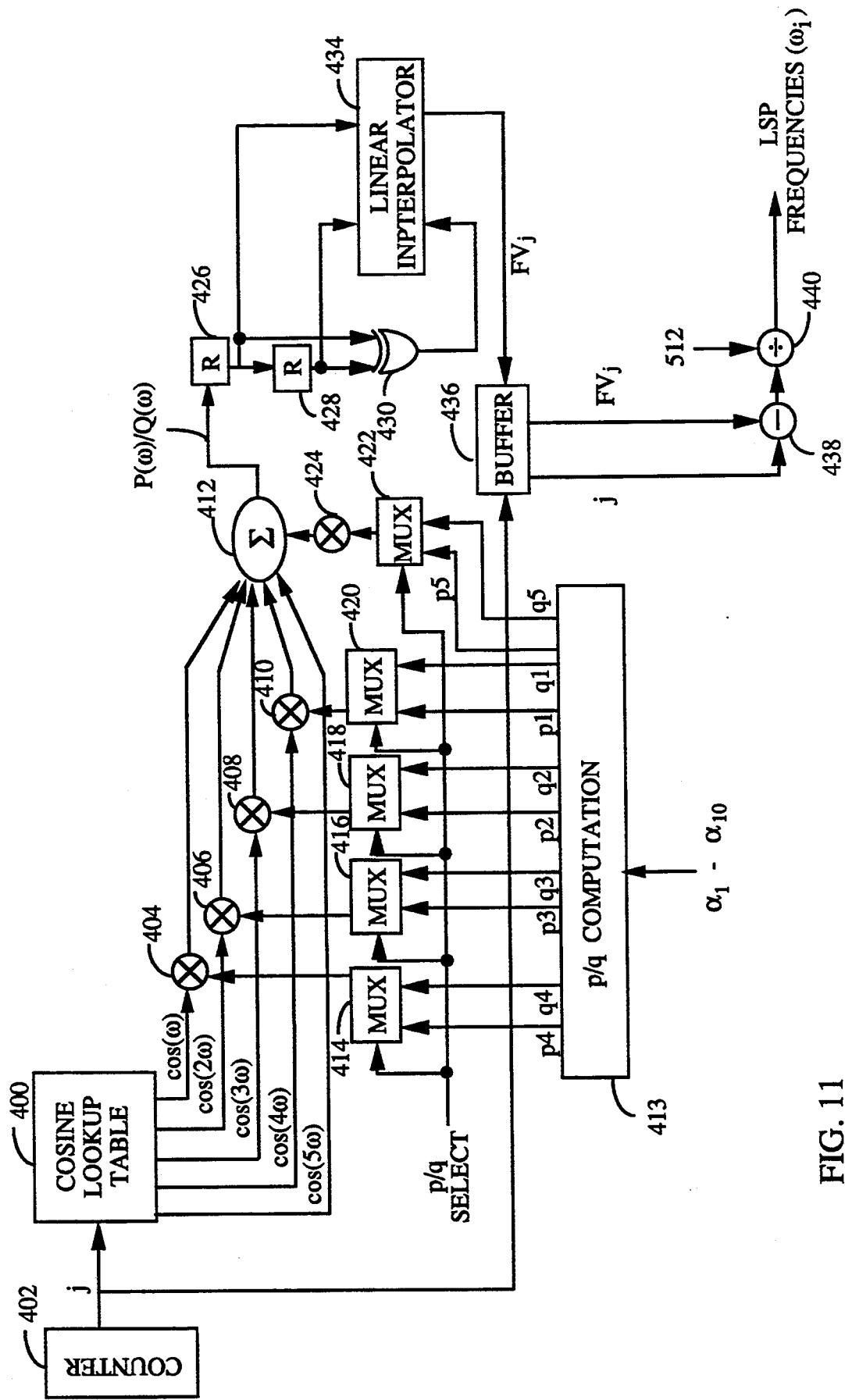
FIG. 11 is a block diagram of an exemplary LPC to LSP transformation subsystem.

Referring now to FIG. 11, an exemplary implementation of the circuitry used to generate the LSP frequencies is illustrated. The above described operation requires a total of 257 possible cosine values between 0 and $\pi$, which are stored in double precision in a lookup table, cosine lookup table 400 which is addressed by mod 256 counter 402. For each value of j input to lookup table 400, an output of $\cos \omega$, $\cos 2\omega$, $\cos 3\omega$, $\cos 4\omega$ and $\cos 5\omega$ are provided where:

$$\omega = j\pi/256 \quad (23)$$

where j is a count value.

The values $\cos \omega$, $\cos 2\omega$, $\cos 3\omega$ and $\cos 4\omega$ output from lookup table 400 are input to a respective multiplier 404, 406, 408, and 410, while the value $\cos 5\omega$ is input directly to summer 412. These values are multiplied in a respective multiplier 404, 406, 408, and 410 with a respective one of the values $p_4$, $p_3$, $p_2$ and $p_1$ input thereto via multiplexers 414, 416, 418 and 420. The resultant values from this multiplication are also input to summer 412. Furthermore the value $p_5$ is provided through multiplexer 422 to multiplier 424 with the constant value 0.5, i.e. ½, also provided to multiplier 424. The resultant value output from multiplier 424 is provided as another input to summer 412. Multiplexers 414–422 select between the values $p_1$–$p_5$ or $q_1$–$q_5$ in response to a p/q coefficient select signal, so as to use the same circuitry for computation of both the $P(\omega)$ and $Q(\omega)$ values. The circuitry for generating the $p_1$–$p_5$ or $q_1$–$q_5$ values is not shown but is readily implemented using a series of adders for adding and subtracting the LPC coefficients and $p_1$–$p_5$ or $q_1$–$q_5$ values, along with registers for storing the $p_1$–$p_5$ or $q_1$–$q_5$ values.

Summer 412 sums the input values to provide the output $P(\omega)$ or $Q(\omega)$ value as the case may be. For purposes of ease in further discussion the case of the values of $P(\omega)$ will be considered with the values of $Q(\omega)$ computed in a similar fashion using the $q_1$–$q_5$ values. The current value of $P(\omega)$ is output from summer 412 where stored in register 426. The preceding value of $P(\omega)$, previously stored in register 426 is shifted to register 428. The sign bits of the current and previous values of $P(\omega)$ are exclusive OR'ed in exclusive OR gate 430 to give an indication of a zero crossing or sign change, in the form of an enable signal that is sent to linear interpolator 434. The current and previous value of $P(\omega)$ are also output from registers 426 and 428 to linear interpolator 434 which is responsive to the enable signal for interpolating the point between the two values of $P(\omega)$ at which the zero crossing occurs. This linear interpolation fractional value result, the distance from the value $j-1$, is provided to buffer 436 along with the value j from counter 256. Gate 430 also provides the enable signal to buffer 436 which permits the storage of the value j and the corresponding fractional value $FV_j$.

The fractional value is subtracted from the value j as output from buffer 436 in adder 438, or in the alternative may be subtracted therefrom as input to buffer 436. In the alternative a register in the j line input to buffer 436 may be used such that the value $j-1$ is input to buffer 436 with the fractional value input also input thereto. The fractional value may be added to the value $j-1$ either before storage in register 436 or upon output thereof. In any case the combined value of $j+FV_j$ or $(j-1)+FV_j$ is output to divider 440 where divided by the input constant value of 512. The division operation may be simply be performed by merely changing the binary point location in the representative binary word. This division operation provides the necessary scaling to arrive at a LSP frequency between 0 and 0.5.

Each function evaluation of $P(\omega)$ or $Q(\omega)$ requires 5 cosine lookups, 4 double precision multiplications, and 4 additions. The computed roots are typically only accurate to about 13 bits, and are stored in single precision. The LSP frequencies are provided to LSP quantization subsystem 210 (FIG. 7) for quantization.

Once the LSP frequencies have been computed, they must be quantized for transmission. Each of the ten LSP frequencies centers roughly around a bias value. It should be noted that the LSP frequencies approximate the bias values when the input speech has flat spectral characteristics and no short term prediction can be done. The biases are subtracted out at the encoder, and a simple DPCM quantizer is used. At the decoder, the bias is added back. The negative of the bias value, in hexadecimal, for each LSP frequency, $\omega_1$–$\omega_{10}$, as provided from the LPC to LSP transformation subsystem is set forth in Table V. Again the values given in Table V are in two's complement with 15 fractional bits. The hex value $0\times8000$ (or $-32768$) represents $-1.0$. Thus the first value in Table V, the value $0\times fa2f$ (or $-1489$) represents $-0.045441 = -1489/32768$.

TABLE V

| LSP frequency | Negative Bias Value |
|---|---|
| $\omega_1$ | $0 \times fa2f$ |
| $\omega_2$ | $0 \times f45e$ |
| $\omega_3$ | $0 \times ee8c$ |
| $\omega_4$ | $0 \times e8bb$ |
| $\omega_5$ | $0 \times e2e9$ |
| $\omega_6$ | $0 \times dd18$ |
| $\omega_7$ | $0 \times d746$ |
| $\omega_8$ | $0 \times d175$ |
| $\omega_9$ | $0 \times cba3$ |
| $\omega_{10}$ | $0 \times c5d2$ |

The predictor used in the subsystem is 0.9 times the quantized LSP frequency from the previous frame stored in a buffer in the subsystem. This decay constant of 0.9 is inserted so that channel errors will eventually die off.

The quantizers used are linear, but vary in dynamic range and step size with the rate. Also, in high rate frames more bits are transmitted for each LSP frequency, therefore the number of quantization levels depends upon the rate. In Table VI, the bit allocation and the dynamic range of the quantization are shown for each frequency at each rate. For example, at rate 1, $\omega_1$ is uniformly quantized using 4 bits (that is, into 16 levels) with the highest quantization level being 0.025 and the lowest being $-0.025$.

TABLE VI

| RATE | Full | Half | Quarter | Eighth |
|---|---|---|---|---|
| $\omega_1$ | 4: ± .025 | 2: ± .015 | 1: ± .01 | 1: ± .01 |
| $\omega_2$ | 4: ± .04 | 2: ± .015 | 1: ± .01 | 1: ± .015 |
| $\omega_3$ | 4: ± .07 | 2: ± .03 | 1: ± .01 | 1: ± .015 |
| $\omega_4$ | 4: ± .07 | 2: ± .03 | 1: ± .01 | 1: ± .015 |
| $\omega_5$ | 4: ± .06 | 2: ± .03 | 1: ± .01 | 1: ± .015 |
| $\omega_6$ | 4: ± .06 | 2: ± .02 | 1: ± .01 | 1: ± .015 |
| $\omega_7$ | 4: ± .05 | 2: ± .02 | 1: ± .01 | 1: ± .01 |
| $\omega_8$ | 4: ± .05 | 2: ± .02 | 1: ± .01 | 1: ± .01 |
| $\omega_9$ | 4: ± .04 | 2: ± .02 | 1: ± .01 | 1: ± .01 |
| $\omega_{10}$ | 4: ± .04 | 2: ± .02 | 1: ± .01 | 1: ± .01 |
| Total | 40 bits | 20 bits | 10 bits | 10 bits |

Figure 12:
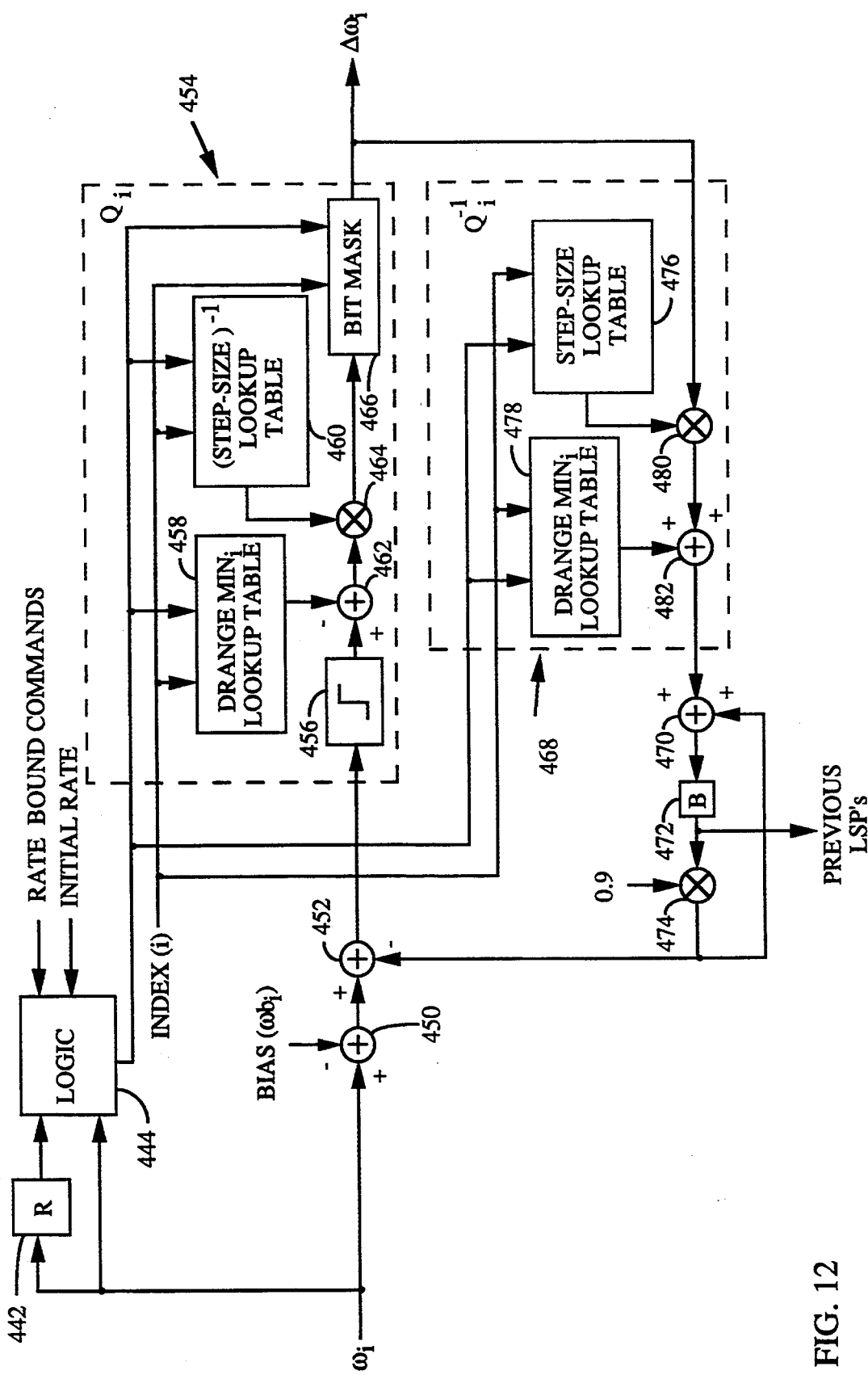
FIG. 12 is a block diagram of an exemplary LPC quantization subsystem.

If the quantization ranges for the rate chosen by the rate decision algorithm are not large enough or a slope overflow occurs, the rate is bumped up to the next higher rate. The rate continues to be bumped up until the dynamic range is accommodated or full rate is reached. In FIG. 12 an exemplary block diagram illustration of one implementation of the optional rate bump up technique is provided.

FIG. 12 illustrates in block diagram form an exemplary implementation of the LSP quantization subsystem 210 which includes the rate bump up circuitry. In FIG. 12, the current frame LSP frequencies are output from divider 440 (FIG. 11) to register 442 where they are stored for output during a rate bump up determination in the next frame. The previous frame LSP frequencies and the current frame LSP frequencies are output respectfully output from register 440 and divider 440 to rate bump up logic 442 for a current frame rate bump up determination. Rate bump up logic 442 also receives the initial rate decision, along with the rate the rate bound commands from rate determination subsystem 204. In determining whether a rate increase is necessary, logic 442 compares the previous frame LSP frequencies with the current frame LSP frequencies based on the sum of the square of the difference between the current and previous frame LSP frequencies. The resulting value is then compared with a threshold value for which if exceeded is an indication that an increase in rate is necessary to ensure high quality encoding of the speech. Upon exceeding the threshold value, logic 442 increments the initial rate by one rate level so as to provide an output of the final rate used throughout the encoder.

In FIG. 12, each LSP frequency value $\omega_1$–$\omega_{10}$ is input one at a time to adder 450 along with the corresponding bias value. The bias value is subtracted from the input LSP value and the result thereof output to adder 452. Adder 452 also receives as an input a predictor value, a previous frame corresponding LSP value multiplied by a decay constant. The predictor value is subtracted from the output of adder 450 by adder 452. The output of adder 452 is provided as an input to quantizer 454.

Quantizer 454 is comprised of limiter 456, minimum dynamic range lookup table 458, inverse step size lookup table 460, adder 462, multiplier 464 and bit mask 466. Quantization is performed in quantizer 454 by first determining whether the input value is within the dynamic range of quantizer 454. The input value is provided to limiter 456 which limits the input value to the upper and lower bounds of the dynamic range if the input exceeds the bounds provided by lookup table 458. Lookup table 458 provides the stored bounds, according to Table VI, to limiter 456 in response to the rate input and the LSP frequency index i input thereto. The value output from limiter 456 is input to adder 462 where the minimum of the dynamic range, provided by lookup table 458 is subtracted therefrom. The value output from lookup table 458 is again determined by the rate and LSP frequency index i in accordance with the minimum dynamic range values, disregarding the value sign, set forth in Table VI. For example the value in lookup table 458 for (full rate, $\omega_1$) is 0.025.

The output from adder 462 is then multiplied in multiplier 464 by a value selected from lookup table 460. Lookup table 460 contains values corresponding to the inverse of the step size for each LSP value at each rate in accordance with the values set forth in Table VI. The value output from lookup table 460 is selected by the rate and LSP frequency index i. For each rate and LSP frequency index i the value stored in lookup table 460 is the quantity $((2^n - 1)/\text{dynamic range})$, where n is the number of bits representing the quantized value. Again for example, the value in lookup table 460 for (rate 1, $\omega_1$) is (15/0.05) or 300.

The output from multiplier 464 is a value between 0 and $2^{n-1}$ which is provided to bit mask 466. Bit mask 466 in response to the rate and LSP frequency index extracts from the input value the appropriate number of bits according to Table VI. The extracted bits are the n integer value bits of the input value so as to provide a bit limited output $\Delta\omega_i$. The values $\Delta\omega_i$ are the quantized unbiased differentially encoded LSP frequencies that are transmitted over the channel representative of the LPC coefficients.

The value $\Delta\omega_i$ is also fed back through a predictor comprised of inverse quantizer 468, adder 470, buffer 472 and multiplier 474. Inverse quantizer 468 is comprised of step size lookup table 476, minimum dynamic range lookup table 478, multiplier 480 and adder 482.

The value $\Delta\omega_i$ is input to multiplier 480 along with a selected value from lookup table 476. Lookup table 476 contains values corresponding to the step size for each LSP value at each rate in accordance with the values set forth in Table VI. The value output from lookup table 476 is selected by the rate and LSP frequency index i. For each rate and LSP frequency index i the value stored in lookup table 460 is the quantity (dynamic range/$2^{n-1}$), where n is the number of bits representing the quantized value. Multiplier 480 multiplies the input values and provides an output to adder 482.

Adder 482 receives as another input a value from lookup table 478. The value output from lookup table 478 is determined by the rate and LSP frequency index i in accordance with the minimum dynamic range values, disregarding the value sign, set forth in Table VI. Adder 482 adds the minimum dynamic range value provided by lookup table 478 with the value output from multiplier 480 with resulting value output to adder 470.

Adder 470 receives as another input the predictor value output from multiplier 474. These values are added in adder 470 and stored in ten word storage buffer 472. Each value previous frame value output from buffer 472 during the current frame is multiplied in multiplier 474 by a constant, 0.9. The predictor values as output from multiplier 474 are provided to both adders 452 and 470 as previously discussed.

In the current frame the value stored in buffer 472 is the previous frame reconstructed LSP values minus the bias value. Similarly in the current frame the value output from adder 470 is the current frame reconstructed LSP values also without bias. In the current frame the output from buffer 472 and adder 470 are respectively provided to adders 484 and 486 where the bias is added into the values. The values output from adders 484 and 486 are respectively the previous frame reconstructed LSP frequency values and the current frame reconstructed LSP frequency values. LSP smoothing is done at the lower rates according to the equation:

$$\text{Smoothed } LSP = a(\text{current } LSP) + (1-a)(\text{previous } LSP) \quad (24)$$

where
- a=0 for full rate;
- a=0.1 for half rate;
- a=0.5 for quarter rate; and
- a=0.85 for eighth rate.

The previous frame (f−1) reconstructed LSP frequency $\omega'_{i,f-1}$ values and the current frame (f) reconstructed LSP frequency values $\omega'_{i,f}$ are output from quantization subsystem 210 to pitch subframe LSP interpolation subsystem 216 and codebook subframe LSP interpolation subsystem 226. The quantized LSP frequency values $\Delta\omega_i$ are output from LSP quantization subsystem 210 to data assembler subsystem 236 for transmission.

The LPC coefficients used in the weighting filter and the formant synthesis filter described later are appropriate for the pitch subframe which is being encoded. For pitch subframes, the interpolation of the LPC coefficients is done once for each pitch subframe and are as follows in Table VII:

TABLE VII

| Rate 1: | $\omega_i = 0.75\omega'_{i,f-1} + 0.25\omega'_{i,f}$ | for pitch subframe 1 |
|---|---|---|
| | $\omega_i = 0.5\omega'_{i,f-1} + 0.5\omega'_{i,f}$ | for pitch subframe 2 |
| | $\omega_i = 0.25\omega'_{i,f-1} + 0.75\omega'_{i,f}$ | for pitch subframe 3 |
| | $\omega_i = \omega'_{i,f}$ | |
| Rate ½: | $\omega_i = 0.625\omega'_{i,f-1} + 0.375\omega'_{i,f}$ | for pitch subframe 1 |
| | $\omega_i = 0.125\omega'_{i,f-1} + 0.875\omega'_{i,f}$ | for pitch subframe 2 |
| Rate ¼: | $\omega_i = 0.625\omega'_{i,f-1} + 0.375\omega'_{i,f}$ | for pitch subframe 1 |
| Rate ⅛: | Pitch Search is not done. | |

Pitch subframe counter 224 is used to keep track of the pitch subframes for which the pitch parameters are computed, with the counter output provided to pitch subframe LSP interpolation subsystem 216 for use in the pitch subframe LSP interpolation. Pitch subframe counter 224 also provides an output indicative of a completion of the pitch subframe for the selected rate to data packing subsystem 236.

Figure 13:
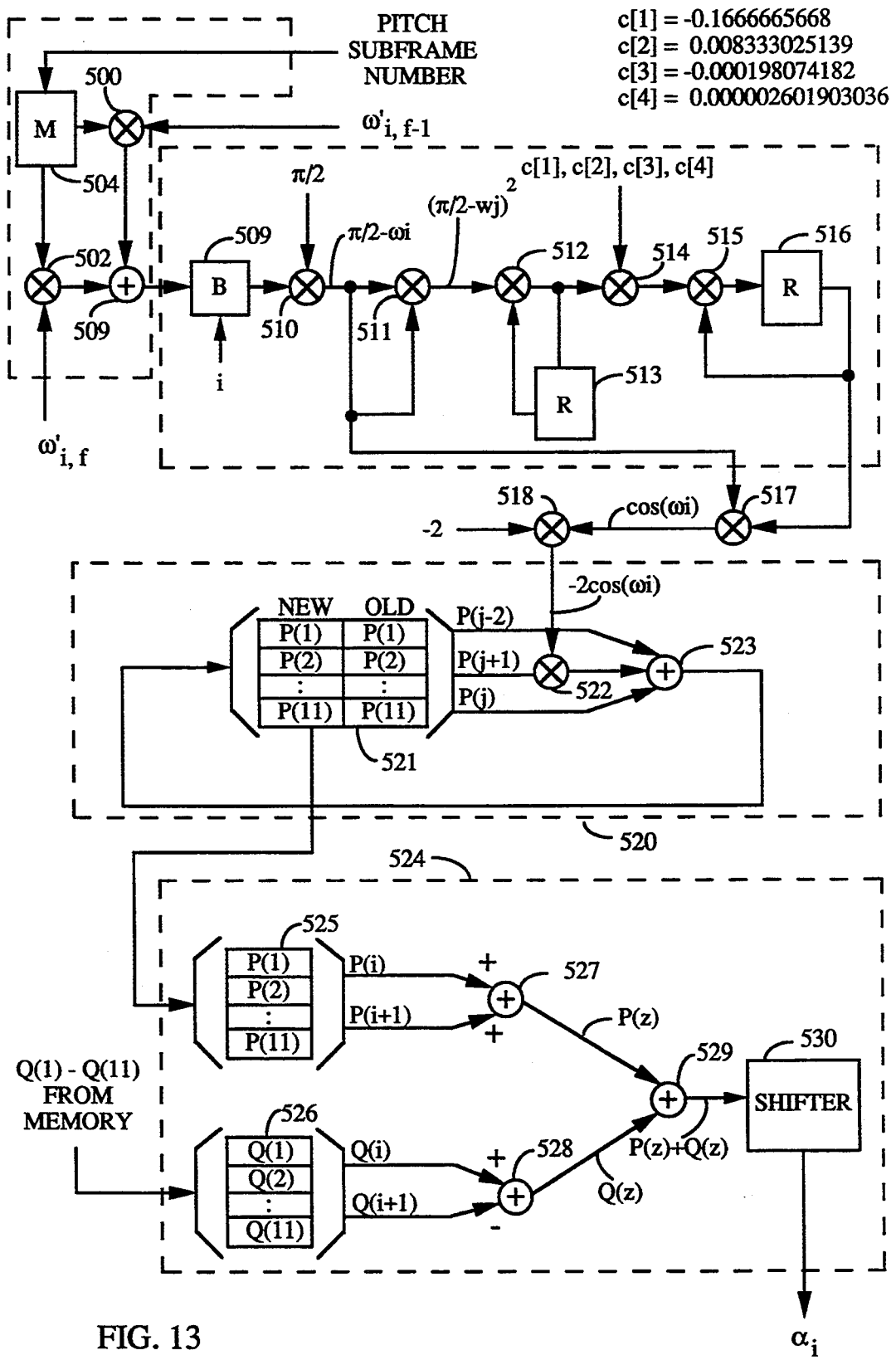
FIG. 13 is a block diagram of exemplary LSP interpolation and LSP to LPC transformation subsystems.

FIG. 13 illustrates an exemplary implementation of pitch subframe LSP interpolation subsystem 216 for interpolating the LSP frequencies for the relevant pitch subframe. In FIG. 13, the previous and current LSP frequencies $\omega'_{i,f-1}$ and $\omega'_{i,f}$ are respectively output from LSP quantization subsystem to multipliers 500 and 502 where respectively multiplied by a constant provided from memory 504. Memory 504 stores a set of constant values and in accordance with an input of the pitch subframe number from a pitch subframe counter, discussed later, provides an output of constants as set forth in Table VII for multiplication with the previous and current frame LSP values. The outputs of multipliers 500 and 502 are added in adder 506 to provide the LSP frequency values for the pitch subframe in accordance with the equations of Table VII. For each pitch subframe, once the interpolation of LSP frequencies is accomplished a reverse LSP to LPC transformation is performed to obtain the current coefficients of A(z) and the perceptual weighting filter. The interpolated LSP frequency values are thus provided to LSP to LPC transformation subsystem 218 of FIG. 7.

LSP to LPC transformation subsystem 218 converts the interpolated LSP frequencies back into LPC coefficients for use in resynthesizing the speech. Again, the previously reference article "Line Spectrum Pair (LSP) and Speech Data Compression", by Soong and Juang provides a full discussion and derivation of the algorithm implemented in the present invention in the transformation process. The computational aspects are such that P(z) and Q(z) can be expressed in terms of the LSP frequencies by the equations:

$$P(z) = (1 + z^{-1}) \prod_{i=1}^{5} (1 - 2\cos(\omega_{2i-1})z^{-1} + z^{-2}) \quad (25)$$

where $w_i$ are the roots of the P' polynomial (odd frequencies), and $$Q(z) = (1 - z^{-1}) \prod_{i=1}^{5} (1 - 2\cos(\omega_{2i})z^{-1} + z^{-2}) \quad (26)$$

where $w_i$ are the roots of the Q' polynomial (even frequencies), and $$A(z) = \frac{P(z) + Q(z)}{2}. \quad (27)$$

The computation is performed by first computing the values $2\cos(\omega_i)$ for all of the odd frequencies i. This computation is accomplished using a 5th order single precision Taylor Series expansion of cosine about zero (0). A Taylor expansion about the closest point in the cosine table could potentially be more accurate, but the expansion about 0 achieves sufficient accuracy and does not involve an excessive amount of computation.

Next the coefficients of the P polynomial are computed. The coefficients of a product of polynomials is the convolution of the sequences of coefficients of the individual polynomials. The convolution of the 6 sequences of z polynomial coefficients in equation (25) above, $\{1, -2\cos(\omega_1), 1\}, \{1, -2\cos(\omega_3), 1\} \ldots \{1, -2\cos(\omega_9), 1\}$, and $\{1, 1\}$, is then computed.

Once the P polynomial is computed, the same procedure is repeated for the Q polynomial where the 6 sequences of z polynomial coefficients in equation (26) above, $\{1, -2\cos(\omega_2), 1\}, \{1, -2\cos(\omega_4), 1\} \ldots \{1, -2\cos(\omega_{10}), 1\}$, and $\{1, -1\}$, and the appropriate coefficients are summed and divided by 2, i.e. shifted by 1 bit, to produce the LPC coefficients.

FIG. 13 further shows an exemplary implementation of the LSP to LPC transformation subsystem in detail. Circuit portion 508 computes the value of $-2\cos(\omega_i)$ from the input value of $\omega_i$. Circuit portion 508 is comprised of buffer 509; adders 510 and 515; multipliers 511, 512, 514, 516 and 518; and registers 513 and 515. In computing the values for $-2\cos(\omega_i)$ registers 513 and 515 are initialized to zero. Since this circuit computes $\sin(\omega_i)$, $\omega_i$ is first subtracted in adder 510 from the input constant value $\pi/2$. This value is squared by multiplier 511 and then the values $(\pi/2-\omega_i)^2$, $(\pi/2-\omega_i)^4$, $(\pi/2-\omega_i)^6$, and $(\pi/2-\omega_i)^8$ are successively computed using multiplier 512 and register 513.

The Taylor series expansion coefficients c[1]-c[4] are successively fed into multiplier 514 along with the values output from multiplier 512. The values output from multiplier 514 are input to adder 515 where along with the output of register 516 the values are summed to provide the output $c[1](\pi/2-\omega_i)^2+c[2](\pi/2-\omega_i)^4+c[3](\pi/2-\omega_i)^6+c[4](\pi/2-\omega_i)^8$ to multiplier 517. The input to multiplier 517 from register 516 is multiplied in multiplier 517 with the output $(\pi/2-\omega_i)$ from adder 510. The output from multiplier 517, the value $\cos(\omega_i)$, is multiplied in multiplier 518 with the constant $-2$ so as to provide output $-2\cos(\omega_i)$. The value $-2\cos(\omega_i)$ is provided to circuit portion 520.

Circuit portion 520 is used in the computation of the coefficients of the P polynomial. Circuit portion 520 is comprised of memory 521, multiplier 522, and adder 523. The array of memory locations P(1) ... P(11) is initialized to 0 except for P(1) which is set to 1. The old indexed $-2\cos(w_i)$ values are fed into multiplier 524 to perform the convolution of $(1, -2\cos(w_i), 1)$ where $1 \leq i \leq 5$, $1 \leq j \leq 2i+1$, P(j)=0 for j<1. Circuit portion 520 is duplicated (not shown) for computing the coefficients of the Q polynomial. The resultant final new values of P(1)-P(11) and Q(1)-Q(11) are provided to circuit portion 524.

Circuit portion 524 is provided for completion of the computation of the pitch subframe ten LPC coefficients $a_i$ for i=1 to i=10. Circuit portion 524 is comprised of buffers 525 and 526; adders 527, 528 and 529; and divider or bit shifter 530. The final P(i) and Q(i) values are stored in buffers 525 and 526. The P(i) and P(i+1) values are summed in adder 527 while the corresponding Q(i) and Q(i+1) values are subtracted in adder 528, for $1 \leq i \leq 10$. The output of adders 527 and 528, respectfully P(z) and Q(z) are input to adder 529 where summed and output as the value (P(z)+Q(z)). The output of adder is divided by two by shifting the bits by one position. Each bit shifted value of (P(z)+Q(z))/2 is an output LPC coefficient $a_i$. The pitch subframe LPC coefficients are provided to pitch search subsystem 220 of FIG. 7.

The LSP frequencies are also interpolated for each codebook subframe as determined by the selected rate, except for full rate. The interpolation is computed in a manner identical to that of the pitch subframe LSP interpolations. The codebook subframe LSP interpolations are computed in codebook subframe LSP interpolation subsystem 226 and are provided to LSP to LPC transformation subsystem 228 where transformation is computed in a manner similar to that of LSP to LPC transformation subsystem 218.

As discussed with reference to FIG. 3, the pitch search is an analysis by synthesis technique, in which encoding is done by selecting parameters which minimize the error between the input speech and the speech synthesized using those parameters. In the pitch search, the speech is synthesized using the pitch synthesis filter whose response is expressed in equation (2). Each 20 msec. speech frame is subdivided into a number of pitch subframes which, as previously described, depends on the data rate chosen for the frame. Once per pitch subframe, the parameters b and L, the pitch gain and lag, respectively, are calculated. In the exemplary implementation herein the pitch lag L ranges between 17 and 143, for transmission reasons L=16 is reserved for the case when b=0.

The speech coder utilizes a perceptual noise weighting filter of the form set forth in equation (1). As mentioned previously the purpose of the perceptual weighting filter is to weight the error at frequencies of less power to reduce the impact of error related noise. The perceptual weighting filter is derived from the short term prediction filter previously found. The LPC coefficients used in the weighting filter, and the formant synthesis filter described later, are those interpolated values appropriate for the subframe which is being encoded.

In performing the analysis-by-synthesis operations, a copy of the speech decoder/synthesizer is used in the encoder. The form of the synthesis filter used in the speech encoder is given by equations (3) and (4). Equations (3) and (4) correspond to a decoder speech synthesis filter followed by the perceptual weighting filter, therefore called the weighted synthesis filter.

The pitch search is performed assuming a zero contribution from the codebook at the current frame, i.e. G=0. For each possible pitch lag, L, the speech is synthesized and compared with the original speech. The error between the input speech and the synthesized speech is weighted by the perceptual weighting filter before its mean square error (MSE) is calculated. The objective is to pick values of L and b, from all possible values of L and b, which minimize the error between the perceptually weighted speech and the perceptually weighted synthesized speech. The minimization of the error may be expressed by the following equation:

$$MSE = \frac{1}{L_P} \sum_{n=0}^{L_P-1} (x(n) - x'(n))^2 \tag{28}$$

where $L_P$ is the number of samples in the pitch subframe, which in the exemplary embodiment is 40 for a full rate pitch subframe. The pitch gain, b, is computed which minimizes the MSE. These calculations are repeated for all allowed values of L, and the L and b that produce the minimum MSE are chosen for the pitch filter.

Figure 14:
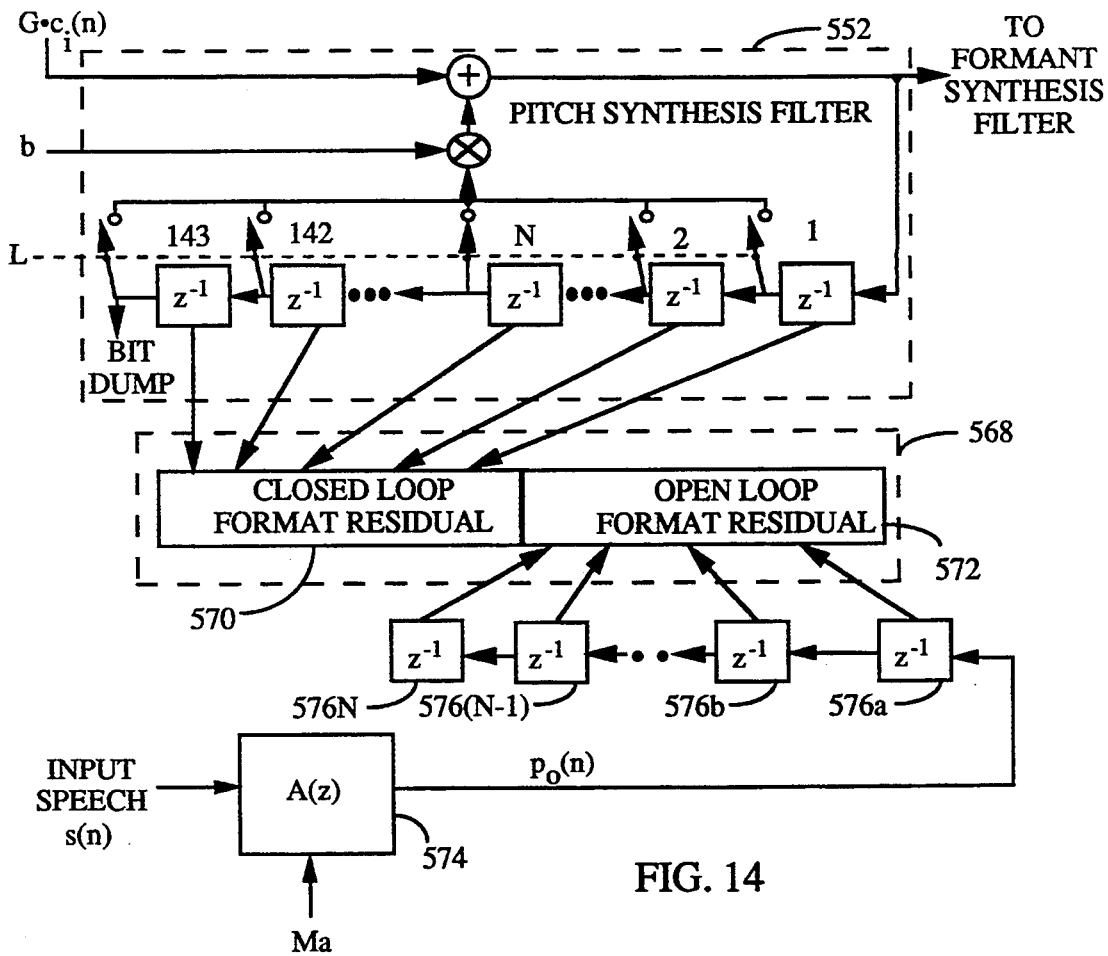
FIG. 14 is a block diagram of the adaptive codebook for the pitch search.

Calculating the optimal pitch lag involves the formant residual (p(n) in FIG. 3) for all time between $n = -L_{max}$ to $n = (L_P - L_{min}) - 1$ where $L_{max}$ is the maximum pitch lag value, $L_{min}$ is the minimum pitch lag value and $L_P$ is the pitch subframe length for the selected rate, and where $n = 0$ is the start of the pitch subframe. In the exemplary embodiment $L_{max} = 143$ and $L_{min} = 17$. Using the numbering scheme provided in FIG. 14, for rate ¼, $n = -143$ to $n = 142$; for rate ½, $n = -143$ to $n = 62$; and for rate 1, $n = -143$ to $n = 22$. For $n < 0$, the formant residual is simply the output of the pitch filter from the previous pitch subframes, which is held in the pitch filter memory, and is referred to as the closed loop formant residual. For $n \geq 0$, the formant residual is the output of a formant analysis filter having a filter characteristic of A(z) where the input is the current analysis frame speech samples. For $n \geq 0$, the formant residual is referred to as the open loop formant residual and would be exactly p(n) if the pitch filter and codebook do a perfect prediction at this subframe. Further explanation of the computation of the optimum pitch lag from the associated formant residual values is provided with reference to FIGS. 14–17.

The pitch search is done over 143 reconstructed closed-loop formant residual samples, p(n) for $n < 0$, plus $L_P - L_{min}$ unquantized open-loop formant residual samples, $p_o(n)$ for $n \geq 0$. The search effectively changes gradually from mostly an open-loop search where L is small and thus most of the residual samples used are $n > 0$, to a mostly closed-loop search where L is large and thus all of the residual samples used are $n < 0$. For example, using the numbering scheme provided in FIG. 14 at full rate, where the pitch subframe is comprised of 40 speech samples, the pitch search begins using the set of formant residual samples numbered $n = -17$ to $n = 22$. In this scheme from $n = -17$ to $n = -1$, the samples are closed-loop formant residual samples while from $n = 0$ to $n = 22$ the samples are open-loop formant residual samples. The next set of formant residual samples used in determining the optimum pitch lag are the samples numbered $n = -18$ to $n = 21$. Again, from $n = -18$ to $n = -1$, the samples are closed-loop formant residual samples while from $n = 0$ to $n = 21$ the samples are open-loop formant residual samples. This process continues through the sample sets until the pitch lag is computed for the last set of formant residual samples, $n = -143$ to $n = -104$.

As discussed previously with respect to equation (28), the objective is to minimize the error between x(n), the perceptually weighted speech minus the zero input response (ZIR) of the weighted formant filter, and x'(n), the perceptually weighted synthesized speech given no memory in the filters, over all possible values of L and b, given zero contribution from the stochastic codebook (G=0). Equation (28) can be rewritten with respect to b where:

$$MSE = \frac{1}{L_P} \sum_{n=0}^{L_P-1} (x(n) - by(n))^2 \tag{29}$$

where, $$y(n) = h(n)*p(n-L) \text{ for } 0 \leq n \leq L_P - 1 \tag{30}$$

where y(n) is the weighted synthesized speech with pitch lag L when b=1, and h(n) is the impulse response of the weighted formant synthesis filter having the filter characteristic according to equation (3).

This minimization process is equivalent to maximizing the value $E_L$ where:

$$E_L = \frac{(E_{xy})^2}{E_{yy}} \tag{31}$$

where, $$E_{xy} = \sum_{n=0}^{L_P-1} x(n)y(n) \tag{32}$$

and, $$E_{yy} = \sum_{n=0}^{L_P-1} y(n)y(n) \tag{33}$$

The optimum b for the given L is found to be:

$$b_L = \frac{E_{xy}}{E_{yy}} \tag{34}$$

This search is repeated for all allowed values of L. The optimum b is restricted to be positive, so L resulting in any negative $E_{xy}$ is ignored in the search. Finally the lag, L, and the pitch gain, b, that maximize $E_L$ are chosen for transmission.

As mentioned previously, x(n) is actually the perceptually weighted difference between the input speech and the ZIR of the weighted formant filter because for the recursive convolution, set for below in equations (35)–(38), the assumption is that the filter A(z) always starts with 0 in the filter memory. However the filter starting with a 0 in the filter memory is not actually the case. In synthesis, the filter will have a state remaining from the previous subframe. In the implementation, the effects of the initial state are subtracted from the perceptually weighted speech at the start. In this way, only the response of the steady-state filter A(z), all memories initially=0, to p(n) needs to be calculated for each L, and recursive convolution can be used. This value of x(n) needs to be computed only once but y(n), the zero state response of the formant filter to the output of the pitch filter, needs to be computed for each lag L. The computation of each y(n) involves many redundant multiplications, which do not need to be computed each lag. The method of recursive convolution described below is used to minimize the computation required.

With respect to recursive convolution the value $y_L(n)$ is defined by the value $y(n)$ where:

$$y_L(n) = h(n) * p(n-L) \quad 17 \leq L \leq 143 \tag{35}$$

or, $$y_L(n) = \Sigma h(i) p(n-L-i) \quad 17 \leq L \leq 143 \tag{36}$$

From equations (32) and (33) it can be seen that:

$$y_L(0) = p(-L) h(0) \tag{37}$$

$$y_L(n) = y_{L-1}(n-1) + p(-L) h(n) \quad 1 < n < L_p, 17 < L < 143 \tag{38}$$

In this way once the initial convolution for $y_{17}(n)$ is done, the remaining convolutions can be done recursively, greatly decreasing the number of computations required. For the example given above for rate 1, the value $y_{17}(n)$ is computed by equation (36) using the set of formant residual samples numbered $n = -17$ to $n = 22$.

Figure 15:
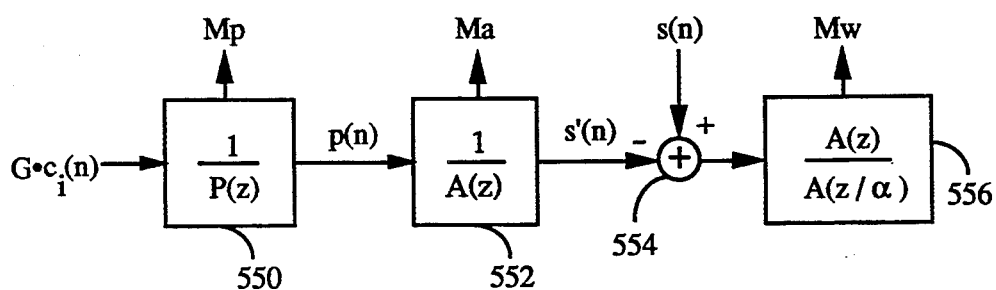
FIG. 15 is a block diagram of the encoder' decoder.

Referring to FIG. 15, the encoder includes a duplicate of the decoder of FIG. 5, decoder subsystem 235 of FIG. 7, absent the adaptive postfilter. In FIG. 15 the input to the pitch synthesis filter 550 is the product of the codebook value $c_I(n)$ and the codebook gain G. The output formant residual samples p(n) are input to formant synthesis filter 552 where filtered and output as reconstructed speech samples s'(n). The reconstructed speech samples s'(n) are subtracted from the corresponding input speech samples s(n) in adder 554. The difference between the samples s(n)' and s(n) are input to perceptual weighting filter 556. With respect to pitch synthesis filter 550, formant synthesis filter 552 and perceptual weighting filter 556, each filter contains a memory of the filter state where: $M_p$ is the memory in the pitch synthesis filter 550; $M_a$ is the memory in the formant synthesis filter 552; and $M_w$ is the memory in the perceptual weighting filter 556.

Figure 16:
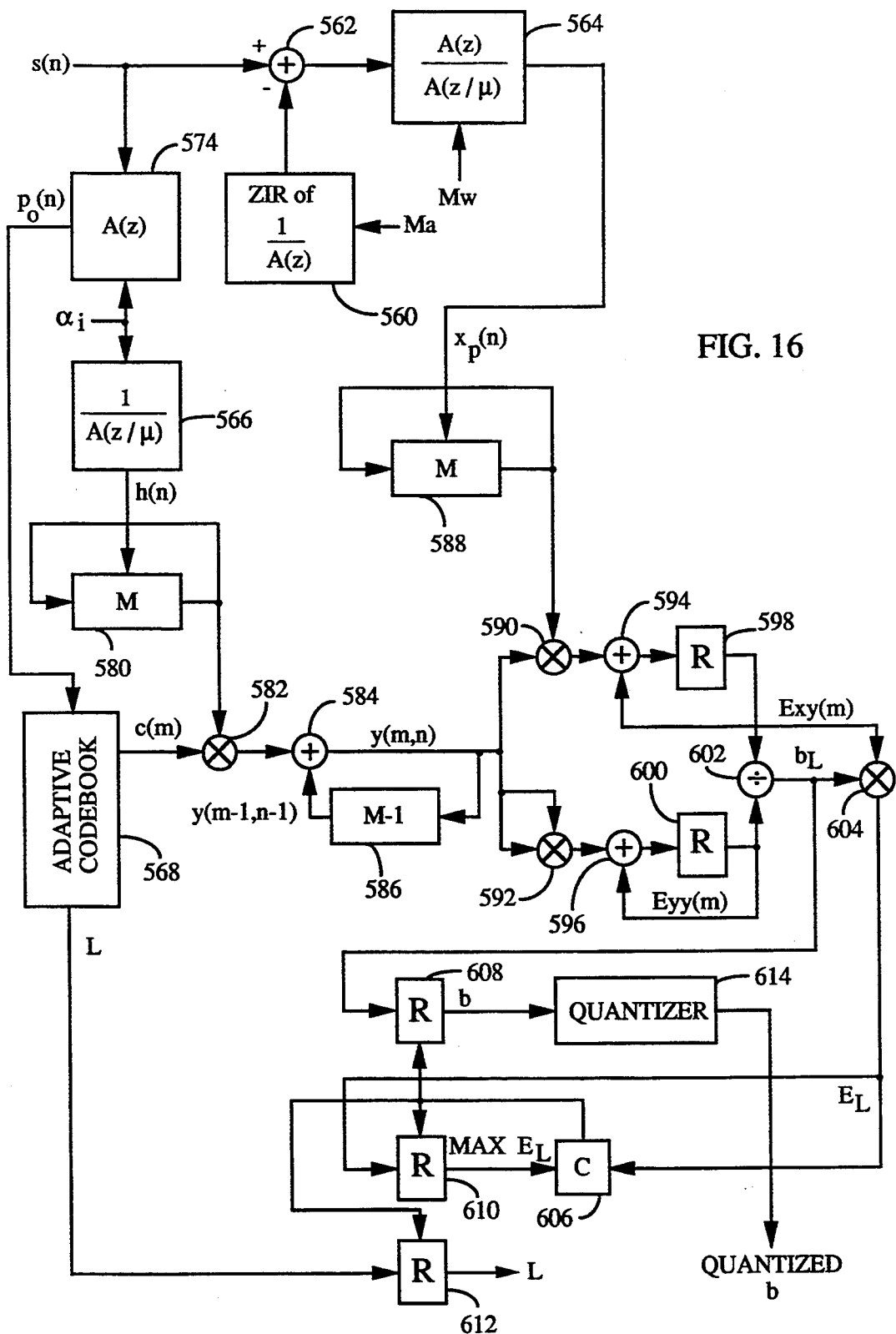
FIG. 16 is a block diagram of the pitch search subsystem.

The filter state $M_a$ from decoder subsystem formant synthesis filter 552 is provided to pitch search subsystem 220 of FIG. 7. In FIG. 16 the filter state $M_a$ is provided to calculate the zero input response (ZIR) of filter 560 which computes the ZIR of formant synthesis filter 552. The computed ZIR value is subtracted from the input speech samples s(n) in adder 562 with the result weighted by perceptual weighting filter 564. The output from perceptual weighting filter 564, $x_p(n)$, is used as the weighted input speech in equations (28)-(34) where $x(n) = x_p(n)$.

Referring back to FIGS. 14 and 15, pitch synthesis filter 550 as illustrated in FIG. 14 provides to adaptive codebook 568 which is in essence a memory for storing the closed and open loop formant residual samples which were computed as discussed above. The closed loop formant residual is stored in memory portion 570 while the open loop formant residual is stored in memory portion 572. The samples are stored according to the exemplary numbering scheme as discussed above. The closed loop formant residual is organized as discussed above with respect to usage for each pitch lag L search. The open loop formant residual is computed from the input speech samples s(n) for each pitch subframe using the formant analysis filter 574 which uses the decoder subsystem formant synthesis filter 552 memory $M_a$ in computing the values of $p_o(n)$. The values of $p_o(n)$ for the current pitch subframe are shifted through a series of delay elements 576 for providing to memory portion 572 of adaptive codebook 568. The open loop formant residuals are stored with the first residual sample generated numbered as 0 and the last numbered 142.

Referring now to FIG. 16, the impulse response h(n) of the formant filter is computed in filter 566 and output to shift register 580. As discussed above with respect to the impulse response of the formant filter h(n), equations (29)-(30) and (35)-(38), these values are computed for each pitch subframe in filter. To further reduce the computational requirements of the pitch filter subsystem, the impulse response of the formant filter h(n) is truncated to 20 samples.

Shift register 580 along with multiplier 582, adder 584 and shift register 586 are configured to perform the recursive convolution between the values h(n) from shift register 580 and the values c(m) from adaptive codebook 568 as discussed above. This convolution operation is performed to find the zero-state response (ZSR) of the formant filter to the input coming from the pitch filter memory, assuming that the pitch gain is set to 1. In operation of the convolution circuitry, n cycles from $L_p$ to 1 for each m while m cycles from $(L_p - 17) - 1$ to $-143$. In register 586 data is not forwarded when $n = 1$ and data is not latched in when $n = L_p$. Data is provided as an output from the convolution circuitry when $m \leq -17$.

Following the convolution circuitry is correlation and comparison circuitry which performs the search to find the optimal pitch lag L and pitch gain b. The correlation circuitry, also referred to as the mean square error (MSE) circuitry, computes the auto and cross-correlation of the ZSR with the perceptually weighted difference between the ZIR of the formant filter and the input speech, i.e. x(n). Using these values, the correlation circuitry computes the value of the optimal pitch gain b for each value of the pitch lag. The correlation circuitry is comprised of shift register 588, multipliers 590 and 592, adders 594 and 596, registers 598 and 600, and divider 602. In the correlation circuitry computations are such that n cycles from $L_p$ to 1 while m cycles from $(L_p - 17) - 1$ to $-143$.

The correlation circuitry is followed by comparison circuitry which performs the comparisons and stores the data in order to determine the optimum value of pitch lag L and gain b. The comparison circuitry is comprised of multiplier 604; comparator 606; registers 608, 610 and 612; and quantizer 614. The comparison circuitry outputs for each pitch subframe the values for L and b which minimize the error between the synthesized speech and the input speech. The value of b is quantized into eight levels by quantizer 614 and represented by a 3-bit value, with an additional level, b = 0 level being inferred when L = 16. These values of L and b are provided to codebook search subsystem 230 and data buffer 222. These values are provided via data packing subsystem 238 or data buffer 222 to decoder 234 for use in the pitch search.

Like the pitch search, the codebook search is an analysis by synthesis coding system, in which encoding is done by selecting parameters which minimize the error between the input speech and the speech synthesized using those parameters. For rate $\frac{1}{8}$, the pitch gain b is set to zero.

As discussed previously, each 20 msec. is subdivided into a number of codebook subframes which, as previously described, depends upon the data rate chosen for the frame. Once per codebook subframe, the parameters G and I, the codebook gain and index, respectively, are calculated. In the calculation of these parameters the LSP frequencies are interpolated for the subframe, except for full rate, in codebook subframe LSP interpolation subsystem 226 in a manner similar to that described with reference to pitch subframe LSP interpolation subsystem 216. The codebook subframe interpolated LSP frequencies are also converted to LPC coefficients by LSP to LPC transformation subsystem 228 for each codebook subframe. Codebook subframe counter 232 is used to keep track of the codebook subframes for which the codebook parameters are computed, with the counter output provided to codebook subframe LSP interpolation subsystem 226 for use in the codebook subframe LSP interpolation. Codebook subframe counter 232 also provides an output, indicative of a completion of a codebook subframe for the selected rate, to pitch subframe counter 224.

The excitation codebook consists of $2^M$ code vectors which are constructed from a unit-variant white Gaussian random sequence. There are 128 entries in the codebook for $M=7$. The codebook is organized in a recursive fashion such that each code vector differs from the adjacent code vector by one sample; that is, the samples in a code vector are shifted by one position such that a new sample is shifted in at one end and a sample is dropped at the other. Therefore a recursive codebook can be stored as a linear array that is $2^M + (L_C - 1)$ long where $L_C$ is the codebook subframe length. However, to simplify the implementation and to conserve memory space, a circular codebook $2^M$ samples long (128 samples) is used.

To reduce calculations, the gaussian values in the codebook are center-clipped. The values are originally chosen from a white gaussian process of variance 1. Then, any value with magnitude less than 1.2 is set to zero. This effectively sets about 75% of the values to zero, producing a codebook of impulses. This center-clipping of the codebook reduces the number of multiplications needed to perform the recursive convolution in the codebook search by a factor of 4, since multiplications by zero need not be performed. The codebook used in the current implementation is given below in Table VII.

As stated previously, the objective is to minimize the error between x(n) and x'(n) over all possible values of I and G. The minimization of the error may be expressed by the following equation:

$$MSE = \frac{1}{L_C} \sum_{n=0}^{L_C-1} (x(n) - x'(n))^2 \quad (39)$$

where $L_C$ is the number of samples in the codebook subframe. Equation (38) may be rewritten with respect to G where:

$$MSE = \frac{1}{L_C} \sum_{n=0}^{L_C-1} (x(n) - Gy(n))^2 \quad (40)$$

where y is derived by convolving the impulse response of the formant filter with the Ith Code vector, assuming that $G=1$. Minimizing the MSE is, in turn, equivalent to maximizing:

$$E_I = \frac{(E_{xy})^2}{E_{yy}} \quad (41)$$

where, $$E_{xy} = \sum_{n=0}^{L_C-1} x(n)y(n) \quad (42)$$

and $$E_{yy} = \sum_{n=0}^{L_C-1} y(n)y(n) \quad (43)$$

The optimum G for the given I is found according to the following equation:

$$G_I = \frac{E_{xy}}{E_{yy}} \quad (44)$$

This search is repeated for all allowed values of I. In contrast to the pitch search, the optimum gain, G, is allowed to be both positive or negative. Finally the index, I, and the codebook gain, G, that maximize $E_I$ are chosen for transmission.

TABLE VIII

| | | | | | | | |
|---|---|---|---|---|---|---|---|
| 0 × 0000 | 0 × 0000 | 0 × 0000 | 0 × 0000 | 0 × 2afe | 0 × 0000 | 0 × 0000 | 0 × 0000 |
| 0 × 41da | 0 × 0000 | 0 × 0000 | 0 × 0000 | 0 × 0000 | 0 × 0000 | 0 × 0000 | 0 × 0000 |
| 0 × 0000 | 0 × 0000 | 0 × 0000 | 0 × 0000 | 0 × 0000 | 0 × 3bb3 | 0 × 0000 | 0 × 363e |
| 0 × 0000 | 0 × 0000 | 0 × 0000 | 0 × 0000 | 0 × 0000 | 0 × 0000 | 0 × 417d | 0 × 0000 |
| 0 × 0000 | 0 × 0000 | 0 × 0000 | 0 × 0000 | 0 × 0000 | 0 × 0000 | 0 × 0000 | 0 × 0000 |
| 0 × 0000 | 0 × 0000 | 0 × 0000 | 0 × 0000 | 0 × 0000 | 0 × 9dfe | 0 × 0000 | 0 × 0000 |
| 0 × 0000 | 0 × 0000 | 0 × 0000 | 0 × 0000 | 0 × 0000 | 0 × 0000 | 0 × 0000 | 0 × 0000 |
| 0 × 0000 | 0 × c58a | 0 × 0000 | 0 × 0000 | 0 × 0000 | 0 × 0000 | 0 × 0000 | 0 × 0000 |
| 0 × 0000 | 0 × c8db | 0 × d365 | 0 × 0000 | 0 × 0000 | 0 × d6a8 | 0 × 0000 | 0 × 0000 |
| 0 × 0000 | 0 × 3e53 | 0 × 0000 | 0 × 0000 | 0 × d5ed | 0 × 0000 | 0 × 0000 | 0 × 0000 |
| 0 × d08b | 0 × 0000 | 0 × 0000 | 0 × 0000 | 0 × 0000 | 0 × 3d14 | 0 × 396a | 0 × 0000 |
| 0 × 0000 | 0 × 0000 | 0 × 0000 | 0 × 0000 | 0 × 0000 | 0 × 4ee7 | 0 × d7ca | 0 × 0000 |
| 0 × 0000 | 0 × 438c | 0 × 0000 | 0 × 0000 | 0 × ad49 | 0 × 30b1 | 0 × 0000 | 0 × 0000 |
| 0 × 0000 | 0 × 0000 | 0 × 0000 | 0 × 0000 | 0 × 0000 | 0 × 0000 | 0 × 0000 | 0 × 0000 |
| 0 × 0000 | 0 × 0000 | 0 × 3fcd | 0 × 0000 | 0 × 0000 | 0 × d187 | 0 × 2e16 | 0 × d09b |
| 0 × cb8d | 0 × 0000 | 0 × 0000 | 0 × 0000 | 0 × 0000 | 0 × 0000 | 0 × 0000 | 0 × 32ff |

Again, the speech coder utilizes a perceptual noise weighting filter of the form set forth in equation (1) which includes a weighted synthesis filter of the form set forth in equation (3). For each codebook index, I, the speech is synthesized and compared with the original speech. The error is weighted by the perceptual weighting filter before its MSE is calculated.

Again it should be noted that x(n), the perceptually weighted difference between the input speech and the ZIR of the weighted pitch and formant filters, needs to be computed only once. However, y(n), the zero state response of the pitch and formant filters for each code vector, needs to be computed for each index I. Because a circular codebook is used, the method of recursive convolution described for pitch search can be used to minimize the computation required.

Referring again to FIG. 15, the encoder includes a duplicate of the decoder of FIG. 5, decoder subsystem 235 of FIG. 7 in which the filter states are computed wherein: $M_p$ is the memory in the pitch synthesis filter 550; $M_a$ is the memory in the formant synthesis filter 552; and $M_w$ is the memory in the perceptual weighting filter 556.

Figure 17:
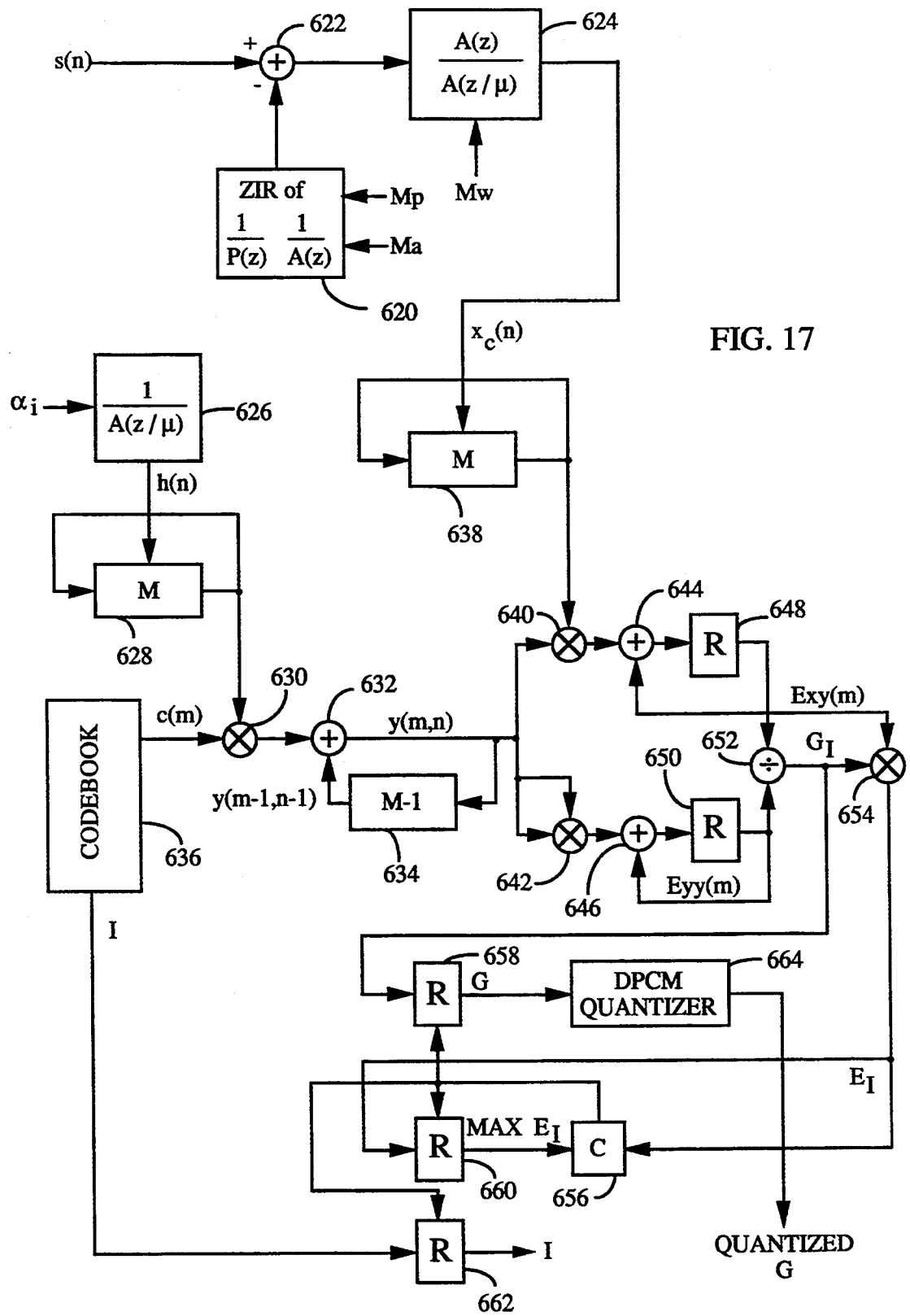
FIG. 17 is a block diagram of the codebook search subsystem.

The filter states $M_p$ and $M_a$, respectively from decoder subsystem pitch synthesis and formant filters 550 and 552 (FIG. 15) are provided to codebook search subsystem 230 of FIG. 7. In FIG. 17, the filter states $M_p$ and $M_a$ are provided to zero impulse response (ZIR) filter 620 which computes the ZIR of pitch and formant synthesis filters 550 and 552. The computed ZIR of the pitch and formant synthesis filters is subtracted from the input speech samples s(n) in adder 622 with the result weighted by the perceptual weighting filter 624. The output from perceptual weighting filter 564, $x_c(n)$, is used as the weighted input speech in the above MSE equations (39)–(44) where $x(n) = x_c(n)$.

FIG. 17, the impulse response h(n) of the formant filter is computed in filter 626 and output to shift register 628. The impulse response of the formant filter h(n), is computed for each codebook subframe. To further reduce the computational requirements, the impulse response h(n) of the formant filter is truncated to 20 samples.

Shift register 628 along with multiplier 630, adder 632 and shift register 634 are configured to perform the recursive convolution between the values h(n) from shift register 628 and the values c(m) from codebook 636 which contains the codebook vectors as discussed above. This convolution operation is performed to find the zero-state response (ZSR) of the formant filter to each code vector, assuming that the codebook gain is set to 1. In operation of the convolution circuitry, n cycles from $L_C$ to 1 for each m, while m cycles from 1 to 256. In register 586 data is not forwarded when n=1 and data is not latched in when n=$L_C$. Data is provided as an output from the convolution circuitry when m<1. It should be noted that the convolution circuitry must be initialized to conduct the recursive convolution operation by cycling m subframe size times before starting the correlation and comparison circuitry which follow the convolution circuitry.

The correlation and comparison circuitry conducts the actual codebook search to yield the codebook index I and codebook gain G values. The correlation circuitry, also referred to as the mean square error (MSE) circuitry, computes the auto and cross-correlation of the ZSR with the perceptually weighted difference between the ZIR of the pitch and formant filters, and the input speech x'(n). In other words the correlation circuitry computes the value of the codebook gain G for each value of the codebook index I. The correlation circuitry is comprised of shift register 638, multipliers 640 and 642, adders 644 and 646, registers 648 and 650, and divider 652. In the correlation circuitry computations are such that n cycles from $L_C$ to 1 while m cycles from 1 to 256.

The correlation circuitry is followed by comparison circuitry which performs the comparisons and storing of data in order to determine the optimum value of codebook index I and gain G. The comparison circuitry is comprised of multiplier 654; comparator 656; registers 658, 660 and 662; and quantizer 664. The comparison circuitry provides for each codebook subframe the values for I and G which minimize the error between the synthesized speech and the input speech. The codebook gain G is quantized in quantizer 614 which DPCM codes the values during quantization in a manner similar to the bias removed LSP frequency quantization and coding as described with reference to FIG. 12. These values for I and G are then provided to data buffer 222.

In the quantization and DPCM encoding of the codebook gain G is computed in accordance with the following equation:

$$\text{Quantized } G_i = 20 \log G_i - 0.45(20 \log G_{i-1} + 20 \log G_{i-2}) \quad (45)$$

where $20 \log G_{i-1}$ and $20 \log G_{i-2}$ are the respective values computed for the immediately previous frame (i−1) and the frame preceeding the immediately previous frame (i−2).

The LSP, I, G, L and b values along with the rate are provided to data packing subsystem 236 where the data is arranged for transmission. In one implementation the LSP, I, G, L and b values along with the rate may be provided to decoder 234 via data packing subsystem 236. In another implementation these values may be provided via data buffer 222 to decoder 234 for use in the pitch search. However in the preferred embodiment protection of the codebook sign bit is employed within data packing subsystem 236 which may affect the codebook index. Therefore this protection must be taken into account should I and G data be provided directly from data buffer 222.

Figure 18:
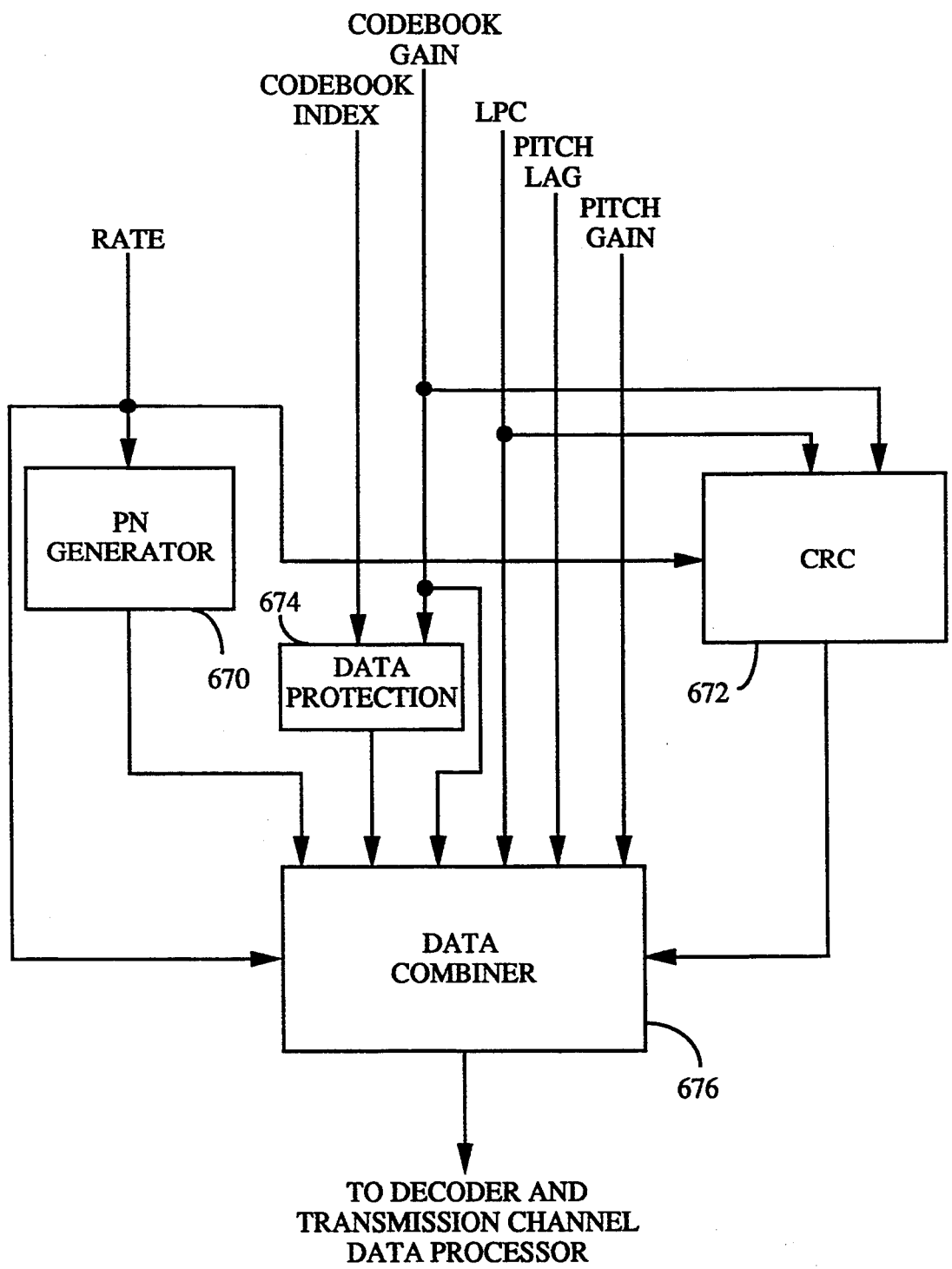
FIG. 18 is a block diagram of the data packing subsystem.

In data packing subsystem 236 the data may be packed in accordance with various formats for transmission. FIG. 18 illustrates an exemplary embodiment of the functional elements of data packing subsystem 236. Data packing subsystem 236 is comprised of pseudrandom generator (PN) 670, cyclic redundancy check (CRC) computational element 672, data protection logic 674 and data combiner 676. PN generator 670 receives the rate and for eighth rate generates a 4-bit random number that is provided to data combiner 676. CRC element 672 receives the codebook gain and LSP values along with the rate, and for full rate generates an 11-bit internal CRC code that is provided to data combiner 676.

Data combiner 674 receives the random number; CRC code; and along with the rate and LSP, I, G, L and b values from data buffer 222 (FIG. 7b) provides an output to transmission channel data processor subsystem 234. In the implementation where the data is provided directly from data buffer 222 to decoder 234 at a minimum the PN generator 4-bit number is provided from PN generator 670 via data combiner 676 to decoder 234. At full rate the CRC bits are included along with the frame data as output from data combiner 674, while at eighth rate the codebook index value is dropped and replaced by the random 4-bit number.

In the exemplary embodiment it is preferred that protection be provided to the codebook gain sign bit. Protection of this bit is to make the vocoder decoder less sensitive to a single bit error in this bit. If the sign bit were changed due to an undetected error, the codebook index would point to a vector unrelated to the optimum. In the error situation without protection, the negative of the optimum vector would be selected, a vector which is in essence the worst possible vector to be used.

The protection scheme employed herein ensures that a single bit error in the gain sign bit will not cause the negative of the optimum vector to be selected in the error situation. Data protection logic 674 receives the codebook index and gain and examines the sign bit of the gain value. If the gain value sign bit is determined to be negative the value 89 is added, mod 128, to the associated codebook index. The codebook index whether or not modified is output from data protection logic 674 to data combiner 676.

In the exemplary embodiment it is preferred that at full rate, the most perceptually sensitive bits of the compressed voice packet data are protected, such as by an internal CRC (cyclic redundancy check). Eleven extra bits are used to perform this error detection and correction function which is capable of correcting any single error in the protected block. The protected block consists of the most significant bit of the 10 LSP frequencies and the most significant bit of the 8 codebook gain values. If an uncorrectable error occurs in this block, the packet is discarded and an erasure, described later, is declared. Otherwise, the pitch gain is set to zero but the rest of the parameters are used as received. In the exemplary embodiment a cyclic code is chosen to have a generator polynomial of:

$$g(x) = 1 + x_3 + x^5 + x^6 + x^8 + x^9 + x^{10} \qquad (46)$$

yielding a (31,21) cyclic code. However, it should be understood that other generator polynomials may be used. An overall parity bit is appended to make it a (32,21) code. Since there are only 18 information bits, the first 3 digits in the code word are set to zero and not transmitted. This technique provides added protection such that if the syndrome indicates an error in these positions, it means there is an uncorrectable error. The encoding of a cyclic code in systematic form involves the computation of parity bits as $x^{10} u(x)$ modulo $g(x)$ where $u(x)$ is the message polynomial.

At the decoding end, the syndrome is calculated as the remainder from dividing the received vector by $g(x)$. If the syndrome indicates no error, the packet is accepted regardless of the state of the overall parity bit. If the syndrome indicates a single error, the error is corrected if the state of the overall parity bit does not check. If the syndrome indicates more than one error, the packet is discarded. Further details on such an error protection scheme can be found in section 4.5 of "Error Control coding: Fundamentals and Applications" by Lin and Costello for details of syndrome calculation.

In a CDMA cellular telephone system implementation the data is provided from data combiner 674 to transmission channel data processor subsystem 238 for data packing for transmission in 20 msec. data transmission frames. In a transmission frame in which the vocoder is set for full rate, 192 bits are transmitted for an effective bit rate of 9.6 kbps. The transmission frame in this case is comprised of one mixed mode bit used to indicate mixed frame type (0=voice only, 1=voice and data/signaling); 160 vocoder data bits along with 11 internal CRC bits; 12 external or frame CRC bits; and 8 tail or flush bits. At half rate, 80 vocoder data bits are transmitted along with 8 frame CRC bits and 8 tail bits for an effective bit rate of 4.8 kbps. At quarter rate, 40 vocoder data bits are transmitted along with 8 tail bits for an effective bit rate of 2.4 kbps. Finally, at eighth rate 16 vocoder data bits are transmitted along with 8 tail bits for an effective bit rate of 1.2 kbps.

Further details on the modulation employed in a CDMA system in which the vocoder of the present invention is to be employed are disclosed in copending U.S. patent application Ser. No. 07/543,496, filed Jun. 25, 1990, and entitled "SYSTEM AND METHOD FOR GENERATING SIGNAL WAVEFORMS IN A CDMA CELLULAR TELEPHONE SYSTEM", assigned to the Assignee of the present invention. In this system at rates other than full rate a scheme is employed in which the data bits are organized into groups with the bit groups psuedorandomly positioned within the 20 msec. data transmission frame. It should be understood that other frame rates and bit representations may readily be employed other than those presented for purposes of illustration herein with respect to the vocoder and the CDMA system implementation, such that other implementations are available for the vocoder and other system applications.

In the CDMA system, and also applicable to other systems, processor subsystem 238 on a frame by frame basis may interrupt transmission of vocoder data to transmit other data, such as signalling data or other non-speech information data. This particular type of transmission situation is referred to as "blank and burst". Processor subsystem 238 essentially replaces the vocoder data with the desired transmission data for the frame.

Another situation may arise where there is a desire to transmit both vocoder data and other data during the same data transmission frame. This particular type of transmission situation is referred to as "dim and burst". In a "dim and burst" transmission, the vocoder is provided with rate bound commands which set the vocoder final rate at the desired rate, such as half rate. The half rate encoded vocoder data is provided to processor subsystem 238 which inserts the additional data along with the vocoder data for the data transmission frame.

An additional function provided for full-duplex telephone links is a rate interlock. If one direction of the link is transmitting at the highest transmission rate, then the other direction of the link is forced to transmit at the lowest rate. Even at the lowest rate, sufficient intelligibility is available for the active talker to realize that he is being interrupted and to stop talking, thereby allowing the other direction of the link to assume the active talker role. Furthermore, if the active talker continues to talk over an attempted interruption, he will probably not perceive a degradation in quality because his own speech "jams" the ability to perceive quality. Again by using the rate bound commands the vocoder can be set to vocode the speech at a lower than normal rate.

It should be understood that the rate bound commands can be used to set the vocoder maximum rate at less than full rate when additional capacity in the CDMA system is needed. In a CDMA system in which a common frequency spectrum is used for transmission, one users signal appears as interference to other users in the system. System user capacity is thus limited by the total interference caused by system users. As the level of interference increases, normally due to an increase in users within the system, a degradation in quality is experienced by the users due to the increase in interference.

Each user's contribution to interference in the CDMA system is a function of the user's transmission data rate. By setting a vocoder to encode speech at a lower than normal rate, the encoded data is then transmitted at the corresponding reduced transmission data rate, which reduces the level of interference caused by that user. Therefore system capacity may be substantially increased by vocoding speech at a lower rate. As system demand increases, user vocoders may be commanded by the system controller or cell base station to reduce encoding rate. The vocoder of the present invention is of a quality such that there is very little, although some, perceptable difference between speech encoded at full and half rate. Therefore the effect in quality of communications between system users where speech is vocoded at a lower rate, such as half rate, is less significant than that caused by an increasing level of interference which results from an increased number of users in the system.

Various schemes may therefore be employed to set individual vocoder rate bounds for lower than normal vocoding rates. For example, all users in a cell may be commanded to encode speech at half rate. Such action substantially reduces system interference, with little effect in quality in communications between users, while providing a substantial increase in capacity for additional users. Until the total interference in the system is increased by the additional users to a level of degradation there is no impact in quality in communications between users.

As mentioned previously, the encoder includes a copy of the decoder in order to accomplish the analysis-by-synthesis technique in encoding the frames of speech samples. As illustrated in FIG. 7, decoder 234 receives the values L, b, I and I either via data packing subsystem 238 or data buffer 222 for reconstructing the synthesized speech for comparison with the input speech. The outputs from decoder are the values $M_p$, $M_a$, and $M_w$ as discussed previously. Further details on decoder 234 as used in the encoder and in reconstructing the synthesized speech at the other end of the transmission channel may be discussed together with reference to FIGS. 19–24.

Figure 19:
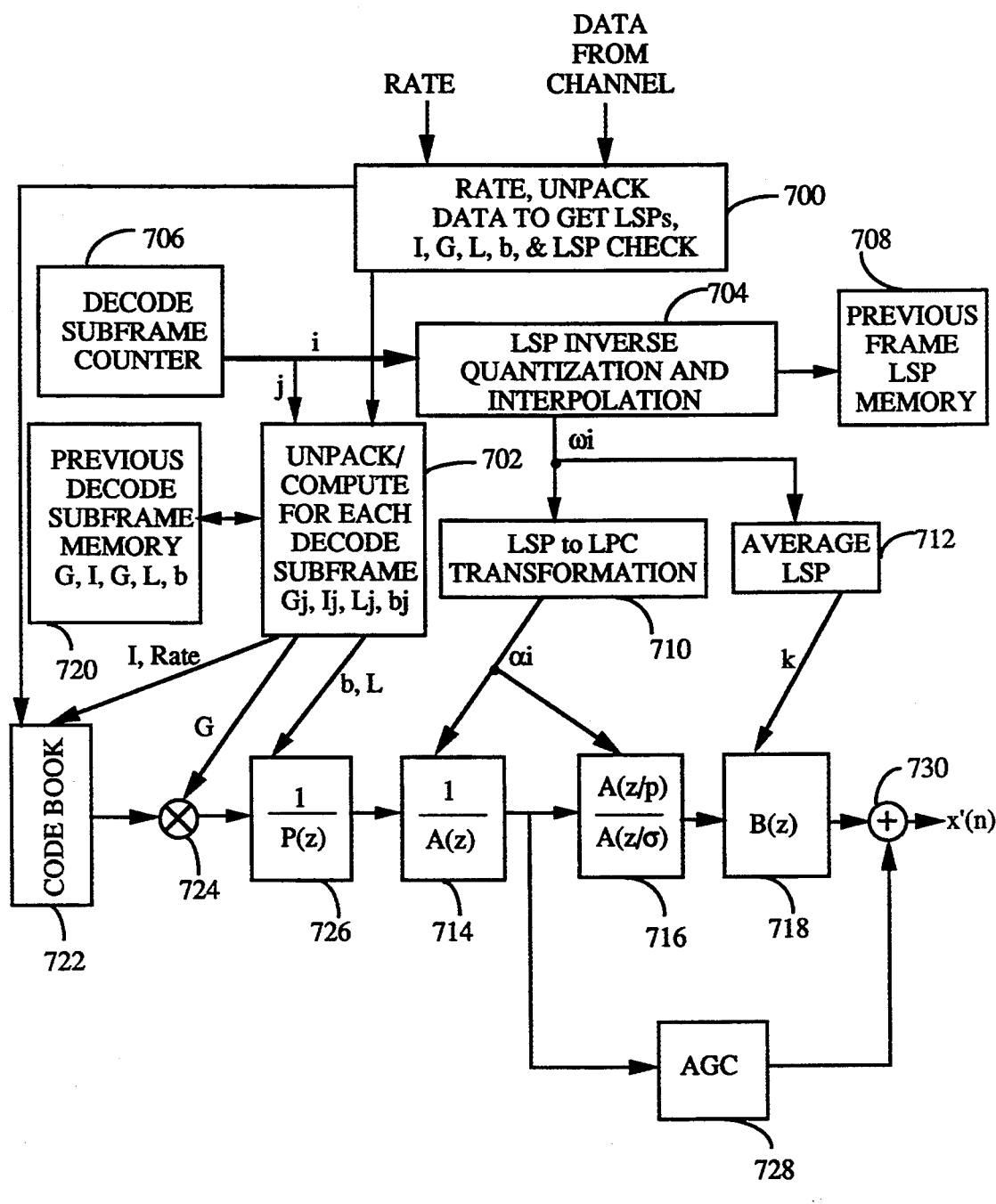
FIG. 19 is a more detailed functional block diagram of the decoder.

FIG. 19 is a flow diagram for an exemplary implementation of the decoder of the present invention. Due to a common structure of the decoder as implemented within the encoder, and at the receiver, these implementations are discussed together. The discussion with respect to FIG. 19 is primarily concerned with the decoder at the end of the transmission channel since data received thereat must be preprocessed in the decoder whereas in the encoder's decoder the appropriate data (rate, I, G, L and b) is received directly from data packing subsystem 238 or data buffer 222. However, the basic function of the decoder is the same for both encoder and decoder implementations.

As discussed with reference to FIG. 5, for each codebook subframe, the codebook vector specified by the codebook index I is retrieved from the stored codebook. The vector is multiplied by the codebook gain G and then filtered by the pitch filter for each pitch subframe to yield the formant residual. This formant residual is filtered by the formant filter and then passed through an adaptive formant postfilter and a brightness postfilter, along with automatic gain control (AGC) to produce the output speech signal.

Although the length of codebook and pitch subframe varies, decoding is done in 40 sample blocks for ease of implementation. The compressed data received is first unpacked into codebook gains, codebook indexes, pitch gains, pitch lags, and LSP frequencies. The LSP frequencies must be processed through their respective inverse quantizers and DPCM decoders as discussed with reference to FIG. 22. Similarly the codebook gain values must be processed in a similar manner to the LSP frequencies, except without the bias aspect. Also the pitch gain values are inverse quantized. These parameters are then provided for each decoding subframe. In each decoding subframe, 2 sets of codebook parameters (G & I), 1 set of pitch parameters (b & L), and 1 set of LPC coefficients are needed to generate 40 output samples. FIGS. 20 and 21 illustrate exemplary subframe decoding parameters for the various rates and other frame conditions.

For full rate frames, there are 8 sets of received codebook parameters and 4 sets of received pitch parameters. The LSP frequencies are interpolated four times to yield 4 sets of LSP frequencies. The parameters received and corresponding subframe information is listed in FIG. 20a.

For half rate frames, each set of the four received codebook parameters is repeated once, each set of the two received pitch parameters is repeated once. The LSP frequencies are interpolated three times to yield 4 sets of LSP frequencies. The parameters received and corresponding subframe information is listed in FIG. 20b.

For quarter rate frames, each set of the two received codebook parameters is repeated four times, the set of pitch parameters is also repeated four times. The LSP frequencies are interpolated once to yield 2 sets of LSP frequencies. The parameters received and corresponding subframe information is listed in FIG. 20c.

For eighth rate frames, the set of received codebook parameters is used for the entire frame. Pitch parameters are not present for eighth rate frames and the pitch gain is simply set to zero. The LSP frequencies are interpolated once to yield 1 set of LSP frequencies. The parameters received and corresponding subframe information is listed in FIG. 20d.

Occasionally, the voice packets may be blanked out in order for the CDMA cell or mobile station to transmit signalling information. When the vocoder receives a blank frame, it continues with a slight modification to the previous frame's parameters. The codebook gain is set to zero. The previous frame's pitch lag and gain are used as the current frame pitch lag and gain except that the gain is limited to one or less. The previous frame's LSP frequencies are used as is without interpolation. Note that the encoding end and the decoding end are still synchronized and the vocoder is able to recover from a blank frame very quickly. The parameters received and corresponding subframe information is listed in FIG. 21a.

In the event that a frame is lost due to a channel error, the vocoder attempts to mask this error by maintaining a fraction of the previous frame's energy and smoothly transitioning to background noise. In this case the pitch gain is set to zero; a random codebook is selected by using the previous subframe's codebook index plus 89; the codebook gain is 0.7 times the previous subframe's codebook gain. It should be noted that there is nothing magic about the number 89, this is just a convenient way of selecting a pseudorandom codebook vector. The previous frame's LSP frequencies are forced to decay toward their bias values as:

$$\omega_i = 0.9 \text{ (previous } \omega_i\text{-bias value of } \omega_i) + \text{bias value of } \omega_i. \quad (47)$$

The LSP frequency bias values are shown in Table 5. The parameters received and corresponding subframe information is listed in FIG. 21b.

If the rate cannot be determined at the receiver, the packet is discarded and an erasure is declared. However, if the receiver determines there is a strong likelihood the frame was transmitted at full rate, though with errors the following is done. As discussed previously at full rate, the most perceptually sensitive bits of the compressed voice packet data are protected by an internal CRC. At the decoding end, the syndrome is calculated as the remainder from dividing the received vector by g(x), from equation (46). If the syndrome indicates no error, the packet is accepted regardless of the state of the overall parity bit. If the syndrome indicates a single error, the error is corrected if the state of the overall parity bit does not check. If the syndrome indicates more than one error, the packet is discarded. If an uncorrectable error occurs in this block, the packet is discarded and an erasure is declared. Otherwise the pitch gain is set to zero but the rest of the parameters are used as received with corrections, as illustrated in FIG. 21c.

The postfilters used in this implementation were first described in "Real-Time Vector APC Speech Coding At 4800 BPS with Adaptive postfiltering" by J. H. Chen et al., Proc. ICASSP, 1987. Since speech formants are perceptually more important than spectral valleys, the postfilter boosts the formants slightly to improve the perceptual quality of the coded speech. This is done by scaling the poles of the formant synthesis filter radially toward the origin. However, an all pole postfilter generally introduces a spectral tilt which results in muffling of the filtered speech. The spectral tilt of this all pole postfilter is reduced by adding zeros having the same phase angles as the poles but with smaller radii, resulting in a postfilter of the form:

$$H(z) = \frac{A(z/\rho)}{A(z/\sigma)} \quad 0 < \rho < \sigma < 1 \quad (48)$$

where A(z) is the formant prediction filter and the values $\rho$ and $\sigma$ are the postfilter scaling factors where $\rho$ is set to 0.5, and $\sigma$ is set to 0.8.

An adaptive brightness filter is added to further compensate for the spectral tilt introduced by the formant postfilter. The brightness filter is of the form:

$$B(z) = \frac{1 - \kappa z^{-1}}{1 + \kappa z^{-1}} \quad (49)$$

where the value of $\kappa$ (the coefficient of this one tap filter) is determined by the average value of the LSP frequencies which approximates the change in the spectral tilt of A(z).

To avoid any large gain excursions resulting from postfiltering, an AGC loop is implemented to scale the speech output so that it has roughly the same energy as the non-postfiltered speech. Gain control is accomplished by dividing the sum of the squares of the 40 filter input samples by the sum of the squares of the 40 filter output samples to get the inverse filter gain. The square root of this gain factor is then smoothed:

Smoothed $\beta = 0.2$ current $\beta + 0.98$ previous $\beta$  (50)

and then the filter output is multiplied with this smoothed inverse gain to produce the output speech.

In FIG. 19 the data from the channel along with the rate, either transmitted along with the data or derived by other means is provided to data unpacking subsystem 700. In an exemplary implementation for a CDMA system a rate decision can be derived from the error rate is the received data when it is decoded at each of the different rates. In data unpacking subsystem 700, at full rate a check of the CRC is made for errors with the result of this check provided to subframe data unpack subsystem 702. Subsystem 700 provides an indication of abnormal frame conditions such as a blank frame, erasure frame or error frame with usable data to subsystem 702. Subsystem 700 provides the rate along with the parameters I, G, L, and b for the frame to subsystem 702. In providing the codebook index I and gain G values, the sign bit of the gain value is checked in subsystem 702. If the sign bit is negative, the value 89 is subtracted, mod 128, from the associated codebook index. Furthermore in subsystem the codebook gain is inverse quantized and DPCM decoded, while the pitch gain is inverse quantized.

Subsystem 700 also provides the rate and the LSP frequencies to LSP inverse quantization/interpolation subsystem 704. Subsystem 700 further provides an indication of a blank frame, erasure frame or error frame with usable data to subsystem 704. Decode subframe counter 706 provides an indication of the subframe count value i and j to both subsystems 702 and 704.

Figure 22:
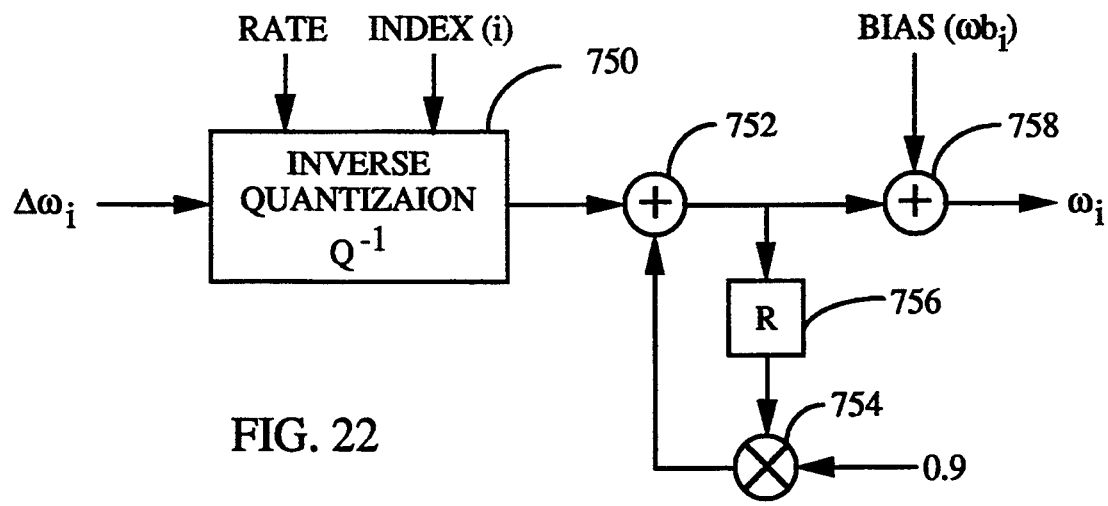
FIG. 22 is a block diagram of the LSP inverse quantization subsystem.

In subsystem 704 the LSP frequencies are inverse quantized and interpolated. FIG. 22 illustrates an implementation of the inverse quantization portion of subsystem 704, while the interpolation portion is substantially identical to that described with reference to FIG. 12. In FIG. 22, the inverse quantization portion of subsystem 704 is comprised of inverse quantizer 750, which is constructed identical to that of inverse quantizer 468 of FIG. 12 and operates in a similar manner. The output of inverse quantizer 750 is provided as one input to adder 752. The other input to adder 752 is provided as the output of multiplier 754. The output of adder 752 is provided to register 756 where stored and output for multiplication with the constant 0.9 in multiplier 754. The output from adder 752 is also provided to adder 758 where the bias value is added back into the LSP frequency. The ordering of the LSP frequencies is ensured by logic 760 which forces the LSP frequencies to be of a minimum separation. Generally the need to force separation does not occur unless an error occurs in transmission. The LSP frequencies are the interpolated as discussed with reference to FIG. 13 and with reference to FIGS. 20a–20d and 21a–21c.

Referring back to FIG. 19, memory 708 is coupled to subsystem 704 for storing previous frame LSPs, $\omega_{i,f-1}$, and may also be used to store the bias values $b\omega_i$. These previous frame values are used in the interpolation for all rates. For conditions of blanking, erasure or error frame with usable data, the previous LSPs $\omega_{i,f-1}$ are used in accordance with the chart in FIGS. 21a–21c. In response to a blank frame indication from subsystem 700, subsystem 704 retrieves the previous frame LSP frequencies stored in memory 708 for use in the current frame. In response to an erasure frame indication, subsystem 704 again retrieves the previous frame LSP frequencies from memory 708 along with the bias values so as to compute the current frame LSP frequencies as discussed above. In performing this computation the stored bias value is subtracted from the previous frame LSP frequency in an adder, with the result multiplied in a multiplier by a constant value of 0.9 with this result added in an adder to the stored bias value. In response to an error frame with usable data indication, the LSP frequencies are interpolated as was for full rate if the CRC passes.

The LSPs are provided to LSP to LPC transformation subsystem 710 where the LSP frequencies are converted back to LPC values. Subsystem 710 is substantially identical to LSP to LPC transformation subsystems 218 and 228 of FIG. 7 and as described with reference to FIG. 13. The LPC coefficients $\alpha_i$ are then provided to both formant filter 714 and formant postfilter 716. The LSP frequencies are also averaged over the subframe in LSP averager subsystem 712 and provided to adaptive brightness filter 718 as the value $\kappa$.

Subsystem 702 receives the parameters I, G, L, and b for the frame from subsystem 700 along with the rate or abnormal frame condition indication. Subsystem 702 also receives from subframe counter 706 the j counts for each i count in each decode subframe 1–4. Subsystem 702 is also coupled to memory 720 which stores the previous frame values for G, I, L and b for use in abnormal frame conditions. Subsystem 702 under normal frame conditions, except for eighth rate, provides the codebook index value $I_j$ to codebook 722; the codebook gain value $G_j$ to multiplier 724; and the pitch lag L and gain b values to pitch filter 726 in accordance with FIG. 20a–20d. For eighth rate since there is no value for the codebook index sent, a packet seed which is the 16-bit parameter value (FIG. 2d) for eighth rate is provided to codebook 722 along with a rate indication. For abnormal frame conditions the values are provided from subsystem 702 in accordance with FIGS. 21a–21c. Furthermore for eighth rate, an indication is provided to codebook 722 as is discussed with reference to FIG. 23.

In response to a blank frame indication from subsystem 700, subsystem 702 retrieves the previous frame pitch lag L and gain b values, except the gain is limited to one or less, stored in memory 708 for use in the current frame decode subframes. Furthermore no codebook index I is provided and the codebook gain G is set to zero. In response to an erasure frame indication, subsystem 702 again retrieves the previous frame subframe codebook index from memory 720 and adds in an adder the value of 89. The previous frame subframe codebook gain is multiplied in a multiplier by the constant 0.7 to produce the respective subframe values of G. No pitch lag value is provided while the pitch gain is set to zero. In response to an error frame with usable data indication, the codebook index and gain are used as in a full rate frame, provided the CRC passes, while no pitch lag value is provided and the pitch gain is set to zero.

As discussed with reference to the encoder's decoder in the analysis-by-synthesis technique, the codebook index I is used as the initial address for the codebook value for output to multiplier 724. The codebook gain value is multiplied in multiplier 724 with the output value from codebook 722 with the result provided to pitch filter 726. Pitch filter 726 uses the input pitch lag L and gain b values to generate the formant residual which is output to formant filter 714. In formant filter 714 the LPC coefficients are used in filtering the formant residual so as to reconstruct the speech. At the receiver decoder the reconstructed speech is further filtered by formant postfilter 716 and adaptive brightness filter 718. AGC loop 728 is used at the output of formant filter 714 and formant postfilter 716 with output thereof multiplied in multiplier 730 with the output of adaptive brightness filter 718. The output of multiplier 730 is the reconstructed speech which is then converted to analog form using known techniques and presented to the listener. In the encoders decoder, the perceptual weighting filter is placed at the output in order to update its memories.

Referring to FIG. 22, further details of the implementation of the decoder itself are illustrated. In FIG. 22 codebook 722 is comprised of memory 750 similar to that described with reference to FIG. 17. However for purposes of explanation a slightly different approach is illustrated for memory 750 and the addressing thereof is illustrated in FIG. 22. Codebook 722 is further comprised of switch 752, multiplexer 753 and pseudorandom number (PN) generator 754. Switch 752 is responsive to the codebook index for pointing to the index address location of memory 750, as was discussed with reference to FIG. 17. Memory 750 is a circular memory with switch 752 pointing to the initial memory location with the values shifted through the memory for output. The codebook values are output from memory 750 through switch 752 as one input to multiplexer 753. Multiplexer 753 is responsive to the rates of full, half and quarter for providing an output of the values provided through switch 752 to codebook gain amplifier, multiplier 724. Multiplexer 753 is also responsive to the eighth rate indication for selecting the output of PN generator 754 for the output of codebook 722 to multiplier 724.

In order to maintain high voice quality in CELP coding, the encoder and decoder must have the same values stored in their internal filter memories. This is done by transmitting the codebook index, so that the decoder's and encoder's filters are excited by the same sequence of values. However, for the highest speech quality these sequences consist of mostly zeroes with some spikes distributed among them. This type of excitation is not optimum for coding background noise.

In coding background noise, done at the lowest data rate, a pseudorandom sequence may be implemented to excite the filters. In order to ensure that the filter memories are the same in the encoder and decoder, the two pseudorandom sequences must be the same. A seed must be transmitted somehow to the receiver decoder. Since there are no additional bits that could be used to send the seed, the transmitted packet bits can be used as the seed, as if they made up a number. This technique can be done because, at the low rate, the exact same CELP analysis by synthesis structure to determine the codebook gain and index is used. The difference is that the codebook index is thrown out, and the encoder filter memories are instead updated using a pseudorandom sequence. Therefore the seed for the excitation can be determined after the analysis is done. In order to ensure that the packets themselves do not periodically cycle between a set of bit patterns, four random bits are inserted in the eighth rate packet in place of the codebook index values. Therefore the packet seed is the 16-bit value as referenced in FIG. 2d.

PN generator 754 is constructed using well known techniques and may be implemented by various algorithms. In the exemplary embodiment the algorithm employed is of a nature as described in the article "DSP chips can produce random numbers using proven algorithm" by Paul Mennen, EDN, Jan. 21, 1991. The transmitted bit packet is used as the seed (from subsystem 700 of FIG. 18) for generating the sequence. In one implementation the seed is multiplied by the value 521 with the value 259 added thereto. From this resulting value the least significant bits are used as a signed 16 bit number. This value is then used as the seed in generating the next codebook value. The sequence generated by the PN generator is normalized to have a variance of 1.

Each value output from codebook 722 is multiplied in multiplier 724 by the codebook gain G as provided during the decode subframe. This value is provided as one input to adder 756 of pitch filter 726. Pitch filter 726 is further comprised of multiplier 758 and memory 760. The pitch lag L determines the position of a tap of memory 760 that is output to multiplier 758. The output of memory 760 is multiplied in multiplier 758 with the pitch gain value b with the result output to adder 756. The output of adder 756 is provided to an input of memory 760 which is a series of delay elements such as a shift register. The values are shifted through memory 760 (in a direction as indicated by the arrow) and provided at the selected tap output as determined by the value of L. Since the values are shifted through memory 760, values older than 143 shifts are discarded. The output of adder 756 is also provided as an input to formant filter 714.

The output of adder 756 is provided to one input of adder 762 of formant filter 714. Formant filter 714 is further comprised of bank of multipliers 764a-764j and memory 766. The output of adder 762 is provided as an input to memory 766 which is also constructed as a series of tapped delay elements such as a shift register. The values are shifted through memory 766 (in a direction as indicated by the arrow) and are dumped at the end. Each element has a tap which provides the value stored there as an output to a corresponding one of multipliers 764a-764j. Each one of one of multipliers 764a-764j also receives a respective one of the LPC coefficients $\alpha_1$-$\alpha_{10}$ for multiplication with the output from memory 766. The output from adder 762 is provided as an output of formant filter 714.

The output of formant filter 714 is provided as an input to formant postfilter 716 and AGC subsystem 728. Formant postfilter 716 is comprised of adders 768 and 770 along with memory 772 and multipliers 774a-774j, 776a-776j, 780a-780j, and 782a-782j. As the values are shifted through memory 772 they are output at the corresponding taps for multiplication with the scaled LPC coefficient values for summation in adders 768 and 770. The output from formant postfilter 716 is provided as an input to adaptive brightness filter 718.

Figure 24:
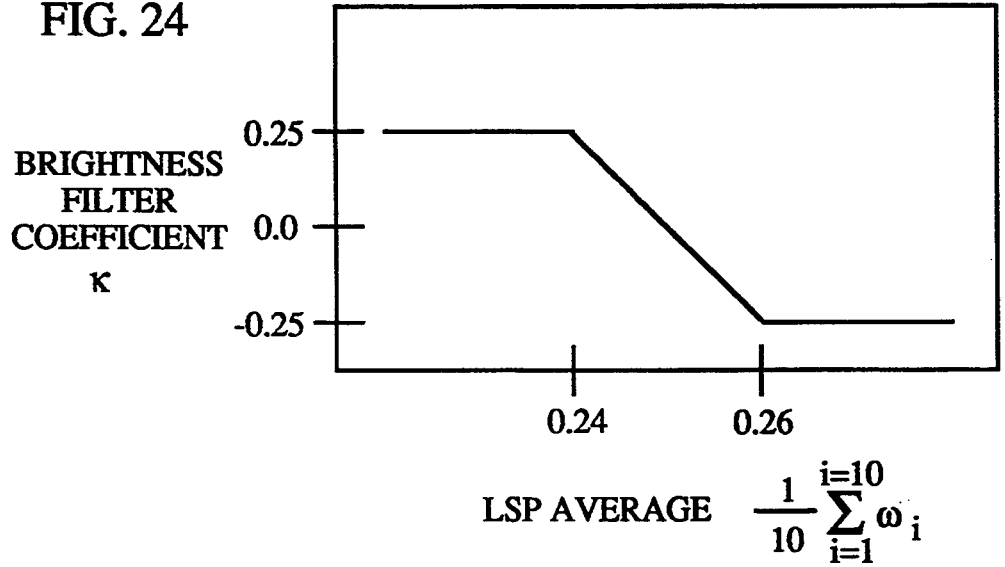
FIG. 24 is a chart illustrating the adaptive brightness filter characteristics.
Figure 23:
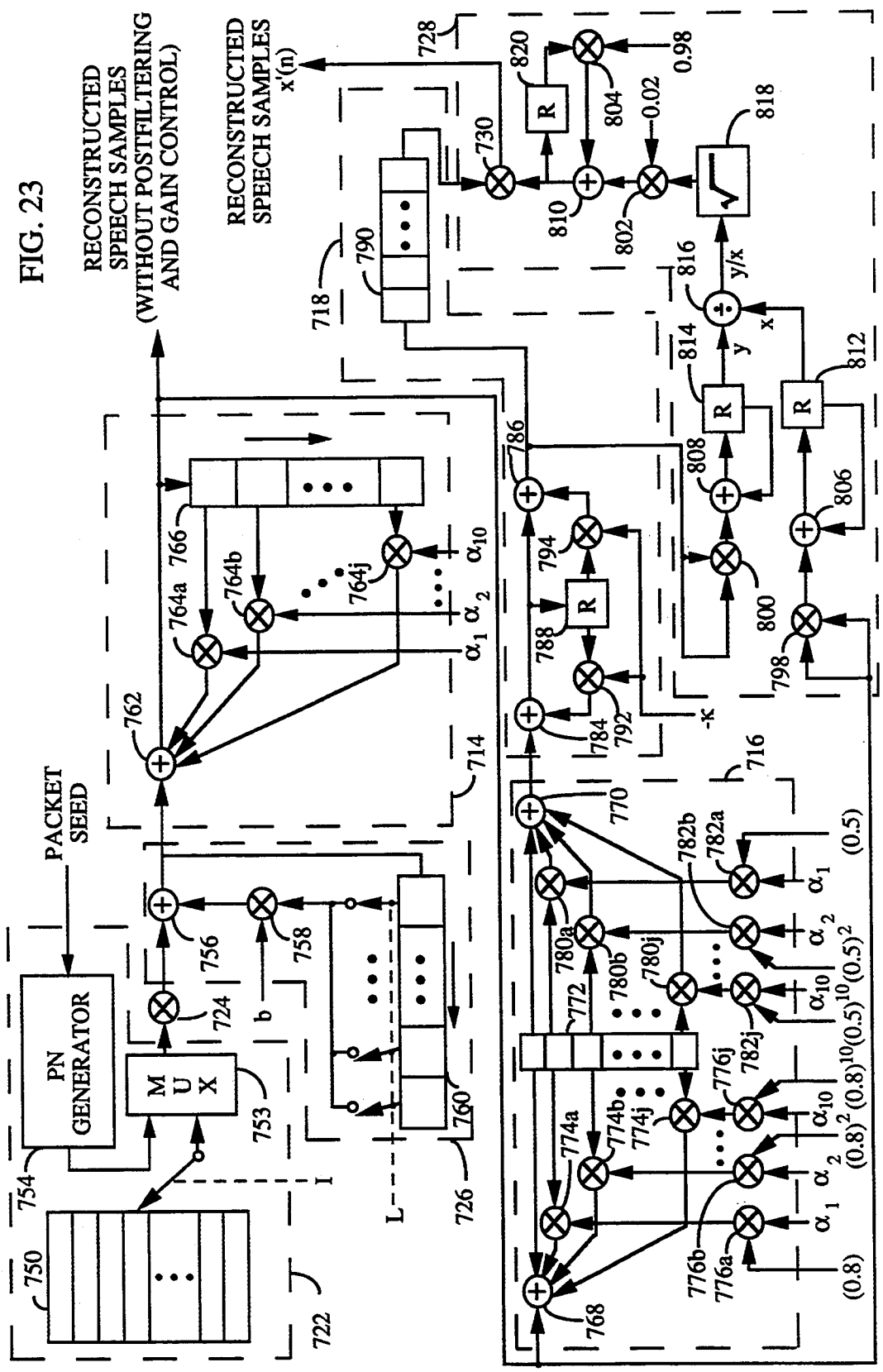
FIG. 23 is a block diagram in greater detail of the decoder with postfiltering and automatic gain control.

Adaptive brightness filter 718 is comprised of adders 784 and 786, registers 788 and 790, and multipliers 792 and 794. FIG. 24 is a chart illustrating the characteristics of the adaptive brightness filter. The output of formant postfilter 716 is provided as one input to adder 784 while the other input is provided from the output of multiplier 792. The output of adder 784 is provided to register 788 and stored for one cycle and output during the next cycle to multipliers 792 and 794 along with the value $-\kappa$ provided from LSP averager 712 of FIG. 19. The output from multipliers 792 and 794, are provided both to adders 784 and 786. The output from adder 786 is provided to AGC subsystem 728 and to shift register 790. Register 790 is used as a delay line to ensure coordination in the data output from formant filter 714 to AGC subsystem 728 and provided to adaptive brightness filter 718 via formant postfilter 716.

AGC subsystem 728 receives the data from formant postfilter 716 and adaptive brightness filter 718 so as to scale the speech output energy to about that of the speech input to formant postfilter 716 and adaptive brightness filter 718. AGC subsystem 728 is comprised of multipliers 798, 800, 802 and 804; adders 806, 808 and 810; register 812, 814 and 816; divider 818; and square root element 820. The 40 sample output from formant postfilter 716 is squared in multiplier 798 and summed in an accumulator comprised of adder 806 and register 812 to produce the value "x". Similarly the 40 sample output from adaptive brightness filter 718, taken prior to register 790, is squared in multiplier 800 and summed in an accumulator comprised of adder 808 and register 814 to produce the value "y". The value "y" is divided by the value "x" in divider 816 to result in the inverse gain of the filters. The square root of the inverse gain factor is taken in element 818 with the result thereof smoothed. The smoothing operation is accomplished by multiplying the current value gain G by the constant value 0.02 in multiplier 802 with this result added in adder 810 to the result of 0.98 times the previous gain as computed using register 820 and multiplier 804. The output of filter 718 is then multiplied with the smoothed inverse gain in multiplier 730 to provide the output reconstructed speech. The output speech is the converted to analog form using the various well known conversion techniques for output to the user.

It should be understood the embodiment of the present invention as disclosed herein is but an exemplary embodiment and that variations in the embodiment may be realized which are the functional equivalent. The present invention may be implemented in a digital signal processor under appropriate program control the provide the functional operation as disclosed herein to encode the speech samples and decode the encoded speech. In other implementations the present invention may be embodied in an application specific integrated circuit (ASIC) using well known very large scale integration (VLSI) techniques.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of speech signal compression, by variable rate coding of frames of digitized speech samples, comprising the steps of:

determining a level of speech activity for a frame of digitized speech samples;

selecting an encoding rate from a set of rates based upon said determined level of speech activity for said frame;

coding said frame according to a coding format of a set of coding formats for said selected rate wherein each rate has a corresponding different coding format and wherein each coding format provides for a different plurality of parameter signals representing said digitized speech samples in accordance with a speech model; and generating for said frame a data packet of said parameter signals.

2. The method of claim 1 wherein said step of determining said level of frame speech activity comprises the steps of:
measuring speech activity in said frame of digitized speech samples;
comparing said measured speech activity with at least one speech activity threshold level of a predetermined set of activity threshold levels; and
adaptively adjusting in response to said comparison at least one of said at least one speech activity threshold levels with respect to a level of activity of a previous frame of digitized speech samples.

3. The method of claim 1 further comprising the steps of:
providing a rate command indicative of a preselected encoding rate for said frame; and
modifying said selected encoding rate to provide said preselected encoding rate for coding of said frame at said preselected encoding rate.

4. The method of claim 3 wherein said preselected rate is less than a predetermined maximum rate, said method further comprising the steps of:
providing an additional data packet; and
combining said data packet with said additional data packet within a transmission frame for transmission.

5. The method of claim 1 wherein said step of providing said data packet of said parameter signals comprises:
generating a variable number of bits to represent linear predictive coefficient (LPC) vector signals of said frame of digitized speech samples, wherein said variable number of bits representing said LPC vector signals is responsive to said measured speech activity level;
generating a variable number of bits to represent pitch vector signals of said frame of digitized speech samples, wherein said variable number of bits representing said pitch vector signals is responsive to said measured speech activity level; and
generating variable number of bits to represent codebook excitation vector signals of said frame of digitized speech samples, wherein said variable number of bits representing said codebook excitation vector signals is responsive to said measured speech activity level.

6. The method of claim 1 wherein said step coding said frame comprises:
generating for said frame a variable number of linear prediction coefficients wherein said variable number of said linear prediction coefficients is responsive to said selected encoding rate;
generating for said frame a variable number of pitch coefficients wherein said variable number of said pitch coefficients is responsive to said selected encoding rate; and
generating for said frame a variable number of codebook excitation values wherein said variable number of said codebook excitation values is responsive to said selected encoding rate.

7. The method of claim 1 wherein said step of determining a level of speech activity comprises summing the squares of the values of said digitized speech samples.

8. The method of claim 7 further comprising the step of generating error protection bits for said data packet.

9. The method of claim 8 wherein said step of generating error protection bits for said data packet wherein the number of said protection bits is responsive to said frame of speech activity level.

10. The method of claim 1 wherein said step of adaptively adjusting speech activity threshold levels comprises the steps of:
comparing said measured speech activity to said at least one of speech activity thresholds and incrementally increasing said at least one of speech activity thresholds toward the level of said frame speech activity when said frame speech activity exceeds said at least one of said speech activity thresholds; and
comparing said measured speech activity to said at least one of speech activity thresholds and decreasing said at least one of speech activity thresholds to the level of said frame speech activity when said frame speech activity is less than said at least one of speech activity thresholds.

11. The method of claim 10 wherein said step of selecting an encoding rate is responsive to an external rate signal.

12. The method of claim 8 wherein said step of generating error protection for said data packet further comprises determining the values of said error protection bits in accordance with a cyclic block code.

13. The method of claim 1 further comprising the step of pre-multiplying said digitized speech samples by a predetermined windowing function.

14. The method of claim 1 further comprising the step of converting said LPC coefficients to line spectral pair (LSP) values.

15. The apparatus of claim 1 wherein said input frame of digitized samples comprises digitized values for approximately twenty milliseconds of speech.

16. The apparatus of claim 1 wherein said input frame of digitized samples comprises approximately 160 digitized samples.

17. The apparatus of claim 1 wherein said output data packet comprises:
one hundred and seventy one bits comprised of forty bits for LPC data, forty bits for pitch data, eighty bits for excitation vector data and eleven bits for error protection when said output data rate is full rate;
eighty bits comprised of twenty bits for LPC information, twenty bits for pitch information and forty bits for excitation vector data when said output data rate is half rate;
forty bits comprised of ten bits for LPC information, ten bits for pitch information and twenty bits for excitation vector data when said output data rate is quarter rate; and
sixteen bits comprised of ten bits for LPC information and six bits for excitation vector information when said output data rate is eighth rate.

18. An apparatus for compressing an acoustical signal into variable rate data comprising:
means for determining a level of audio activity for an input frame of digitized samples of said acoustical signal;
means for selecting an output data rate from a predetermined set of rates based upon said determined level of audio activity within said frame;
means for coding said frame according to a coding format of a set of coding formats for said selected rate to provide a plurality of parameter signals wherein each rate has a corresponding different coding format with each coding format providing a different plurality of parameter signals representing said digitized speech samples in accordance with a speech model; and means for providing for said frame a corresponding data packet at a data rate corresponding to said selected rate.

19. The apparatus for compressing an acoustical signal of claim 18 wherein said output data packet comprises:

a variable number of bits to represent LPC vector signals of said frame of digitized speech samples, wherein said variable number of bits for representing said LPC vector signals is responsive to said level of audio activity;

a variable number of bits to represent pitch vector signals of said frame of digitized speech samples, wherein said variable number of bits for representing said pitch vector signals is responsive to said level of audio activity; and a variable number of bits to represent codebook excitation vector signals of said frame of digitized speech samples, wherein said variable number of bits for representing said codebook excitation vector signals is responsive to said level of audio activity.

20. The apparatus for compressing an acoustical signal of claim 18 wherein said means for determining said level of audio activity comprises:

means for determining an energy value for said input frame;

means for comparing said input frame energy with said at least one audio activity thresholds; and means for providing an indication when said input frame activity exceeds each corresponding one of said at least one audio activity thresholds.

21. The apparatus of claim 20 further comprising a means for adaptively adjusting said at least one of said at least one audio activity thresholds.

22. The apparatus of claim 18 wherein said means for determining said energy of said input frame comprises:

squaring means for squaring said digitized audio samples of a frame; and summing means for summing said squares of digitized audio samples of a frame.

23. The apparatus of claim 18 wherein said means for determining a level of audio activity comprises:

means for calculating a set of linear predictive coefficients for said input frame of digitized samples of said acoustical signals; and means for determining said level of audio activity in accordance with at least one of said linear predictive coefficients.

24. The apparatus of claim 18 further comprising means for providing error protection bits for said data packet responsive to said selected output data rate.

25. The apparatus of claim 24 wherein said means for providing error protection bits provides the values of said error protection bits in accordance with a cyclic block code.

26. The apparatus of claim 18 further comprising a means for converting said LPC coefficients to line spectral pair (LSP) values.

27. The apparatus of claim 18 wherein said set of rates comprises full rate, half rate, quarter rate and eighth rate:

28. The apparatus of claim 18 wherein said set of rates comprises 16 Kbps, 8 Kbps, 4 Kbps and 2 Kbps.

29. A circuit for compressing an acoustical signal into variable rate data comprising:

a circuit for determining a level of audio activity for an input frame of digitized samples of said acoustical signal;

a circuit for selecting an output data rate from a predetermined set of rates based upon said determined level of audio activity within said frame;

a circuit for coding said frame according to a coding format of a set of coding formats for said selected rate to provide a plurality of parameter signals wherein each rate has a corresponding different coding format with each coding format providing a different plurality of parameter signals representing said digitized speech samples in accordance with a speech model; and a circuit for providing for said frame a corresponding data packet at a data rate corresponding to said selected rate.

30. The circuit of claim 29 wherein said circuit for determining said level of audio activity comprises:

a circuit for determining an energy value for said input frame;

a circuit for comparing said input frame energy with said at least one audio activity thresholds; and a circuit for providing an indication when said input frame activity exceeds each corresponding one of said at least one audio activity thresholds.

31. The circuit of claim 30 wherein said circuit for determining said level of audio activity further comprises a circuit for adaptively adjusting said at least one of said at least one audio activity thresholds.

32. The circuit of claim 29 wherein said circuit for determining said energy of said input frame determines said energy by summing the squares of the values of said digitized samples.

33. The circuit of claim 29 wherein said circuit for determining a level of audio activity determines said energy by calculating a set of linear predictive coefficients for said input frame and determines said level of audio activity in accordance with at least one of said linear predictive coefficients.

34. The circuit of claim 29 wherein said input frame of digitized samples comprises digitized speech for a duration of approximately twenty milliseconds.

35. The circuit of claim 29 wherein said input frame of digitized samples comprises 160 digitized samples.

36. The circuit of claim 29 further comprising means for providing error protection bits for said data packet responsive to said selected output data rate.

37. The circuit of claim 36 further comprises a means for determining the values of said error protection bits in accordance with a cyclic block code.

38. The circuit of claim 37 wherein said cyclic block code operates in accordance with a generator polynomial of $1+x^3+x^5+x^6+x^8+x^9+x^{10}$.

39. The circuit of claim 29 further comprising means for pre-multiplying said digitized samples by a predetermined windowing function.

40. The circuit claim 39 wherein said predetermined windowing function is a Hamming window.

41. The circuit of claim 29 wherein said set of rates comprises full rate, half rate, quarter rate and eighth rate.

42. The circuit for claim 29 wherein said set of rates comprises 16 Kbps, 8 Kbps, 4 Kbps and 2 Kbps.

43. The circuit of claim 29 wherein said output data packet comprises:
- a variable number of bits to represent LPC vector signals of said frame of digitized speech samples, wherein said variable number of bits for representing said LPC vector signals is responsive to said level of audio activity;
- a variable number of bits to represent pitch vector signals of said frame of digitized speech samples, wherein said variable number of bits for representing said pitch vector signals is responsive to said level of audio activity; and
- a variable number of bits to represent codebook excitation vector signals of said frame of digitized speech samples, wherein said variable number of bits for representing said codebook excitation vector signals is responsive to said level of audio activity.

44. The circuit of claim 43 wherein said output data packet further comprises a variable number of bits for error protection, wherein said variable number of bits for error protection is responsive to said level of audio activity.

45. The circuit of claim 29 wherein said output data packet comprises:
- one hundred and seventy one bits comprised of forty bits for LPC data, forty bits for pitch data, eighty bits for excitation vector data and eleven bits for error protection when said output data rate is full rate;
- eighty bits comprised of twenty bits for LPC information, twenty bits for pitch information and forty bits for excitation vector data when said output data rate is half rate;
- forty bits comprised of ten bits for LPC information, ten bits for pitch information and twenty bits for excitation vector data when said output data rate is quarter rate; and
- sixteen bits comprised of ten bits for LPC information and six bits for excitation vector information when said output data rate is eighth rate.

46. The circuit of claim 29 wherein said means for selecting an encoding rate is responsive to an external rate signal.

47. The circuit of claim 29 further comprising a means for converting said LPC coefficients to line spectral pair (LSP) values.

48. A method of speech signal compression by variable rate coding of frames of digitized speech samples comprising the steps of:
- multiplying one frame of digitized speech samples in a sequence of said frames of digitized speech samples by a windowing function to provide a windowed frame of speech data;
- calculating a set of autocorrelation coefficients from said windowed frame of speech;
- determining an encoding rate from said set of autocorrelation coefficients;
- calculating from said set of autocorrelation coefficients a set of linear predictive coding (LPC) coefficients;
- converting said set of LPC coefficients to a set of line spectral pair values;
- quantizing said set of line spectral pair (LSP) coefficients in accordance with said rate command and said encoding rate;
- selecting a pitch value from a predetermined set of pitch values to provide a selected pitch value for each pitch subframe in each frame of digitized speech;
- quantizing said selected pitch value in accordance with said encoding rate and said rate command;
- selecting a codebook value from a predetermined set of pitch values to provide a selected pitch value for a pitch frame;
- quantizing said selected codebook value in accordance with said encoding rate and said rate command; and
- generating an output data packet comprising said quantized line spectral pair values, quantized selected pitch value, and quantized selected codebook value.

* * * * *

UNITED STATES PATENT AND TRADEMARK OFFICE
CERTIFICATE OF CORRECTION

PATENT NO. : 5,414,796
APPLICATION NO. : 08/004484
DATED : May 9, 1995
INVENTOR(S) : Jacobs et al.

It is certified that error appears in the above-identified patent and that said Letters Patent is hereby corrected as shown below:

Column 1, line 42, change "flames" to --frames--;

Column 30, line 51, change "for" to --forth--;

Column 47, line 49, after "step" insert --of--;

Column 48, lines 1-2, delete "wherein said step of generating error protection bits for said data packet";

Column 49, line 68, after "rate" change ":" to --.--.

Signed and Sealed this

Eleventh Day of September, 2007

JON W. DUDAS
*Director of the United States Patent and Trademark Office*